(12) United States Patent
Xiong et al.

(10) Patent No.: US 11,405,145 B2
(45) Date of Patent: Aug. 2, 2022

(54) METHOD AND APPARATUS FOR TRANSMITTING AND RECEIVING SIGNAL IN A COMMUNICATION SYSTEM

(71) Applicant: Samsung Electronics Co., Ltd., Suwon-si (KR)

(72) Inventors: Qi Xiong, Beijing (CN); Yi Wang, Beijing (CN); Feifei Sun, Beijing (CN); Min Wu, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 16/927,724

(22) Filed: Jul. 13, 2020

(65) Prior Publication Data

US 2021/0014011 A1    Jan. 14, 2021

(30) Foreign Application Priority Data

Jul. 12, 2019 (CN) .......................... 201910632025.6
Jul. 24, 2019 (CN) .......................... 201910671090.X
(Continued)

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0055* (2013.01); *H04L 5/10* (2013.01);
(Continued)

(58) Field of Classification Search
CPC ....... H04L 1/1819; H04L 5/0055; H04L 5/10; H04W 76/11; H04W 76/27; H04W 72/042; H04W 72/0493; H04W 74/0833
See application file for complete search history.

(56) References Cited

U.S. PATENT DOCUMENTS 10,986,661 B2 *   4/2021   Basu Mallick ......... H04L 5/008
2011/0222501 A1    9/2011   Kim et al.
(Continued)

FOREIGN PATENT DOCUMENTS

WO    2016175981 A1    11/2016

OTHER PUBLICATIONS

International Search Report of the International Searching Authority in connection with International Application No. PCT/KR2020/009219 dated Oct. 15, 2020, 3 pages.
(Continued)

*Primary Examiner* — Michael J Moore, Jr.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A downlink transmission method performed by user equipment and user equipment are provided. The downlink transmission method performed by the user equipment includes: receiving a predefined downlink signal in a predefined downlink resource, and performing ACK feedback according to the received downlink signal, thereby implementing the performing of downlink data transmission in an RRC idling or inactive state, or establishing RRC connection more rapidly.

15 Claims, 20 Drawing Sheets

(30) Foreign Application Priority Data

| Jul. 26, 2019 | (CN) | 201910680705.5 |
|---|---|---|
| Aug. 29, 2019 | (CN) | 201910806153.8 |
| Sep. 12, 2019 | (CN) | 201910863505.3 |
| Nov. 7, 2019 | (CN) | 201911083856.9 |
| Nov. 22, 2019 | (CN) | 201911158215.5 |
| Nov. 25, 2019 | (CN) | 201911168718.0 |

(51) Int. Cl.
    *H04W 72/04*      (2009.01)
    *H04W 76/11*      (2018.01)
    *H04L 5/10*      (2006.01)
    *H04W 74/08*      (2009.01)
    *H04W 76/27*      (2018.01)

(52) U.S. Cl.
    CPC ..... *H04W 72/042* (2013.01); *H04W 72/0493* (2013.01); *H04W 74/0833* (2013.01); *H04W 76/11* (2018.02); *H04W 76/27* (2018.02)

(56) References Cited

U.S. PATENT DOCUMENTS

| 2016/0270066 | A1 | 9/2016 | Seo et al. | |
|---|---|---|---|---|
| 2016/0323070 | A1* | 11/2016 | Chen | H04W 56/0045 |
| 2017/0164350 | A1* | 6/2017 | Sun | H04W 72/0453 |
| 2019/0037569 | A1 | 1/2019 | Lee et al. | |
| 2019/0045527 | A1* | 2/2019 | Shimezawa | H04W 72/1263 |
| 2019/0182012 | A1* | 6/2019 | Liu | H04L 1/1854 |
| 2019/0289586 | A1* | 9/2019 | Ouchi | H04L 27/2602 |
| 2019/0357262 | A1* | 11/2019 | Cirik | H04W 80/02 |
| 2019/0372721 | A1* | 12/2019 | Lee | H04L 1/1864 |
| 2020/0100299 | A1* | 3/2020 | Loehr | H04W 80/02 |
| 2020/0162207 | A1* | 5/2020 | Hwang | H04L 1/1812 |
| 2020/0296697 | A1* | 9/2020 | Hwang | H04W 74/0833 |
| 2020/0305168 | A1* | 9/2020 | Liou | H04W 76/11 |
| 2020/0305169 | A1* | 9/2020 | Loehr | H04W 72/1247 |
| 2020/0413463 | A1* | 12/2020 | Ouchi | H04L 5/0032 |
| 2021/0014011 | A1* | 1/2021 | Xiong | H04W 74/0833 |
| 2021/0135791 | A1* | 5/2021 | Wang | H04L 1/0009 |
| 2022/0095388 | A1* | 3/2022 | Sosnin | H04W 74/0841 |

OTHER PUBLICATIONS

Nokia, "Feature lead summary #3 on 2 step RACH procedures," R1-1907900, 3GPP TSG RAN WG1 #97, Reno, USA, May 13-17, 2019, 59 pages.
Supplementary European Search Report dated Dec. 3, 2021, in connection with European Application No. 20841176.9, 10 pages.
Nokia, et al., "Remaining details on RACH procedure," R1-1804457, 3GPP TSG RAN WG1 Meeting RAN1#92bis, Sanya, People's Republic of China, Apr. 16-20, 2018, 9 pages.

\* cited by examiner

METHOD AND APPARATUS FOR TRANSMITTING AND RECEIVING SIGNAL IN A COMMUNICATION SYSTEM

CROSS-REFERENCE TO RELATED APPLICATION

This application is based on and claims priority under 35 U.S.C. § 119 to Chinese Patent Application No. 201910632025.6 filed on Jul. 12, 2019, Chinese Patent Application No. 201910671090.X filed on Jul. 24, 2019, Chinese Patent Application No. 201910680705.5 filed on Jul. 26, 2019, Chinese Patent Application No. 201910806153.8 filed on Aug. 29, 2019, Chinese Patent Application No. 201910863505.3 filed on Sep. 12, 2019, Chinese Patent Application No. 201911083856.9 filed on Nov. 7, 2019, Chinese Patent Application No. 201911158215.5 filed on Nov. 22, 2019 and Chinese Patent Application No. 201911168718.0 filed on Nov. 25, 2019 in the Chinese Intellectual Property Office, the disclosures of which are herein incorporated by reference in their entirety.

BACKGROUND

1. Field

The present disclosure relates to a wireless communication technical field, and more specifically, relates to a method and apparatus for receiving downlink data in an RRC (Radio Resource Control) idling or inactive state.

2. Description of Related Art

The present disclosure further relates to a technical field of a radio communication system, and more particularly to a resource configuration method of an uplink signal and a user equipment thereof.

The present disclosure further relates to the field of wireless communication, and more particularly, to a method and device for data transmission of small packets.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

For Internet-Of-Things (IOT) User Equipment (UE), for example, Machine-Type Control (MTC) UE, a Narrow Band Internet of Things (NB-IOT) and the like, there is the higher requirement for a battery life due to restrictions of application scenarios. UE power consumption has always been a key improvement indication while designing a system, and relevant standards are also constantly evolving based on a goal of reducing the UE power consumption. In a current 5G system, UE must be supported in an RRC connected state regardless of performing uplink or downlink data transmission. This is relatively inefficient for MTC or IoT (also referred to as NR-light) apparatuses. As for characteristics of sparse small packets of IoT, signaling interaction between the terminals and the Internet may be simplified, for example, data transmission or the like is performed in the case where no RRC connected state is established. This may simplify the signaling better, and save the power consumption. How to perform uplink/downlink data transmission in an RRC idling or inactive state will become a very important research orientation. In addition, how to perform a random access process rapidly, which may also simplify the signaling and save the power consumption, and will be a very important research orientation as well.

In some mobile communication systems (licensed spectrum and/or unlicensed spectrum), in order to achieve faster signal transmission and reception, it is considered to transmit the random access preamble and the random access data part together (indicated as message A), and then the feedback from the user equipment (indicated as message B) is searched in a downlink channel. However, how to determine the configuration of the random access preamble and the random access data resource in the message A is a problem necessary to be resolved. In addition, how to determine a mapping relation between the random access resource and the random access data resource to make the base station better detect the message A transmitted by the user is also a problem necessary to be resolved.

In some communication systems (licensed spectrum and/or unlicensed spectrum), some user equipment only needs to send a certain amount of data packets at certain times. In order to achieve faster signal transmission and reception, if the traditional method is used It requires four steps of random access to access the system, and then requests resources from the system and performs data transmission and other operations. If there are many small packet services, it will cause a lot of waste of signaling resources. Therefore, how to effectively transmit small packet data is a problem that needs to be solved.

SUMMARY

Exemplary embodiments of the present disclosure aim to provide a downlink transmission method performed by user equipment (UE) and UE to perform downlink data transmission in an RRC connected state or an RRC idling or inactive state.

According to the exemplary embodiments of the present disclosure, a downlink transmission method performed by the UE is provided, the method including: receiving a predefined downlink signal in a predefined downlink resource; and performing HARQ-ACK) feedback according to the received downlink signal.

Alternatively, the predefined downlink signal is a second type PDSCH (Physical Downlink Shared Channel), and the performing of the HARQ-ACK feedback according to the received downlink signal may include: demodulating the second type PDSCH, and performing the HARQ-ACK feedback according to the demodulation result.

Alternatively, the downlink transmission method may further include: entering a dormant state when a predefined dormant condition is satisfied.

Alternatively, the predefined downlink resource may be a predefined second type PDSCH resource.

Alternatively, the predefined second type PDSCH resource is an RAR (Random Access Response) PDSCH downlink resource determined according to an RAR PDCCH.

Alternatively, the predefined downlink resource may be a first search space, and the first search space is a paging search space for monitoring a PDCCH scheduling a first type PDSCH.

Alternatively, the predefined downlink resource may be a third search space, and the third search space is a search space for monitoring a PDCCH scheduling the second type PDSCH and for receiving a PDCCH that supports the UE to perform downlink transmission in an RRC idling/inactive state.

Alternatively, when the predefined downlink resource is the third search space, the receiving of the predefined downlink signal in the predefined downlink resource may include: receiving a predefined PDCCH in the third search space; and receiving a second type PDSCH according to the PDCCH received in the third search space.

Alternatively, when the predefined downlink resource is the first search space, the receiving of the predefined downlink signal in the predefined downlink resource may include: receiving a predefined PDCCH in the first search space; receiving a first type PDSCH according to the PDCCH received in the first search space; and receiving a second type PDSCH.

Alternatively, the receiving of the second type PDSCH may include: receiving a PDCCH in the second search space; and receiving the second type PDSCH according to the PDCCH received in the second search space.

Alternatively, before the PDCCH is received in the second search space, the downlink transmission method may further include: transmitting a PRACH (Physical Random Access Channel) according to the first type PDSCH.

Alternatively, when the predefined downlink resource is the first search space, the receiving of the predefined downlink signal in the predefined downlink resource may include: receiving a predefined PDCCH in the first search space; receiving a first type PDSCH according to the PDCCH received in the first search space; transmitting a PRACH according to the first type PDSCH; monitoring a PDCCH in the predefined second search space within a predetermined time window; receiving the PDCCH in the second search space when the PDCCH is monitored within the predetermined time window; and receiving a second type PDSCH when the PDCCH received in the second search space indicates receiving the second type PDSCH.

Alternatively, the entering the dormant state may include: entering the dormant state when the PDCCH received in the second search space indicates entering the dormant state.

Alternatively, the entering the dormant state may include: entering the dormant state when no PDCCH is monitored within the predetermined time window.

Alternatively, the first type PDSCH may include downlink data, and/or the first type PDSCH may include at least one item of: PRACH resource information, second type PDSCH resource information, HARQ-ACK resource information, transmission mode information, a first type RNTI (Radio Network Temporary Identity), and second search space resource information.

And/or, after the first type PDSCH is received, the downlink transmission method may further include: according to the first type PDSCH, determining at least one of following transmission modes: performing Early Data Transmission (EDT) in an RRC idling/inactive state, performing Mobile-terminated Early Data Transmission (MT-EDT) in an RRC idling/inactive state, performing Mobile Originated Early Data Transmission (MO-EDT) in an RRC idling/inactive state, establishing an RRC connection, performing contention-based random access, performing contention-free random access, performing 4-step random access channel or 2-step random access channel, returning to a specific transmission process when a predefined condition is satisfied, and/or, determining PRACH resource information according to a first type PDSCH, and/or, determining HARQ-ACK resource information according to a first type PDSCH, and/or, determining a first type RNTI according to a first type PDSCH, and/or, determining a second search space according to a first type PDSCH.

Alternatively, the PRACH resource information included in the first type PDSCH may include at least one item of: a preamble index, a number of repetitions of a preamble, a PRACH format, a PRACH time-frequency resource, a synchronization signal for determining RACH (Random Access Channel) timing, and broadcast channel SS/PBCH information.

Alternatively, when the predefined downlink resource is the first search space, before the PDCCH is received in the second search space, the downlink transmission method may further include: determining the second search space according to at least one mode of: determining the second search space according to configuration information of cell system information, determining the second search space according to UE-specific RRC signaling configuration information, determining the second search space according to the first type PDSCH, determining the second search space by combining various kinds of signaling, and determining the second search space according to a predefined search space.

Alternatively, the receiving of the PDCCH in the search space may include: receiving the PDCCH according to the first type RNTI or an RA-RNTI, wherein the first type RNTI is determined by at least one item of: a first type RNTI allocated when the UE is in an RRC connected state, an RNTI included in the first type PDSCH, a C-RNTI allocated when the UE is in the previous RRC connected state, a Paging UE-Identity, and a random access RNTI (RA-RNTI).

Alternatively, the PDCCH received in the second search space may include at least one item of: PDSCH scheduling information, uplink timing adjustment information, uplink channel information for feeding back an Hybrid Automatic Repeat Request Acknowledgment (HARQ-ACK), first type RNTI information, an indication of a UE transmission mode, wherein the indication of the UE transmission mode includes: an indication of transmitting the PRACH, an indication of receiving the PDSCH, and an indication of feeding back the HARQ-ACK through the PRACH or a Physical Uplink Control Channel (PUCCH), wherein different indication contents are distinguished by a separate bit field in a Display Control Interface (DCI) of the PDCCH in the second search space, or different indication contents are distinguished by a specific bit value/value combination in the DCI of the PDCCH in the second search space, or different indication contents are distinguished by performing Cyclic Redundancy Check (CRC) scrambling on the PDCCH in the second search space through different RNTIs, or different indication contents are distinguished by different DCI formats.

Alternatively, after the PRACH is transmitted, the downlink transmission method may further include: returning to the contention-based random access process when a corresponding downlink response is not received in the second search space within the time window, or retransmitting a specific PRACH when the corresponding downlink response is not received in the second search space within the time window, or entering the dormant state when the corresponding downlink response is not received in the second search space within the time window.

Alternatively, the downlink transmission method may further include: determining the second type PDSCH resources according to the PDSCH resource information included in the PDCCH, the PDSCH resource information included in the first type PDSCH, or at least one PDSCH resource information configured by a base station in an RRC connected state, or determining the second type PDSCH resources according to the PRACH.

Alternatively, the second type PDSCH may include at least one item of: downlink data, uplink channel information for carrying an HARQ-ACK, uplink timing adjustment information, uplink scheduling information, a first type RNTI, and an Msg B PDSCH in a 2-step random process, wherein the second type PDSCH is scrambled according to the first type RNTI, and/or the RA-RNTI, and/or a cell ID (Identity), and/or a sequence determined by the PRACH.

Alternatively, parameters of the third search space may be selectively configured, and if parameters of a specific search space are not configured, a search space for a predefined usage is used as the specific search space, wherein the third search space is determined according to the UE-specific RRC signaling, or the third search space is determined according to the cell system information, or the third search space is determined according to specific parameters of the UE and parameters of specific search spaces.

Alternatively, when the predefined downlink resource is the predefined second type PDSCH resource, the predefined second type PDSCH resource is configured by a base station when the UE is in an RRC connected state, and may be used for downlink transmission in an RRC idling/inactive state.

Alternatively, when the predefined downlink resource is the predefined second type PDSCH resource, the predefined second type PDSCH resource is indicated by the RAR PDCCH in the 2-step random access process. The second type PDSCH is an Msg B RAR PDSCH in the 2-step random access process. Alternatively, the performing the HARQ-ACK feedback according to the demodulation result may include: transmitting the ACK if the PDSCH is demodulated correctly; and not transmitting an uplink signal if the PDSCH is demodulated incorrectly, or transmitting the ACK or NACK according to the demodulation result of the PDSCH.

Alternatively, when the second type PDSCH is the Msg B RAR PDSCH, the performing the HARQ-ACK feedback according to the demodulation result may include: the UE feeding back the ACK when a successful Msg B RAR sPDU (Session Protocol Data Unit) is demodulated out by the UE in the Msg B RAR PDSCH. An uplink slot/sub-slot for feeding back the ACK is determined according to HARQ-ACK timing indicated in the RAR PDSCH or RAR PDCCH and a predefined time offset.

Alternatively, the ACK and NACK may be carried by the PRACH or PUCCH, or the ACK may be carried by a PUSCH (Physical Uplink Shared Channel).

Alternatively, the downlink transmission method may further include: determining whether to transmit a PUCCH according to whether uplink timing is valid, wherein the PUCCH carrying the ACK or NACK is transmitted according to the uplink timing if the uplink timing is valid, and the PUCCH is not transmitted if the uplink timing is invalid; or, the PUCCH carrying the ACK or NACK is transmitted according to the uplink timing if the uplink timing is valid, and the PRACH is transmitted but the PUCCH is not transmitted if the uplink timing is invalid.

Alternatively, after the second type PDSCH is received, the downlink transmission method may further include: monitoring the PDCCH in the second or third search space within a predetermined time window, wherein the predetermined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

Alternatively, the downlink transmission method may further include: in a predetermined time window, receiving at least one of the following items transmitted by the base station: downlink control channel resource configuration information, PRACH configuration information, uplink channel configuration information of the HARQ-ACK feedback, scheduling information of the second type PDSCH, PUSCH scheduling information, transmission mode indication information, PRACH transmission triggering information, triggering information of the contention-based random access process, indication information for entering a dormant state. Or the entering the dormant state includes: entering the dormant state when no PDCCH is received within the predetermined time window or the indication information for entering the dormant state is received.

Alternatively, the downlink transmission method may further include: returning to the contention-based random access process according to a received fallback indication or based on a fallback triggering condition being detected, wherein the fallback triggering condition includes at least one item of: the uplink timing being invalid, the PDCCH scheduling the second type PDSCH is received but the uplink timing being invalid, no response is received within a predefined time window after the contention-free PRACH is transmitted.

According to the exemplary embodiments of the present disclosure, a user equipment is provided, including: a signal receiving unit configured to receive a predefined downlink signal in a predefined downlink resource; and a feedback unit configured to perform HARQ-ACK feedback according to the received downlink signal.

Alternatively, the predefined downlink signal is the second type PDSCH, the feedback unit may be configured to demodulate the second type PDSCH, and to perform the ACK feedback according to the demodulation result. Or, the UE may further include: a dormant unit configured to enter a dormant state when a predefined dormant condition is satisfied.

Alternatively, the predefined downlink resource is a predefined second type PDSCH resource, or the predefined downlink resource is a first search space which is a paging search space for monitoring the PDCCH scheduling the first type PDSCH, or the predefined downlink resource is a third search space which is a search space for monitoring the PDCCH scheduling the second type PDSCH and for receiving a PDCCH that supports the UE to perform downlink transmission in the RRC idling/inactive state.

Alternatively, the signal receiving unit may include: a third PDCCH receiving unit configured to receive a predefined PDCCH in the third search space when the predefined downlink resource is the third search space; and a third PDSCH receiving unit configured to receive a second type PDSCH according to the PDCCH received in the third search space, wherein the signal receiving unit may include: a first PDCCH receiving unit configured to receive a predefined PDCCH in the first search space when the predefined downlink resource is the first search space; a first PDSCH receiving unit configured to receive a first type PDSCH according to the PDCCH received in the first search space; and a second receiving unit configured to receive the second type PDSCH. Or, wherein the second receiving unit may include: a second PDCCH receiving unit configured to receive a PDCCH in the second search space; and a second PDSCH receiving unit configured to receive a second type PDSCH according to the PDCCH received in the second search space. Or, the UE may further include a PRACH transmitting unit configured to transmit a PRACH according to the first type PDSCH.

Alternatively, the signal receiving unit may include: a first PDCCH receiving unit configured to receive a predefined PDCCH in the first search space when the predefined downlink resource is the first search space; a first PDSCH receiving unit configured to receive a first type PDSCH according to the PDCCH received in the first search space; a PRACH transmitting unit configured to transmit a PRACH according to the first type PDSCH; a PDCCH monitoring unit configured to monitor a PDCCH in the second search space within a predetermined time window; a second PDCCH receiving unit configured to receive the PDCCH in the second search space when the PDCCH is monitored within the predetermined time window; a second PDSCH receiving unit configured to receive a second type PDSCH when the PDCCH received in the second search space indicates receiving the second type PDSCH; or the dormant unit is configured to enter a dormant state when the PDCCH received in the second search space indicates entering the dormant state, or the dormant unit is configured to enter the dormant state when no PDCCH is monitored within the predetermined time window.

Alternatively, the first type PDSCH may include downlink data, and/or, the first type PDSCH may include at least one item of: PRACH resource information, second type PDSCH resource information, HARQ-ACK resource information, transmission mode information, a first type RNTI, and second search space resource information. And/or, the UE may further include: a mode determining unit configured to, after receiving the first type PDSCH, according to the first type PDSCH, determine at least one of following transmission modes: performing EDT in an RRC idling/inactive state, performing MT-EDT in an RRC idling/inactive state, performing MO-EDT in an RRC idling/inactive state, establishing an RRC connection, performing contention-based random access, performing contention-free random access, performing 4-step random access channel or 2-step random access channel, returning to a specific transmission process when a predefined condition is satisfied, and/or, determining the PRACH resource information according to the first type PDSCH, and/or, determining HARQ-ACK resource information according to the first type PDSCH, and/or, determining a first type RNTI according to the first type PDSCH, and/or, determining a second search space according to the first type PDSCH.

Alternatively, the PRACH resource information included in the first type PDSCH may include at least one item of: a preamble index, a number of repetitions of a preamble, a PRACH format, a PRACH time-frequency resource, a synchronization signal for determining RACH timing, and broadcast channel SS/PBCH information.

Alternatively, the UE may further include: a space determining unit configured to, when the predefined downlink resource is the first search space, determine the second search space according to at least one manner of: determining the second search space according to configuration information of cell system information, determining the second search space according to UE-specific RRC signaling configuration information, determining the second search space according to the first type PDSCH, determining the second search space by combining various kinds of signaling, and determining the second search space according to a predefined search space.

Alternatively, the signal receiving unit, or the first PDCCH receiving unit, the second PDCCH receiving unit and the third PDCCH receiving unit in the signal receiving unit may be configured to receive the PDCCH according to the first type RNTI or RA-RNTI, wherein the first type RNTI is determined according to at least one item of: a first type RNTI allocated when the UE is in an RRC connected state, an RNTI included in the first type PDSCH, a C-RNTI allocated when the UE is in the previous RRC connected state, a Paging UE-Identity, and an RA-RNTI.

Alternatively, the PDCCH received in the second search space may include at least one item of: PDSCH scheduling information, uplink timing adjustment information, uplink channel information for feeding back a HARQ-ACK, first type RNTI information, and an indication of a UE transmission mode, wherein the indication of the UE transmission mode includes: an indication of transmitting the PRACH, an indication of receiving the PDSCH, an indication of feeding back the HARQ-ACK through the PRACH or the PUCCH, wherein different indication contents are distinguished by a separate bit field in a DCI of the PDCCH in the second search space, or different indication contents are distinguished by a specific bit value/value combination in the DCI of the PDCCH in the second search space, or different indication contents are distinguished by performing CRC scrambling on the PDCCH in the second search space through different RNTIs, or different indication contents are distinguished through different DCI formats.

Alternatively, the UE may further include: a fallback unit configured to return to the contention-based random access process when the corresponding downlink response is not received in the second search space within the time window, or the UE further includes: a retransmitting unit configured to retransmit the specific PRACH when the corresponding downlink response is not received in the second search space within the time window, or the dormant unit further configured to enter the dormant state when the corresponding downlink response is not received in the second search space within the time window.

Alternatively, the UE may further include: a resource determining unit configured to determine the second type PDSCH resources according to the PDSCH resource information included in the PDCCH, the PDSCH resource information included in the first type PDSCH, or at least one set of PDSCH resource information configured by a base station in an RRC connected state, or determine the second type PDSCH resources according to the PRACH.

Alternatively, the second type PDSCH may include at least one item of: downlink data, uplink channel information for carrying an HARQ-ACK, uplink timing adjustment information, uplink scheduling information, and a first type RNTI, wherein the second type PDSCH is scrambled according to the first type RNTI, and/or the RA-RNTI, and/or a cell ID, and/or a sequence determined by the PRACH.

Alternatively, parameters of the third search space may be selectively configured, and if parameters of a specific search space are not configured, a search space for a predefined usage is used as the specific search space, wherein the third search space is determined according to the UE-specific RRC signaling, or the third search space is determined according to the cell system information, or the third search space is determined according to specific parameters of the UE and parameters of specific search spaces.

Alternatively, when the predefined downlink resource is the predefined second type PDSCH resource, the predefined second type PDSCH resource is configured by a base station when the UE is in an RRC connected state, and may be used for downlink transmission in an RRC idling/inactive state.

Alternatively, the feedback unit may be configured to transmit the ACK if the PDSCH is demodulated correctly; and not to transmit an uplink signal if the PDSCH is demodulated incorrectly, or to transmit the ACK or NACK according to the demodulation result of the PDSCH.

Alternatively, the ACK and NACK may be carried by a PRACH or a PUCCH, or the ACK may be carried by a PUSCH.

Alternatively, the UE may further include: a transmission determining unit configured to determine whether to transmit a PUCCH according to whether uplink timing is valid, wherein the PUCCH carrying the ACK or NACK is transmitted according to the uplink timing if the uplink timing is valid, and the PUCCH is not transmitted if the uplink timing is invalid; or the PUCCH carrying the ACK or NACK is transmitted according to the uplink timing if the uplink timing is valid, and the PRACH is transmitted but the PUCCH is not transmitted if the uplink timing is invalid.

Alternatively, the UE may further include: a PDCCH monitoring unit configured to monitor a PDCCH in the second or third search space within a predetermined time window, wherein the predetermined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

Alternatively, the UE may further include: an information receiving unit configured to, within a predetermined time window, receive at least one of the following items transmitted by a base station: downlink control channel resource configuration information, PRACH configuration information, uplink channel configuration information for ACK feedback, scheduling information of the second type PDSCH, PUSCH scheduling information, transmission mode indication information, PRACH transmission triggering information, triggering information of the contention-based random access process, indication information for entering a dormant state. Or, the dormant unit is further configured to enter the dormant state when no PDCCH is received within the predetermined time window or the indication information for entering the dormant state is received.

Alternatively, the fallback unit may further be configured to return to the contention-based random access process according to a received fallback indication or based on a fallback triggering condition being detected, wherein the fallback triggering condition includes at least one item of: the uplink timing being invalid, the PDCCH scheduling the second type PDSCH is received but the uplink timing being invalid, no response is received within a predefined time window after the contention-free PRACH is transmitted.

According to the exemplary embodiments of the present disclosure, a computer-readable storage medium stored with a computer program is provided, when the computer program is executed by a processor, the downlink transmission method according to the present disclosure is implemented.

According to the exemplary embodiments of the present disclosure, a computing device is provided, and the computing device includes: a processor; and a storage stored with a computer program, wherein when the computer program is executed by the processor, the downlink transmission method according to the present disclosure is implemented.

The downlink transmission method performed by the UE and the UE according to the exemplary embodiments of the present disclosure implement the performing of downlink data transmission in the RRC idling or inactive state by receiving the predefined downlink signal in the predefined downlink resource, and performing the HARQ-ACK feedback according to the received downlink signal.

Other aspects and/or advantages of the general concept of the present disclosure will be partially illustrated in the subsequent depictions, and the other part will become clear through the depiction or may be learned through the implementation of the general concept of the present disclosure.

The present disclosure provides method and apparatus for transmitting and receiving signal effectively.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
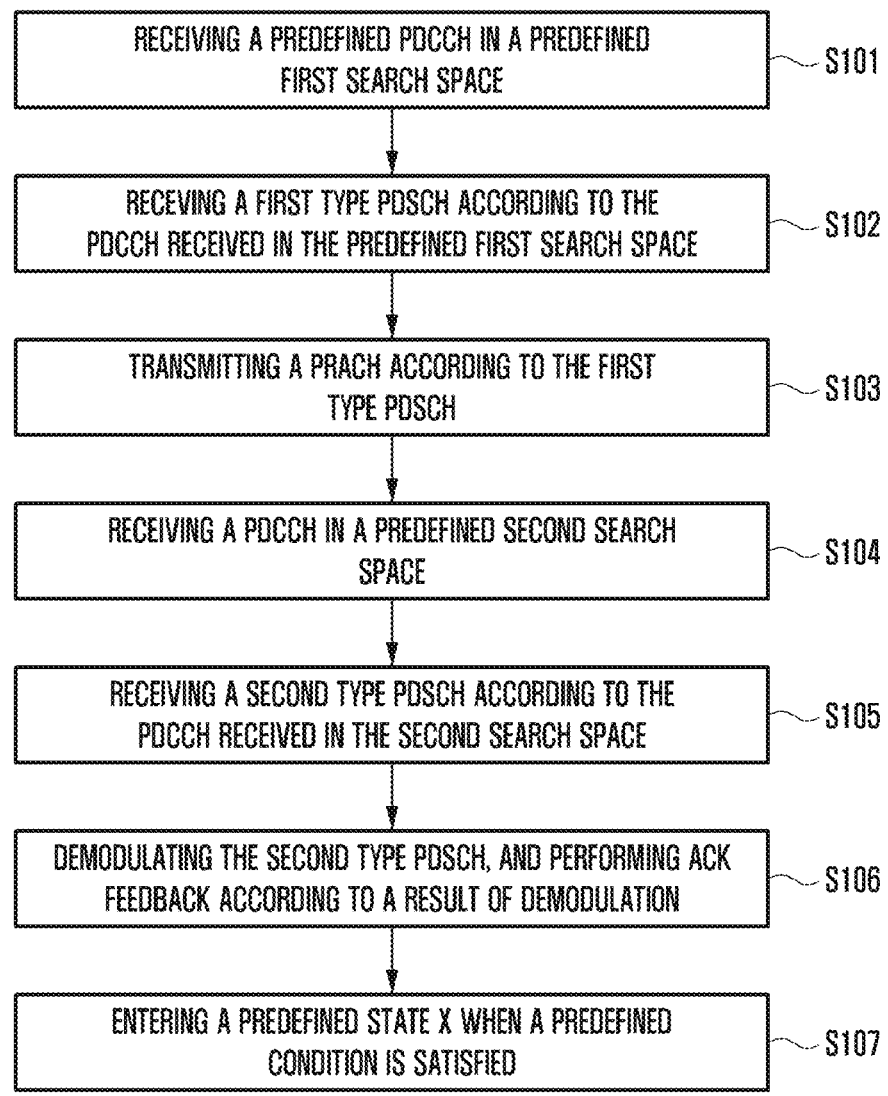
FIG. 1 illustrates a flowchart illustrating a downlink transmission method performed by a UE according to an exemplary embodiment of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Here a detailed reference will be made to the embodiments of the present disclosure, and examples of the embodiments are shown in the accompanying drawings, wherein the same reference signs will always refer to the same components. The embodiments will be described below by referring to the accompanying drawings in order to explain the present disclosure.

Those skilled in the art may understand that, unless specifically stated otherwise, the singular forms "a", "an" and "the" used herein may also include plural forms. It should be further understood that the wording "include" used in the description indicates there are the features, integers, steps, operations, elements and/or components, but there being or adding one or more other features, integers, steps, operations, elements, components and/or a group of them is not excluded. It should be understood that, when it is said that an element is "connected to" or "coupled with" another element, it may be directly connected to or coupled with other elements, or there may also be intermediate components. In addition, the "connected to" or "coupled with" used herein may include being wirelessly connected or wirelessly coupled. The wording "and/or" used herein includes the entire or any unit and all combination of one or more related listed items.

Those skilled in the art may understand that all terms used herein (including technical terms and scientific terms) have the same meaning as the general understanding of those ordinary skilled in the art to which the present disclosure belongs, unless otherwise defined. It should be further understood that terms, such as those defined in a general dictionary, should be understood to have the meanings consistent with those in the context of the prior art, and will not be interpreted with idealized or over formal meanings unless specifically defined like here.

Those skilled in the art may understand that the "terminal" and "terminal equipment" used herein include not only an equipment of wireless signal receiver, which only has the equipment of wireless signal receiver without a transmission ability, but also an equipment of receiving and transmitting hardware, which has the equipment of receiving and transmitting hardware capable of performing bidirectional communication on a bidirectional communication link. This equipment may include: a cellular or other communication device, which has a single line display or a multi-line display or without the multi-line display; a personal communication system (PSC), which may combine capabilities of voice, data processing, fax and/or data communication; a personal digital assistant (PDA), which may include a radio frequency receiver, a paging receiver, an Internet/Intranet access, web browser, a notepad, a calendar and/or a global positioning system (GPS) receiver; and a conventional laptop and/or palmtop computer or other devices, which has and/or includes a conventional laptop and/or handheld computer or other equipment of a radio frequency receiver. The "terminal" and "terminal equipment" used herein may be portable, transportable or installed in transportation (aviation, shipping and/or land transportation), or suitable and/or configured to operate locally and/or operate at any other location on earth and/or in space in a distributed form. The "terminal" and "terminal device" used herein may also be a communication terminal, an Internet terminal, a music/video playback terminal, for example may be a PDA, a Mobile Internet Device (MID), and/or a mobile phone with a music/video playback function, and may also be a smart TV, set-top boxes and the like.

The time domain unit (also referred to as a time unit) in the present disclosure may be: one OFDM symbol, one OFDM symbol group (composed of a plurality of OFDM symbols), one time slot, one time slot group (composed of a plurality of time slots), one subframe, one subframe group (composed of a plurality of subframes), one system frame, and one system frame group (composed of a plurality of frames); and may also be an absolute time unit, such as 1 millisecond, 1 second and the like; and may also be a combination of a plurality of granularities, for example, N1 time slots plus N2 OFDM symbols.

The frequency domain unit in the present disclosure may be: one subcarrier, one subcarrier group (composed of a plurality of subcarriers), one resource block (RB) which also referred to as a physical resource block (PRB), one resource block group (composed of a plurality of RBs), one bandwidth part (BWP), one bandwidth part group (composed of a plurality of BWPs), one band/carrier, and one band group/carrier group; and may also be an absolute frequency domain unit, such as 1 Hz, 1000 Hz and the like; and the frequency domain unit may also be a combination of a plurality of granularities, for example, M1 PRBs plus M2 subcarriers.

In an NR system, a UE may be in an RRC connected state, an RRC inactive state, and an RRC idle state. Compared with LTE, the NR newly introduces an RRC inactive state, which can restore signaling carrying and establish data connection through an RRC resume process. In the proposed embodiments, a UE in an RRC idle state or a UE in an inactive state only needs to monitor a paging signal regularly. The UE does not need to monitor other Physical Downlink Control Channel (PDCCH), or to receive unicast downlink data. UE Paging information mainly includes two types: a first type is a paging message from a Radio Access Network (RAN), which mainly includes information for example, an indication of updating Earthquake and Tsunami Warning System (EWTS) by system information, an indication of updating Commercial Mobile Alert Service (CMAS) by system information and the like; and a second type is a paging message from a Core Network (CN), which mainly includes a paged UE ID, i.e., an SAE-Temporary Mobile Subscriber Identity (S-TMSI) or International Mobile Subscriber Identification Number (IMSI), and indicates whether the paging is from a Packet Switch (PS) or a Circuit Switch (CS). Regarding the paging message from the RAN side, all of the UEs in the idle state within a cell need to receive the paging message; and regarding the paging message from the CN side, only the paged UEs need to receive the paging message, and the other UEs do not need to receive the paging message.

In order to support the UE to be able to receive downlink data transmitted by a base station in the RRC idle state/inactive state, a relatively general manner is to make enhancement based on current paging mechanisms. No matter the UE is stationary or has mobility (a service cell may change), the UE may be found based on a paging mechanism, and subsequent communication operations are performed. Another, simpler method is that a base station directly transmits a downlink signal to the UE based on the UE information mastered by the base station of the service cell. This method is more adapted to the UE having stationary characteristics. In addition, in a practical system, since factors for triggering downlink transmission are different, for example, regarding downlink transmission caused by a Mobile-terminated downlink service (MT) or a Mobile-originated service (MO), the corresponding downlink transmission mode may be different.

The present disclosure provides various flexible technical solutions to support various scenes. For example, the base station may support various downlink transmission methods and flexible selections. The base station indicates a downlink transmission mode through high-level signaling, and the base station may indicate the UE to adopt which kind of downlink transmission mode through RRC signaling or MAC signaling when the UE is in a connected state (RRC connection). For example, the base station may indicate the UE to adopt which kind of downlink transmission mode through a paging message/a PDCCH for paging/a reference signal or sequence for paging/a specific PDCCH, when the UE is in an RRC idle or inactive state. The base station may indicate a downlink transmission mode through a UE-specific channel or signal, or indicate a downlink transmission mode through a UE group-specific channel or signal, or indicate a downlink transmission mode through a specific channel or signal. For example, the base station may indicate supportable downlink transmission modes through a system message.

Specifically, parameters of a downlink transmission mode may be configured by the base station. For example, the system information includes parameters of downlink transmission modes supported by the base station, or UE-specific high-level signaling indicates parameters of available downlink transmission modes therein.

Specifically, the available downlink transmission modes may be determined according to the downlink transmission modes indicated by the base station and predefined conditions. For example, the base station indicates M kinds of downlink transmission modes in the system message, one of the M kinds of downlink transmission modes may be uniquely determined according to different predefined conditions.

Specifically, the downlink transmission modes may include downlink transmission performed by the UE while transitioning from an RRC idle/inactive state to an RRC connected state, and downlink transmission performed by the UE while being maintained in an RRC idle/inactive state.

Specifically, the downlink transmission performed by the UE while transitioning from an RRC idle/inactive state to an RRC connected state or being maintained in an RRC idle/inactive state may include a 4-step RACH (Random Access Channel) process or a 2-step RACH process of the UE.

Specifically, one kind of specific downlink transmission mode of the UE while being maintained in the RRC idle/inactive state may be indicated by the base station, for instance, an MT-EDT mode in an RRC idle/inactive state, an MO-EDT mode in an RRC idle/inactive state, a data transmission mode based on a pre-configured search space in an RRC idle/inactive state, or a data transmission mode based on a pre-configured downlink resource in an RRC idle/inactive state.

Specifically, the UE may determine a transmission mode according to whether uplink timing is valid.

Specifically, the UE may report UE type information to the base station. Herein, the UE type information includes whether the UE has stationary characteristics.

The downlink transmission in an RRC idle/inactive state have various methods of acquiring resources for downlink transmission in an RRC idle/inactive state, and these methods may be used in combination. For example, resource information for downlink transmission in an RRC idle/inactive state is acquired in an RRC connected state, and this resource information is still retained when the RRC connection is released so that the information may be used when the downlink transmission is performed in an RRC idle/inactive state. For example, resource information for downlink transmission in an RRC idle/inactive state is acquired in the RRC idle/inactive state, and the resource information is valid merely within a period of time.

FIG. 1 is a flowchart illustrating a downlink transmission method performed by a UE according to an exemplary embodiment of the present disclosure.

Referring to FIG. 1, in step S101, a predefined PDCCH is received in a predefined first search space.

The predefined first search space is a search space (which may be also referred to as a paging search space) for monitoring paging control information. When a UE is in an RRC idle/inactive state, the UE may operate in a discontinuous reception mode (DRX) to achieve a purpose of saving power. At the point, the UE only needs to monitor one paging occasion (PO) within each DRX cycle. This paging occasion consists of a set of PDCCH monitoring occasions. One paging frame (PF) may include one or more POs, or include start points of one or more POs.

In the exemplary embodiment of the present disclosure, the predefined downlink signal in the first search space may be a PDCCH. In one PO, a base station may transmit one or more PDCCHs which are scrambled by a paging RNTI (P-RNTI). In the one or more PDCCHs which are scrambled by the P-RNTI transmitted by the base station, the scheduled PSCH information is indicated.

In the exemplary embodiment of the present disclosure, the receiving of the PDCCH in the first search space may include: receiving a PDCCH according to a first type RNTI or RA-RNTI. Herein, the first type RNTI may be determined by at least one item of: a first type RNTI allocated when the UE is in an RRC connected state, an RNTI included in the first type PDSCH, a C-RNTI allocated when the UE is in the previous RRC connected state, a Paging UE-Identity, and an RA-RNTI.

In the exemplary embodiment of the present disclosure, the PDCCH may indicate a UE action. For example, the PDCCH may indicate the UE to receive the PDSCH scheduled by the PDCCH (for example, the PDCCH indicates that a DCI includes paging message scheduling information), or only receive the PDCCH (for example, the PDCCH indicates that the DCI includes a short message but does not include paging message scheduling information). For example, the PDCCH indicates the UE to perform contention-based random access, or perform contention-free random access. For example, the PDCCH indicates the UE to perform 4-step RACH or 2-step RACH. For example, the PDCCH indicates the UE to perform transmission in an RRC idle/inactive state, or establish RRC connection. For example, the PDCCH indicates whether the PDSCH includes downlink data therein. For example, the PDCCH indicates whether the PDSCH includes downlink control information scheduling downlink data or the like therein. If the PDCCH corresponds to a group of UEs, the actions of the group of UEs are the same. Or, if the PDCCH includes action indications of a plurality of sub-groups of UEs which are further divided from a group of UEs, the actions of the UEs in each sub-group are the same, but actions of the UEs in different sub-groups may be different.

In the exemplary embodiment of the present disclosure, in the first search space, the predefined downlink signal may be a wake up signal (WUS). In one PO, or start from X slots/sub-slots/symbols/absolute time before one PO, the base station may transmit a WUS. The base station may allocate the same one WUS or a group of WUSs to one UE or a group of UEs. Alternatively, the WUS indicates the UE action. For example, different actions of a UE may be indicated by different WUS sequences. Or, different actions of a UE may be determined by different WUS sequences and the indications in the PDCCH. For example, the base station may configure a plurality of tables, each table corresponds to one WUS sequence or UE group, and each table includes X UE actions. A UE may determine which table and determine which UE action in this determined table through a WUS sequence and a bit of log 2(X) in the PDCCH.

Specifically, if the base station does not indicate a UE action in the PDCCH or the WUS, the UE may operate in accordance with a standard predefined action.

In addition, the PDCCH or the WUS may indicate search space information, for example, second search space resource information and a search space ID may be configured for a UE by a base station in a connected state. Herein, the ID of the second search space may be indicated explicitly, implicitly, or in a combination of explicitly and implicitly by the PDCCH or the WUS. For example, the ID of the second search space may be determined according to a position of a first CCE (Control Channel Element) of the PDCCH.

In step S102, a first type PDSCH is received according to the PDCCH received in the first search space.

If the UE receives the PDCCH in step S101, and the PDCCH indicates that the UE action includes receiving the PDSCH, then in step S102, the UE receives the first type PDSCH according to the PDCCH. The first type PDSCH is a PDSCH carrying a paging message.

In the exemplary embodiment of the present disclosure, the first type PDSCH may include downlink data.

In the exemplary embodiment of the present disclosure, the first type PDSCH may include at least one item: PRACH resource information, second type PDSCH resource information, HARQ-ACK resource information, transmission mode information, a first type RNTI, and second search space resource information.

In the exemplary embodiment of the present disclosure, after the first type PDSCH is received, the downlink transmission method further includes: according to the first type PDSCH, determining at least one mode of following transmission modes: performing EDT in an RRC idling/inactive state, performing MT-EDT in an RRC idling/inactive state, performing MO-EDT in an RRC idling/inactive state, establishing an RRC connection, performing contention-based random access, performing contention-free random access, performing 4-step random access channel or 2-step random access channel, returning to a specific transmission process when a predefined condition is satisfied.

In the exemplary embodiment of the present disclosure, the PRACH resource information may be determined according to the first type PDSCH.

In the exemplary embodiment of the present disclosure, the second type PDSCH resource information may be determined according to the first type PDSCH.

In the exemplary embodiment of the present disclosure, the HARQ-ACK resource information may be determined according to the first type PDSCH.

In the exemplary embodiment of the present disclosure, the first type RNTI may be determined according to the first type PDSCH.

In the exemplary embodiment of the present disclosure, the second search space may be determined according to the first type RNTI.

In the exemplary embodiment of the present disclosure, the PRACH resource information included in the first type PDSCH may include at least one item of: a preamble index, a number of repetitions of a preamble, a PRACH format, a PRACH time-frequency resource, a synchronization signal for determining a RACH occasion, and broadcast channel SS/PBCH information.

In the exemplary embodiment of the present disclosure, in the first type PDSCH, the base station may indicate the UE to transmit the PRACH resource information of the, and/or transmit the second type PDSCH resource information of the, and/or resource information for feeding back an HARQ-ACK, and/or transmit the downlink data included in a first PDSCH.

In addition, in the first type PDSCH, the base station may indicate the UE action. Specifically, the first type PDSCH may indicate a transmission mode: the UE performing transmission in an RRC idle/inactive state, or establishing RRC connection. Specifically, the first type PDSCH may further indicate the UE to perform contention-based random access, or to perform contention-free random access. Specifically, the first type PDSCH may further indicate the UE to perform 4-step RACH or 2-step RACH. Specifically, the first type PDSCH may further indicate the transmission mode of the UE in the RRC idle/inactive state. For example, the transmission mode performed by the UE in the RRC idle/inactive state is an MT-EDT based transmission mode or a MO-EDT based transmission mode. Specifically, the first type PDSCH may further indicate the UE to return to the contention-based random access process when the predefined condition is satisfied. For example, the UE returns to the contention-based random access process when the UE does not receive any PDCCH within a time window T2 after transmitting the PRACH. Specifically, the transmission mode may be indirectly indicated according to whether the first type PDSCH includes specific information therein. For example, if the first type PDSCH includes specific PRACH resource information and/or the first type RNTI, the transmission method is MT-EDT based transmission in the RRC idle/inactive state; and if the first type PDSCH does not include the specific PRACH resource information, the transmission mode is MO-EDT based transmission in the RRC idle/inactive state. Specifically, if the first type PDSCH does not include information indicating the UE action, the UE may operate according to a standard predefined action, for example, entering a random access process and establishing or resuming the RRC connection.

In the exemplary embodiment of the present disclosure, the first type PDSCH may include the PRACH resource information.

Herein, the PRACH resource information included in the first type PDSCH may include at least one item of: a preamble index, a number of repetitions of a preamble, a PRACH format, and a PRACH time-frequency resource. For example, the time resource of the PRACH included in the first type PDSCH is a time resource starting relative to an end symbol of the first type PDSCH received in step S102 or a first symbol after X slots and/or symbols of a downlink time unit boundary where the end symbol is located and having a length of Y symbols, and the PRACH frequency domain resource is from $m^{th}$ PRB to $n^{th}$ PRB.

In addition, the PRACH resource information included in the first type PDSCH includes PRACH resource information of an SS/PBCH index, and is used for determining a RACH occasion for transmitting the PRACH. Herein, the RACH occasion corresponds to the SS/PBCH index. Specifically, the SS/PBCH index information may be indicated by an N bit. Herein, a specific N-bit value represents that the SS/PBCH index corresponding to RACH occasion is the same as an SS/PBCH index corresponding to the received paging message. For example, when the N-bit value is 0, it indicates that the SS/PBCH index corresponding to the RACH occasion is the same as the SS/PBCH index corresponding to the received paging message. When the value of N bit is i, it means that the SS/PBCH index corresponding to the RACH occasion is i.

In addition, the PRACH resource information included in the first type PDSCH may further include power control information, for instance, parameters for example, preamble Received Target Power etc.

In the exemplary embodiment of the present disclosure, when the UE is in the RRC connected state, the PRACH resource of the UE may be configured by the base station. The PRACH resource is not released when the RRC connection is released by the UE. The base station indicates the UE to transmit the PRACH by adopting the configured PRACH resource in the first type PDSCH. The UE transmits the PRACH according to the above indicated PRACH resource. The base station may indicate whether the UE adopts the configured PRACH resource to transmit the PRACH in the first type PDSCH.

In the exemplary embodiment of the present disclosure, the base station may configure multiple sets of RACH resources to the UE when the UE is in the RRC connected state. The PRACH resource is not released when the RRC connection is released by the UE. The base station may indicate which set of resources the UE adopts to transmit the PRACH in the first type PDSCH.

In the exemplary embodiment of the present disclosure, the UE may determine a PRACH time-frequency code resource and determine a valid PRACH occasion for transmitting the PRACH, according to the above indicated PRACH resource and PRACH resource configuration information indicated in system information or cell specific signaling of a service cell (a resident cell in an RRC idle state) of the UE in the RRC idle/inactive state. Further, in order to shorten time delay, the PRACH occasion selected by the UE is a first valid PRACH occasion that satisfies predefined time delay after the end of the first type PDSCH received in step S102. The predefined time delay is predefined by a standard, or configured by the base station.

In the exemplary embodiment of the present disclosure, when the PRACH resource information is included in the first type PDSCH, the base station may indicate whether the PRACH resource is contention-based or specific to one UE by using a predefined value. For example, if a value of the preamble index is set to be 0, the PRACH resource is contention-based, the UE will perform a 4-step contention-based random access process or a 2-step contention-based random access process.

In the exemplary embodiment of the present disclosure, an RNTI may be included in the first type PDSCH, which is used for subsequent steps in the current communication process of the UE in the RRC idle/inactive state. Specifically, if the UE does not change the service cell (resident cell in the RRC idle state) and the UE does not receive a new RNTI, the UE may continue to use this RNTI in a next communication process in the RRC idle/inactive state. The UE may receive the PDCCH according to the RNTI. For example, the RNTI is used for CRC scrambling of the PDCCH to determine a DMRS (Demodulation Reference Signal) sequence. For example, the UE may determine a start point of the UE-specific search space. For example, the UE may scramble the PUSCH, or PUCCH, or the second type PDSCH according to the RNTI, and the UE may determine the DMRS sequence according to a predefined RNTI. For convenience of description, this kind of RNTI may be referred to as a first type RNTI.

In the exemplary embodiment of the present disclosure, the first type PDSCH may include second search space information therein. Specifically, the second search space information may include at least one kind of: a search space ID, time resource information (for example, a cycle, an offset, time duration, symbols occupied within a time unit, etc.), frequency domain resource information (for example, the occupied PRBs), space resource information (for example, QCL/TCI information, precoding size, etc.), CCE-REG-mapping information, PDCCH DMRS information, aggregation level information of a search space, monitored candidates information, and DCI format information.

In the exemplary embodiment of the present disclosure, when the UE is in the connected state, the search space resource information and the search space ID for the UE may be configured by the base station. The search space resource information and the search space ID are not released when the RRC connection is released by the UE. The UE may indicate the second search space information by combining the indication of the first type PDSCH and the information configured by the base station for the UE when the UE is in the connected state. For example, the base station may indicate the second search space information according to the information configured for the UE when the UE is in the connected state and the search space ID indicated by the first type PDSCH. The indication may be explicitly, implicitly, or a combination thereof.

In the exemplary embodiment of the present disclosure, the second type PDSCH resource information is indicated in the first type PDSCH. Therefore, the UE may skip step S103 and step S104 and directly proceed to step S105, after receiving the first type PDSCH in step S102. Therefore, the UE still proceeds to step S103, after receiving the first type PDSCH in step S102. For example, if the PRACH time resource configured by the base station is earlier than the time resource of the second type PDSCH, the base station may determine the cell in which the UE is located after receiving the PRACH, and only transmit the second type PDSCH carrying downlink data in the determined cell to thereby prevent the base station from transmitting the second type PDSCH in multiple cells.

In the exemplary embodiment of the present disclosure, when the UE is in the RRC connected state, the base station configures multiple sets of resource information for PDSCH for the UE, the resource information for PDSCH at least includes the PDSCH time-frequency resource, transmission block TB information carried by the PDSCH (for example, MCS information), and reference symbol information etc. The resource information for PDSCH is not released when the RRC connection is released by the UE. The base station may indicate the UE performs the PDSCH reception according to which set of PDSCH resources in the first type PDSCH. The UE may perform the PDSCH reception according to a set of PDSCH resources indicated by the base station. Specifically, a set of partial PDSCH resource information may be configured by the base station when the UE is in the RRC connected state, and the PDSCH resource information is not released when the RRC connection is released by the UE. The base station may enable the first type PDSCH include the remaining resource information. The UE may determine the second type PDSCH resources according to two kinds of information.

In the exemplary embodiment of the present disclosure, when the UE is in the RRC connected state, the base station configures multiple sets of PDSCH resource information for the UE, the PDSCH resource information at least includes the PDSCH time-frequency resource, transmission block TB information carried by the PDSCH (for example, MCS information), reference symbol information, and corresponding SS/PBCH information etc. Regarding one SS/PBSCH, there are multiple sets of PDSCH resource information. The PDSCH resource information is not released when the RRC connection is released by the UE. The base station may indicate the UE performs the PDSCH reception according to which set of PDSCH resource in the first type PDSCH. The UE may perform the PDSCH reception according to an index number i of the SS/PBCH corresponding to the received first type PDSCH and the PDSCH resource information indicated by the base station.

In addition, the first type PDSCH may include QCL (quasi-co-located) characteristic of the second type PDSCH, for example, with which SS/PBCH the QCL relationship is satisfied.

In the exemplary embodiment of the present disclosure, the first type PDSCH includes the HARQ-ACK resource information therein. Specifically, the HARQ-ACK information is carried by a PUCCH, or a PRACH.

Specifically, the base station may configure multiple sets of PUCCH resource information or PRACH resource information for the UE when the UE is in the RRC connected state. The PUCCH resource information or the PRACH resource information is not released when the RRC connection is released by the UE. The base station may indicate one set of resources in the first type PDSCH. The indication may be explicitly, implicitly, or a combination thereof. The UE may transmit the PUCCH or PRACH according to the indicated set of resources.

Specifically, the signaling for the PUCCH or PRACH and the signaling for configuring the PUCCH or PRACH resource in the RRC connected state may be the same, and the base station may also indicate whether the resource is only used for one or both of the purposes. In addition, the configuration signaling may be two different signalings, for example, different fields (IE) are adopted by the two different signalings or the two different signalings are configured in different RRC messages or system messages.

Specifically, the PRACH resource for carrying the HARQ-ACK is the same as the PRACH resource for transmitting the PRACH. In addition, the PRACH resource for carrying the HARQ-ACK and the PRACH resource for transmitting the PRACH may be configured respectively.

In the exemplary embodiment of the present disclosure, the first type PDSCH may carry downlink data therein. At this time, the UE skips steps S103 to S105 and directly proceeds to step S106, after receiving the first type PDSCH in step S102.

Specifically, the UE may enter a dormant state if no first type PDSCH applicable to itself is monitor by the UE. The UE may monitor the PDCCH in the second search space within a predefined time window if no first type PDSCH applicable to itself is monitor by the UE.

In step S103, the PRACH is transmitted according to the first type PDSCH.

The UE transmits the PRACH in step S103 when the UE finds out information matching itself in the first type PDSCH in step S102. At this time, the UE needs to determine information for example, the PRACH resource, transmitting timing, power control and the like.

If one user-specific PRACH resource is allocated to the UE by the base station when the UE is in the connected state, and this PRACH resource is not released when the RRC connection is released by the UE, the UE transmits the PRACH on this PRACH resource in step S103.

If one PRACH resource is indicated in the first type PDSCH in step S102, the UE transmits the PRACH on this PRACH resource in step S103.

If contention-based PRACH resource is indicated in the first type PDSCH in step S102, the UE selects one PRACH resource according to the PRACH resource set configured in the system information and a predefined rule to transmit the PRACH in step S103. Herein, the signaling for configuring the PRACH resource set used in the downlink transmission in the RRC idle/inactive state and the signaling for configuring the PRACH resource set used to configure the initial access may be the same, and the base station may also indicate whether the PRACH resource set is used for only one or both of the purposes. In addition, the signaling for configuring the PRACH resource set used in the downlink transmission in the RRC idle/inactive state and the signaling for configuring the PRACH resource set used to configure the initial access may be two different signalings, for example, different fields (IE) are adopted by the two different signalings or the two different signalings are configured in different system messages.

If the first type PDSCH in step S102 includes PRACH power control information, the UE performs uplink power setting of PRACH according to power control parameters indicated by the PRACH power control information included in the first type PDSCH in step S103. If the PRACH power control information is not included in the first type PDSCH, the uplink power setting of PRACH is performed according to power control parameters indicated in the system information. Specifically, signaling for configuring the PRACH transmitting power in step S103 and signaling for configuring the PRACH transmitting power of initial access may be the same, and the base station may also indicate whether the configuration is used for only one or both of the purposes. In addition, the configuration signaling may be two different signalings, for example, different fields (IE) are adopted by the two different signalings or the two different signalings are configured in different RRC messages or system messages.

Specifically, the PRACH resource configured for the UE by the base station may be used for only one uplink transmission. In addition, the PRACH resource configured for the UE by the base station may be used for multiple uplink transmission. For example, the base station configures multiple PRACH resources for the UE, and parameters of each resource may be independently configured, or the base station configures one PRACH resource for the UE and indicates information of multiple transmitting locations, for example, time difference between the multiple transmitting locations, and the number of transmitting locations, or the maximum number of times that the UE may transmit the PRACH, or the PRACH resource is determined according to the PRACH transmitting occasion. The UE startups a time window T1 (or timer T1) after transmitting the PRACH for the first time, and transmits the PRACH on another (for example, a second) PRACH resource if corresponding downlink response is received by the UE after the time window T1 (or timer T1) returns to 0, and so on. If the number of times the UE transmits the PRACH has reached a predefined maximum number of times, the UE may no longer attempt to transmit the PRACH.

Specifically, if no corresponding downlink response is received by the UE within a time window T2 (or timer T2) after transmitting the PRACH, the UE may return to the contention-based random access process. Specifically, the PRACH resource adopted in the contention-based random access process used for downlink transmission in an RRC idle/disconnected state and the PRACH resource adopted for establishing the RRC connection may be configured separately. Specifically, in the contention-based random access process used for downlink transmission in the RRC idle/disconnected state, the base station may carry downlink data in Msg4 of the random access process.

Specifically, the time windows T1 and T2 are configured separately, or the two time windows are the same. The time windows T1 and T2 are configured through specific signaling broadcast configuration of a cell system information block, instead of a ra-Response Window Size of an existing system, or a ra-Response Window Size of a reuse existing system (or reusing the ra-Response Window Size of the existing system), or configured through high-level signaling when the UE in the RRC connected state.

In the exemplary embodiment of the present disclosure, the PRACH information may be determined by combining various kinds of signaling when the various kinds of signaling all configure the PRACH.

Specifically, which kind of signaling determining the PRACH information is determined according to a predetermined priority criterion, when various kinds of signaling all configure the PRACH and the PRACH information may be determined only according to one kind of configuration information. For example, if the base station allocates a user-specific PRACH to the UE when the UE is in the connected state, and information of one PRACH is included in the first type PDSCH, the UE may transmit the PRACH according to the PRACH information included in the first type PDSCH.

In the exemplary embodiment of the present disclosure, the PRACH may be transmitted according to downlink timing.

Specifically, the UE may transmit the PRACH according to the maintained valid uplink timing. If the uplink timing maintained by the UE remains valid, the UE may skip step S103 and directly proceed to step S104 after step S102, or skip step S103 and step S104 and directly proceed to step S105.

The UE may determine whether the uplink timing is valid according to one or more items:

(1) the uplink timing is invalid when a Time Alignment Timer of the RRC idle state no longer runs;

(2) the uplink timing is invalid outside a TA Validity Period of the RRC idle state;

(3) the uplink timing is invalid when the service cell (the resident cell in the RRC idle state) changes;

(4) the uplink timing is invalid when a variation in a measurement value of RSRP (Reference Signal Received Power) of the service cell (the resident cell in the RRC idle state) exceeds a predefined threshold;

(5) the uplink timing is invalid when a variation in a measurement value of RSRP of one or more neighboring cells exceeds a predefined threshold;

(6) the uplink timing is invalid when a variation in a Time Difference of Arrival (TDOA) of signals from at least two base stations exceeds a predefined threshold;

(7) the uplink timing is always considered valid when the UE has a tag indicating a stationary characteristic; and (8) the uplink timing is always considered valid when the cell system information indicates that a radius of the cell is less than a predefined threshold.

Herein, for the Time Alignment Timer used to manage the TA, please refer to a time Alignment Timer Common value indicated in the system information, or the Time Alignment Timer used to manage the TA may also be specially configured. For example, an eNB may configure a Time Alignment Timer Dedicated through the first type PDSCH. The UE may acquire TA update signaling during the downlink transmission process in the RRC idle/inactive state. For example, the base station indicates the TA through the PDCCH or the second type PDSCH in the second search space after the UE transmits the PRACH. The UE will restart the Time Alignment Timer after receiving the TA update signaling and adjusting the TA. The UE may still save the uplink timing acquired in the RRC connected state even if the UE enters the RRC idle state, when the Time Alignment Timer is configured to be infinite in the RRC connected state. In practical applications, the UE is almost stationary relatively due to the actual application scenarios of the UE in IOT, and the uplink timing used by the UE to transmit an uplink physical channel is also almost unchanged. When the UE reports its "stationary" characteristic to the base station, the base station will configure the Time Alignment Timer to be infinity according to the "stationary" characteristic, so that the TA acquired by the UE in the RRC connected state can be used all the time, and the TA is still saved and used for uplink channel transmission in the RRC idle/deactivated state when the UE releases the RRC connection and enters the RRC idle/deactivated state.

In the exemplary embodiment of the present disclosure, the base station may configure a BWP to transmit a PRACH, or the base station may limit the UE to transmit a PRACH on an initial BWP, i.e., a UL BWP used at the initial random access indicated in the service cell system information.

Specifically, the UE skips step S103 or skips steps S103 and S104, if the UE action configured by the base station or the UE action indicated in the first type PDSCH is receiving the PDCCH in step S104 or receiving the PDSCH in step S105 according to the paging message.

In step S104, a PDCCH is received in a predefined second search space.

In the exemplary embodiment of the present disclosure, before the PDCCH is received in the second search space, the downlink transmission method further includes: determining the second search space according to at least one mode of: determining the second search space according to configuration information of cell system information, determining the second search space according to UE-specific RRC signaling configuration information, determining the second search space according to the first type PDSCH, determining the second search space by combining various kinds of signaling, and determining the second search space according to a predefined search space.

In the exemplary embodiment of the present disclosure, the receiving of the PDCCH in the second search space may include: receiving the PDCCH according to a first type RNTI or RA-RNTI. Herein, the first type RNTI may be determined by at least one item of: a first type RNTI allocated when the UE is in an RRC connected state, an RNTI included in the first type PDSCH, a C-RNTI allocated when the UE is in the previous RRC connected state, a Paging UE-Identity, and an RA-RNTI.

In the exemplary embodiment of the present disclosure, the PDCCH received in the second search space may include at least one item of: PDSCH scheduling information, uplink timing adjustment information, uplink channel information for feeding back an HARQ-ACK, first type RNTI information, and an indication of a UE transmission mode.

In the exemplary embodiment of the present disclosure, the indication of the UE transmission mode may include: an indication of transmitting the PRACH, an indication of receiving the PDSCH, and an indication of feeding back the HARQ-ACK through the PRACH or the PUCCH.

In the exemplary embodiment of the present disclosure, different indication contents may be distinguished by a separate bit field in a DCI of the PDCCH in the second search space, or different indication contents may be distinguished by a specific bit value/value combination in the DCI of the PDCCH in the second search space, or different indication contents may be distinguished by performing CRC scrambling on the PDCCH in the second search space through different RNTIs, or different indication contents may be distinguished through different DCI formats.

In the exemplary embodiment of the present disclosure, the contention-based random access process is returned to when a corresponding downlink response is not received in the second search space within the time window, or a specific PRACH is retransmitted when the corresponding downlink response is not received in the second search space within the time window, or the dormant state is entered when the corresponding downlink response is not received in the second search space within the time window.

The second search space is used to receive the PDCCH scrambled by the first type RNTI, and/or the second search space is used to receive the PDCCH scrambled by the RA-RNTI.

If the second search space is configured by the base station through the cell system information broadcast, the second search space may be determined according to the configuration information. The second search space may be determined according to the configuration information if the second search space is configured by the base station through the UE-specific RRC signaling. For example, the base station may perform configuration through the UE-specific RRC signaling when the UE is in the RRC connected state, and the resource information is not released when the RRC connection is released by the UE.

The second search space may be determined according to the indicated information if the second search space is configured in the first type PDSCH in step S102.

In the exemplary embodiment of the present disclosure, the second search space may be determined by combining various kinds of signaling when the various kinds of signaling all configure second search space. For example, the second search space may be determined according to the combination of the configuration in the first type PDSCH and the configuration of the cell system information broadcast. For example, the second search space may be determined according to the UE-specific parameters and the specific search space parameters.

In the exemplary embodiment of the present disclosure, when the second search space is configured in various kinds of signalings and the second search space may be determined according to only one kind of configuration information, determining the second search space according to which kind of signaling is determined according to a predetermined priority criterion. For example, when the second search space is configured by the base station both through the first type PDSCH and through the cell system information broadcast, the second search space is determined according to the configuration in the first type PDSCH. For example, when the second search space is configured by the base station both through the first type PDSCH and through the UE-specific RRC signaling, the second search space is determined according to the configuration in the first type PDSCH. For example, when the second search space is configured by the base station both through the first type PDSCH and through the cell system information broadcast, the second search space is determined according to the configuration in the first type PDSCH.

In the exemplary embodiment of the present disclosure, the signaling for configuring the second search space and signaling for configuring other search spaces may be the same, and the base station may also indicate whether the search space is used for only one or both of the purposes. In addition, the signaling for configuring the second search space and the signaling for configuring other search spaces may be two different signalings, for example, different fields (IE) are adopted by the two different signalings or the two different signalings are configured in different RRC messages or system messages.

In the exemplary embodiment of the present disclosure, parameters of the second search space are selectively configured, and the UE may use a search space for predefined usage as the second search space if the second search space is not configured by the base station. For example, the search space for predefined usage may be a corresponding search space (RA-search space) for receiving random access, a search space (the first search space) for monitoring paging control information, a search space (search space SIB1) for receiving SIM system information, or a search space 0 (Search Space zero). If a Control Resource Set (CORESET) corresponding to the second search space is not configured by the base station, the UE may use a CORESET for predefined usage as the CORESET corresponding to the second search space. For example, the CORESET for predefined usage may be a CCORESET of a Type1-PDCCH CSS for random access, a Type2-PDCCH CSS for paging, or a CORESET of a Type-0 PDCCH CSS.

In the exemplary embodiment of the present disclosure, the second search space is determined according to the search space for predefined usage, if the first type PDSCH in step S102 does not include the second search space information. For example, the second search space is determined according to the RA-search space for random access response indicated in the system information. Further, if the second search space is configured by the base station for the UE when the UE is in a connected state and the service cell of the UE does not change, the UE determines the second search space according to the configured information; and if the service cell of the UE changes, the UE determines the second search space according to the search space for predefined usage, for example, a RA-search space.

In the exemplary embodiment of the present disclosure, the PDCCH in the second search space may be scrambled by using the first type RNTI or the RA-RNTI, that is, the RA-RNTI is determined according to the PRACH resource transmitted in step S103.

If the first type RNTI is configured by the base station, for example, the first type RNTI is configured through the first type PDSCH, through the UE-specific RRC signaling, or through the cell system information broadcast, the first type RNTI may be determined according to the configuration of the base station. When the first type RNTI is configured by the base station through various kinds of signaling, the first type RNTI may be determined according to one kind of the signaling in accordance with a predefined priority rule, or the first type RNTI may be determined by combining various kinds of signaling.

In addition, the first type RNTI may be jointly determined by combining the first type RNTI information included in the first type PDSCH and other information (for example, the PRACH information or Paging UE-Identity).

Herein, parameters of the first type RNTI may be selectively configured. If the first type RNTI is not configured by the base station, the first type RNTI may be determined by a C-RNTI allocated when the UE is in the previous RRC connected state. Or, the first type RNTI may be determined by a Paging UE-Identity, for example, the first type RNTI may be determined according to an NG-5G-S-TMSI, or an I-RNTI-Value, or a Short I-RNTI-Value, and a predefined function. Or, the first type RNTI may be determined by the RA-RNTI. Or, the first type RNTI may be determined jointly by the Paging UE-Identity and the PRACH resource.

Herein, a valid time of the first type RNTI may be configured. For example, the RNTI becomes invalid after a predefined time length starting from the reception of the first type RNTI has passed. For another example, the previous first type RNTI continues to be valid until the UE receives first type RNTI information again.

In the exemplary embodiment of the present disclosure, the PDCCH in the second search space may include the PDSCH scheduling information, for example, the PDSCH resource information, the HARQ information and the like.

In the exemplary embodiment of the present disclosure, the PDCCH in the second search space may include the uplink timing adjustment information (Timing advance).

In the exemplary embodiment of the present disclosure, the PDCCH in the second search space may include the HARQ-ACK feedback uplink channel information, for example, the PUCCH or PRACH or PUSCH information.

In the exemplary embodiment of the present disclosure, the PDCCH in the second search space may include the first type RNTI information. At this time, the first type RNTI may be determined jointly by combining the first type RNTI information included in the PDCCH and other information (for example, the PRACH information or Paging UE-Identity) in the second search space.

In the exemplary embodiment of the present disclosure, the PDCCH in the second search space may include the indication of the UE action. Specifically, the PDCCH may trigger the UE to transmit the PRACH, or the PDCCH may indicate the UE to receive the PDSCH. The PDCCH may indicate a specific PRACH resource, for example, the ra-Preamble Index indicated in the PDCCH has a non-zero value, or the PDCCH may indicate the UE to select a PRACH resource from the PRACH set according to a predefined rule (for example, when the ra-Preamble Index value indicated in the PDCCH is zero), and the UE performs a contention-based random access process. In addition, the PDCCH may also indicate the UE to transmit an HARQ-ACK through the PRACH or PUCCH. Also, different indication contents are distinguished by a separate bit field in a DCI of the PDCCH, or different indication contents are distinguished by a specific bit value/value combination in the DCI of the PDCCH, or different indication contents are distinguished by performing CRC scrambling on the PDCCH through different RNTIs, or different indication contents are distinguished through different DCI formats or through different search spaces. For example, a PDCCH for determining uplink timing is located in the second search space, and a PDCCH for scheduling a PDSCH carrying data is located in a search space C.

In the exemplary embodiment of the present disclosure, after transmitting the PRACH, the UE may return to the contention-based random access process, if no corresponding downlink response is received in the second search space within the time window T2 (or timer T2). Herein, the PRACH resource adopted in the contention-based random access process used for downlink transmission in the RRC idle/disconnected state and the PRACH resource adopted for establishing the RRC connection may be configured separately.

In addition, after transmitting the PRACH, the UE may retransmit the specific PRACH, if no corresponding downlink response is received in the second search space within the time window T1 (or timer T1). And so on. If the number of times the UE transmits the PRACH has reached a predefined maximum number of times, the UE may no longer attempt to transmit the PRACH.

In step S105, the second type PDSCH is received according to the PDCCH received in the second search space.

In the exemplary embodiment of the present disclosure, the second type PDSCH resources are determined according to the PDSCH resource information included in the PDCCH, the PDSCH resource information included in the first type PDSCH, or at least one set of PDSCH resource information configured by the base station in the RRC connected state, or the second type PDSCH resources are determined according to the PRACH.

In the exemplary embodiment of the present disclosure, the second type PDSCH may include at least one item of: downlink data, uplink channel information for carrying an HARQ-ACK, uplink timing adjustment information, uplink scheduling information, downlink control information, and a first type RNTI. Herein, the second type PDSCH is scrambled according to the first type RNTI, and/or the RA-RNTI, and/or a cell ID, and/or a sequence determined by the PRACH.

In the exemplary embodiment of the present disclosure, after the second type PDSCH is received, the downlink transmission method may further include: monitoring a PDCCH in the second search space within a predetermined time window. Herein, the predetermined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

In the exemplary embodiment of the present disclosure, in the predetermined time window, the UE may receive at least one of the following items transmitted by the base station: downlink control channel resource configuration information, PRACH configuration information, uplink channel configuration information for HARQ-ACK feedback, scheduling information of the second type PDSCH, PUSCH scheduling information, transmission method indication information, PRACH transmission triggering information, triggering information for the contention-based random access process, indication information for entering a dormant state.

In the exemplary embodiment of the present disclosure, the UE may enter the dormant state when no PDCCH is received within the predetermined time window or the indication information for entering the dormant state is received.

The UE may receive the second type PDSCH according to the PDCCH received in step S104. Or, the UE may receive the second type PDSCH according to the indication information (or the indication) included in the first type PDSCH received in step S102. Or, the UE may receive the second type PDSCH according to a set of PDSCH configured by the base station in the RRC connection state (the PDSCH resource information is not released when the RRC connection is released by the UE).

In the exemplary embodiment of the present disclosure, the UE may determine the second type PDSCH resources according to the configuration of the PDCCH, the first type PDSCH, or the RRC connected state.

In the exemplary embodiment of the present disclosure, the UE may determine one or more second type PDSCH resources according to the PDCCH, the first type PDSCH, or the configuration of the RRC connected state. For example, similar to a DL SPS of the connected state, the second type PDSCH resources appear periodically. The base station further configures the number L of the second type PDSCH resources. Thus, the UE may attempt to receive the PDSCH on L continuous second type PDSCH resources.

If the base station includes a set of PDSCH resource information in the first type PDSCH, the UE may perform PDSCH reception according to the PDSCH resources indicated by the included PDSCH resource information. When the UE is in the RRC connected state, the base station configures multiple sets of PDSCH resource information to the UE, which at least includes a PDSCH time-frequency resource, transmission block TB information carried by the PDSCH (for example, MCS information), reference symbol information, and corresponding SS/PBCH information etc. Regarding an SS/PBSCH, there is only one set of PDSCH resource information. The UE may determine a set of PDSCH resources corresponding to an index number i of the SS/PBCH according to the index number i of the SS/PBCH corresponding to the received first type PDSCH. The UE may perform the PDSCH reception according to this set of PDSCH resources. If a set of PDSCH resource information is configured for the UE by the base station when the UE is in the RRC connected state, the UE may perform PDSCH reception according to this set of PDSCH resources.

In the exemplary embodiment of the present disclosure, the UE may determine the PDSCH resource information according to the PRACH transmitted in step S103. That is, the PRACH resource and the PDSCH resource satisfy a predefined relationship.

If the PDCCH received in step S104 indicates spatial characteristics of the second type PDSCH, the UE may receive the second type PDSCH according to the indicated spatial characteristics. If there is no indication, the second type PDSCH may be received according to the spatial characteristics of the received PDCCH, or the second type PDSCH may be received according to the spatial characteristics of the received first type PDSCH.

In the exemplary embodiment of the present disclosure, the second type PDSCH received by the UE in step S106 may be QCL with the first type PDSCH received in step S102.

Specifically, if QCL characteristics of the second type PDSCH are indicated in the first type PDSCH received in step S102, the UE may perform the PDSCH reception according to the index number i of the SS/PBCH indicated in the first type PDSCH and the PDSCH resource information indicated by the base station. If the QCL characteristics of the second type PDSCH are not indicated in the first type PDSCH, the UE may receive the second type PDSCH according to the spatial characteristics of receiving the first type PDSCH, that is, the first type PDSCH is considered to be QCL with the second type PDSCH.

In the exemplary embodiment of the present disclosure, the second type PDSCH may include downlink data.

In the exemplary embodiment of the present disclosure, the second type PDSCH may include the uplink channel information used for the HARQ-ACK feedback.

In the exemplary embodiment of the present disclosure, the second type PDSCH may include the uplink timing adjustment information (Timing advance).

In the exemplary embodiment of the present disclosure, the second type PDSCH may include uplink scheduling information (UL grant). For example, the UE may determine a PUSCH resource for carrying the ACK feedback of the second type PDSCH according to the UL scheduling information. In this case, the UE does not need to transmit an HARQ-ACK on the PUCCH or PRACH. The base station determines that the second type PDSCH is demodulated correctly by receiving the PUSCH transmitted by the UE.

In the exemplary embodiment of the present disclosure, the second type PDSCH may include downlink control information. The downlink control information indicates third type PDSCH resource information. The third type PDSCH includes downlink data. For example, the second type PDSCH is an RAR PDSCH, wherein the MAC RAR includes the downlink control information scheduling the third type PDSCH. Different from normal downlink scheduling, a time delay between the second type PDSCH and the third type PDSCH scheduled by the downlink control information in the second type PDSCH tends to be greater. Because the normal downlink schedule is that the PDCCH schedules the PDSCH, but here downlink schedule is that the PDSCH schedules PDSCH. Since a processing time delay for the UE to demodulate the PDSCH is greater than a processing time delay for demodulating the PDCCH, and the UE also needs to demodulate the MAC RAR to obtain downlink control information, the processing delay is further increased. In order to distinguish these two kinds of downlink schedule, it is reasonable to define time differences between the downlink control information and the PDSCH, respectively. For example, when a PDSCH time domain resource allocation table is not configured by the base station, a PDSCH time resource is determined using a standard pre-defined table, wherein a slot parameter K0 is used to indicate a slot where the PDSCH is located, and this value is applicable to the PDSCH scheduled by the PDCCH. In addition, the slot where the third type PDSCH is located is determined according to the parameter K0 and an additional slot delay $\Delta$. Assuming that a slot where an end symbol of the second type PDSCH containing the downlink control information is located is a slot n, the slot where the third type PDSCH is located is n+K0+$\Delta$. Alternatively, a value of $\Delta$ is predefined by a standard. Alternatively, the value of $\Delta$ is associated with a subcarrier spacing. Alternatively, the value of $\Delta$ is associated with a UE type, for example, $\Delta$ of a UE having lower processing capacity and $\Delta$ of a UE having higher processing capacity are defined, respectively. Alternatively, the value of $\Delta$ is associated with an SS/PBCH block and a CORESET multiplexing pattern.

When the MAC RAR in the second type PDSCH includes the downlink control information scheduling the third type PDSCH, the downlink control information at least includes at least one item of: a time resource, a frequency domain resource, modulation coding, mapping of a virtual RB (resource block) to a physical RB, an HARQ-ACK feedback time delay K1, a PUCCH resource. Alternatively, in order to reduce downlink control information overhead, bits in a modulation coding scheme (MCS) field are less than those in an MCS field in the PDCCH scheduled by the PDSCH. For example, if four MCS levels are predefined by the standard for the third type PDSCH scheduled by the second type PDSCH, the MCS field of the second type PDSCH only needs two bits.

Alternatively, whether the MAC RAR in the second type PDSCH includes the downlink control information is indicated by a specific bit in the MAC RAR. As shown in Table 1, a first bit in the MAC RAR indicates whether the MAC RAR includes downlink control information (DL grant) or uplink scheduling information (UL grant), and a Timing Advance Command refers to an uplink timing command, and may be referred to as TAC. Alternatively, the number of bits of the DL grant is the same as that of the UL grant, so as to avoid changing a MAC RAR size. For another example, the specific bit in the MAC RAR indicates whether the MAC RAR includes the DL grant, or the DL grant and the UL grant, or indicates whether the MAC RAR includes the DL grant, or the DL grant and the UL grant, or the UL grant. Alternatively, the above information is indicated by a subheader of aMAC sPDU. Alternatively, the above information is jointly indicated by the subheader of the MAC sPDU and the specific bit in the MAC RAR. Alternatively, whether the MAC RAR in the second type PDSCH includes the downlink control information is indicated by the first type PDSCH. For example, it is indicated explicitly in the first type PDSCH, or indicated implicitly by the PRACH resource in the first type PDSCH.

TABLE 1

| R=1: DL grant |
| R=0: UL grant |
| ↑ |
| R                  Timing Advance Command |
| Timing Advance Command       UL Grant |
| UL Grant |
| UL Grant |
| UL Grant |
| TC-RNTI |
| TC-RNTI |

In the exemplary embodiment of the present disclosure, the second type PDSCH may indicate the first type RNTI. The first RNTI may be indicated explicitly by a bit in the PDSCH, or determined implicitly by the PDSCH resource, or indicated in a combination of explicitly and implicitly.

In the exemplary embodiment of the present disclosure, the second type PDSCH indicates a TC-RNTI (Temporary C-RNTI), and the UE uses the TC-RNTI as the first type RNTI for downlink transmission in the RRC idle/inactive state next time, for example, scrambling of the PDCCH for scheduling downlink data retransmission, or scrambling of the PDSCH for carrying the downlink data. For example, the PDCCH scheduling the second type PDSCH is scrambled by the RA-RNTI, and the second type PDSCH is an RAR PDSCH, and the second type PDSCH includes a MAC RAR. The UE uses a TC-RNTI in its own MAC RAR as the first type RNTI for downlink transmission in the RRC idle/inactive state next time, and it is considered that the random access process is complete.

The base station does not need to carry the first type RNTI in the first type PDSCH through the above two ways to thereby save overhead of the paging messages.

In the exemplary embodiment of the present disclosure, the second type PDSCH may be scrambled according to the first type RNTI or the RA-RNTI and/or the cell ID, or may be scrambled according to the sequence determined by the PRACH transmitted in step S103, for example, a sequence is determined according to time, frequency domain, codeword information and the like of the PRACH.

When the second type PDSCH is scrambled according to the RA-RNTI, or the PDCCH scheduling the second type PDSCH is scrambled according to the RA-RNTI, the UE needs to find out its content in the second type PDSCH, for example, the downlink data of the UE, and/or the downlink control information scheduling the third type PDSCH of the UE, a time advance indication (TA Command), a TC-RNTI, and the like. The UE may find out an initial position of a corresponding subPDU according to sizes of one or more subPDUs of Medium Access Control Protocol Data units (MAC PDU), read MAC subheader and MAC RAR therefrom, and determines whether a subPDU belongs to the UE and content of the MAC RAR in the subPDU that belongs to the UE. The UE determines whether the MAC subPDU belongs to the UE according to the indication in the subheader of the MAC subPDU, for example, whether a random access preamble ID (RAPID) in the subheader is the same as a PRACH Preamble ID transmitted by the UE. If the same, the UE reads the MAC RAR in the MAC subPDU, and acquires the downlink data, and/or downlink control information, timing advance indication (TA Command), TC-RNTI etc. In proposed embodiments, a size of a MAC RAR is fixed, but there are multiple possibilities for the size of the MAC RAR when the MAC RAR carries the downlink data or downlink control information. A new method is required to enable the UE to determine a size of each detected subPDU, thereby determining the start points of the current and subsequent subPDUs. The UE determines the size of the subPDU and the content in the subPDU, according to one of the following methods:

Method 1: determining the size of the MAC RAR size of the UE according to an indication in the MAC subheader of the MAC PDUs.

A specific bit field in the MAC subheader is used to indicate whether the MAC RAR in the MAC PDU contains data, or contains downlink control information to thereby determine the size of the MAC subPDU.

Further, the size of the data contained in the RAR may be indicated according to the specific bit field in the MAC subheader, so as to determine the size of this MAC subPDU. One or more kinds of data sizes are predefined by a standard, and the specific bit field indicates one kind of the sizes. As shown in Table 2, a length L2 of a subheader equals 16 bits, wherein 9 to 10 bits may indicate four kinds of RAR sizes, for example, 56 (not containing data), X1, X2, and X3. Or, whether the RAR includes the DL grant, or the DL grant and the UL grant is indicated according to the specific bit field in the MAC subheader.

TABLE 2

| E | T | RAPID | | | | | |
|---|---|---|---|---|---|---|---|
| Payload Indicator | | R | R | R | R | R | R |

Alternatively, the size L2 of the MAC subheader is different from a size L1 of a MAC subheader of a UE that does not support MT-EDT transmission. For example, the length L1 of the MAC subheader of the UE of a lower version or the UE that does not support the MT-EDT transmission equals 8 bits; and the length L2 of the MAC subheader of the UE that supports the MT-EDT transmission, or the UE that supports the MT-EDT transmission carrying data in the second type PDSCH equals 16 bits. Alternatively, the UE may be configured to perform the reception of the MAC subheader in accordance with L1 or L2 by the base station, for example, configured by the base station when the UE is in the RRC connected state, or indicated in the first type PDSCH, or indicated in the PDCCH scheduling the second type PDSCH, or indicated by the RAPID of in the previous L1 bits of the subheader. Different subheader lengths correspond to different preamble ID sets.

Alternatively, the base station only places RARs of the UEs of the same subheader length in the same second type PDSCH. The base station may indicate the length of the subheader in the PDCCH scheduling the second type PDSCH. The base station may indicate the length of the subheader through the specific bit field in a PDCCH scheduling a second type PDSCH, or through a method of transmitting PDCCHs of the second type PDSCHs for different subheader lengths in the search space, or scrambling the PDCCHs of the second type PDSCHs using different RNTIs for different subheader lengths, to avoid the influences on the UE of low version.

Alternatively, the base station may place RARs of the UEs of different subheader lengths in the same second type PDSCH. In order to avoid the influences on the UE of low version, the base station places the MAC subPDU of the UE having the subheader length of L1=8 in a first half of the MAC PDU, and places the MAC subPDU of the UE having the subheader length of L2=16 in a second half of the MAC PDU. Further, a UE with a subheader length of L2=16 and a UE with a subheader length of L1=8 have different interpretations on a specific bit field in the first 8 bits of the subheader. For example, when a UE with a subheader length of L1=8 reads a subheader (this subheader may be or may not be the UE's), and when a value of a first bit field E (Extension field) is 0, the UE considers the MAC subPDU of the subheader is a last MAC subPDU of the current MAC PDU; otherwise, the MAC subPDU including this subheader is followed by other MAC subPDUs. When a UE with a subheader length of L2=16 reads a subheader (this subheader is not the UE's), and a value of a first bit field E is 0, the UE considers the MAC subPDU of the subheader is a last MAC subPDU with a subheader length of L1=8 of the current MAC PDU; otherwise, the MAC subPDU including this subheader is followed by other MAC subPDUs with the subheader length of L1=8. For a UE with a subheader length of L2=16, when the bit field E having a value of 0 is read, the UE may assume that if the MAC PDU also contains other MAC subPDUs, the subheader lengths of these MAC subPDUs is L2=16. For a UE with a subheader length of L2=16, it can be determined that whether the MAC subPDU is the last MAC subPDU of the MAC PDU according to the bit field E in the subheader of L2=16, and the RAR size is determined according to the specific bit field of the subheader.

Alternatively, the size of the subheader is the same as a size of a MAC subheader of a UE that does not support MT-EDT transmission. Whether the MAC RAR contains data, or a data size in the MAC RAR is determined according to the RAPID in the MAC subheader. For example, whether to contain the data corresponds to different preamble ID sets. To avoid confusion, the base station places the MAC subPDU of the UE that does not contain data in the MAC RAR in the first half of the MAC PDU and the MAC subPDU of the UE that contains data in the MAC RAR in the second half of the MAC PDU. Similarly, if the UE has learned that its own MAC RAR contains data, for example, it is determined by the Preamble ID allocated by the base station that, when the UE reads a value of the first bit field E of the subheader of the MAC subPDU of the MAC RAR that does not contain data to be 0, the UE considers that the MAC subPDU including this subheader is a last MAC subPDU that does not include data of the current MAC PDU; otherwise, there are other MAC subPDUs that do not include data behind the MAC subPDU including this subheader.

Method 2: The size of the MAC RAR of the UE is determined according to an indication in a MAC RAR in a MAC subPDU among the MAC PDUs.

A specific bit field in a MAC RAR payload is used to indicate whether the RAR contains data, or whether the RAR contains DL grant. As shown in Table 3, whether the RAR includes data is indicated according to a first reserved bit R in the MAC RAR payload. Alternatively, a size of the data contained in the RAR may be indicated according to a specific bit field in the MAC RAR payload. For example, a size of the data is indicated according to the specific bit field in the MAC RAR payload. One or more kinds of data sizes are predefined by a standard, and a DL-SCH bit field indicates one kind of the sizes. Or, whether the RAR includes the DL grant, or the DL grant and the UL grant is indicated according to the first reserved bit field in the MAC RAR payload.

TABLE 3

R=1: DL Data
↑
R                                  Timing Advance Command
Timing Advance Command      UL Grant
   UL Grant
   UL Grant
   UL Grant
   TC-RNTI
   TC-RNTI
   DL Data
   . . . .
   DL Data Similar to Method 1, alternatively, in order to avoid influences on a UE of a low version, the base station only places RARs of the UEs with the same MAC RAR length in the same second type PDSCH. The base station may indicate the RAR length in the PDCCH scheduling the second type PDSCH. Further, the base station may indicate the RAR length through the specific bit field in a PDCCH scheduling a second type PDSCH, or through a method of transmitting PDCCHs of the second type PDSCHs of these two kinds of UEs in different search spaces, or scrambling the PDCCHs of the second type PDSCHs of these two kinds of UEs using different RNTIs, to avoid the influences on the UE of low version.

Alternatively, the base station may place RARs of the UEs with different RAR lengths in the same second type PDSCH. In order to avoid the influences on the UE of low version, the MAC subPDU of a UE that is not configured to be possible to receive data in the RAR is placed in a first half of the MAC PDU, and the MAC subPDU of the UE that is configured to be possible to receive data in the RAR is placed in a second half of the MAC PDU. Similarly, these two kinds of UEs have different interpretations on a specific bit field in the first 8 bits of the subheader. For example, when a UE that is not configured to be possible to receive data in the RAR reads a subheader (this subheader may be or may not be the UE's), and when a value of a first bit field E (Extension field) is 0, the UE considers the MAC subPDU including the subheader is a last MAC subPDU of the current MAC PDU; otherwise, the MAC subPDU including this subheader is followed by other MAC subPDUs. When a UE that is configured to be possible to receive data in the RAR reads a subheader (this subheader is not the UE's), and a value of a first bit field E is 0, the UE considers the MAC subPDU including the subheader is a last MAC subPDU of the UE that is not configured to be possible to receive data in the RAR of the current MAC PDU; otherwise, the MAC subPDU including this subheader is followed by other MAC subPDUs of the UE that is not configured to be possible to receive data in the RAR of the current MAC PDU. For a UE that is not configured to be possible to receive data in the RAR, it can be determined that whether the MAC subPDU is the last MAC subPDU of the MAC PDU according to the bit field E in the subheader, and the RAR size is determined according to the specific bit field in the RAR.

The above described methods of determining the start point and size of the MAC subPDU not only apply to the MT-EDT transmission process, but also widely apply to other transmission processes which need to determine the start point and size of the MAC subPDU.

In the exemplary embodiment of the present disclosure, the base station may also transmit the downlink control information while transmitting the second type PDSCH. For example, the downlink control information is transmitted on a predefined resource within the time-frequency resource of the second type PDSCH to indicate HARQ information of the second type PDSCH, for example, retransmission or new transmission, an HARQ ID, and the like. The downlink control information and the second type PDSCH are encoded independently.

Herein, the second type PDSCH may be an Msg 2 or Msg B in the random access process. The Msg 2 or Msg B may contain at least one kind of the above described various information and data. The second type PDSCH may be a PDSCH specific for carrying downlink data. For example, the PDCCH scheduling the second type PDSCH and the second type PDSCH both are scrambled according to the first type RNTI, and are UE-specific PDCCH and PDSCH.

In step S106, the second type PDSCH is demodulated, and the HARQ-ACK feedback is performed according to the demodulation result. Herein, the HARQ-ACK feedback may be HARQ-ACK feedback, or may be ACK feedback of a higher level.

In the exemplary embodiment of the present disclosure, it may return to the contention-based random access process according to a received fallback indication or based on a fallback triggering condition being detected. Herein, the fallback triggering condition includes at least one item of: the uplink timing being invalid, the PDCCH scheduling the second type PDSCH is received but the uplink timing being invalid, no response is received within a predefined time window after the contention-free PRACH is transmitted.

If the PDSCH is correctly demodulated by the UE, the UE feeds back an ACK, and if the PDSCH is not correctly demodulated by the UE, the UE does not provide feedback. Or, the UE may provide an ACK or NACK according to the demodulation result of the PDSCH.

In the exemplary embodiment of the present disclosure, the HARQ-ACK may be carried by the PRACH. A specific PRACH resource is configured for the UE by the base station, for example, a specific PRACH resource is configured for the UE by the base station when the UE is in the RRC connected state (the PRACH resource is not released when the RRC connection is released by the UE), or the PRACH resource is configured in the first type PDSCH in step S102, or the PDCCH in step S104, or the second type PDSCH in step S105 by the base station. Herein, the PRACH resource does not belong to the cell specific PRACH resource set indicated in the system information (for example, SIB1), or belongs to the cell specific PRACH resources. Or, a PRACH resource set specific for carrying the HARQ-ACK during the downlink transmission of the UE in the RRC idle/deactivated state may be configured in the system information by the base station, and the UE may select one PRACH resource from the set according to a predefined rule, for example, determining the PRACH resource according to the received PDCCH resource and/or PDSCH resource, or the base station may indicate one of the PRACH resources in the PDCCH in step S101, or the first type PDSCH in step S102, or the PDCCH in step S104, or the second type PDSCH in step S105. In the exemplary embodiment of the present disclosure, for example, the UE may transmit the PRACH if the PDSCH is correctly demodulated by the UE, the UE may not transmit the PRACH if the PDSCH is not correctly demodulated by the UE. For example, the UE may transmit PRACH 1 if the PDSCH is correctly demodulated by the UE, the UE may transmit PRACH 2 if the PDSCH is not correctly demodulated by the UE. In a special implementation mode, PRACH 1 resource and PRACH 2 resource are the same, but only phases thereof are different, for example, PRACH 2 is acquired by multiplying PRACH 1 by −1.

In the exemplary embodiment of the present disclosure, the HARQ-ACK may be carried by the PUCCH. Herein, the PUCCH resources may be selectively configured. A specific PUCCH resource may be configured by the base station for the UE, herein, the PUCCH resource may be specific for the downlink transmission process i of the UE n the RRC idle/deactivated state. For example, the PUCCH resource for UE in the RRC idle/deactivated state and the PUCCH resource for UE in the RRC connected state may be configured by the base station, respectively. Or, a set of PUCCH resources used in both of the RRC idle/deactivated state and the RRC connected state may be configured by the base station. If no UE-specific PUCCH resource is configured by the base station, the PUCCH resource set predefined by a standard and the PUCCH resource determined by the indication in the system information are used for the UE in the RRC idle/deactivated state during the downlink transmission process. For example, one or more PUCCH resource sets specific for the downlink transmission process of the UE in the RRC idle/deactivated state is configured by the base station when the UE is in the RRC connected state. The PDSCH resource information is not released when the RRC connection is released by the UE. The base station indicates one of the one or more configured PUCCH resources through the first type PDSCH in step S102, or the PDCCH in step S104, or the second type PDSCH in step S105. For another example, if one or more groups of PUCCH resources are predefined by a standard, the base station may indicate one of the one or more groups of the PUCCH resources in the system information (for example, pucch-ResourceCommon), and the base may indicate one PUCCH resource in this group of the PUCCH resources through the first type PDSCH in step S102, or the PDCCH in step S104, or the second type PDSCH in step S105.

Herein, the signaling for the PUCCH or PRACH and the signaling for configuring the PUCCH or PRACH resource in the RRC connected state may be the same, and the base station may also indicate whether the resource is only used for one or both of the purposes. In addition, the configuration signaling may be two different signalings, for example, different fields (IE) are adopted by the two different signalings or the two different signalings are configured in different RRC messages or system messages.

The PUCCH resource includes one or more items of: a PUCCH format, a PUCCH frequency domain resource, a PUCCH time-frequency resource, a PUCCH codeword resource, spatial characteristics of the PUCCH (for example, QCL with which reference signal of which cell), a set of HARQ-ACK feedback timing K1 of the PUCCH, PUCCH power control information, a maximum coding rate of the PUCCH, a cyclic shift of the PUCCH and the like. Herein, in the PUCCH power control, a closed-loop power control parameter may not be accumulated with a closed-loop power control parameter in the RRC connected state, that is, the closed-loop power control parameter of the first PUCCH transmission of the UE in the RRC idle/deactivated state is reset to 0, and the accumulation is performed according to the closed-loop power control parameter of the PDCCH of the UE in the RRC idle/deactivated state.

In the exemplary embodiment of the present disclosure, it is determined that whether to adopt the PUCCH or the PRACH to transmit the HARQ-ACK according to the indication of the first type PDSCH in step S102, or the PDCCH in step S104, or the second type PDSCH in step S105. The UE may be configured to transmit the HARQ-ACK using the PUCCH or the PRACH by the base station, for example, when the UE is in the RRC connected state, the base station may indicate the UE to transmit an uplink channel of the HARQ-ACK in the RRC idle/deactivated state through high-level signaling. The UE may determine whether the PUCCH or the PRACH is adopted to transmit the HARQ-ACK according to whether the uplink timing is valid. The UE may only transmit the PRACH when the uplink timing is invalid. The time resource of the PRACH resource may be not earlier than the PDSCH time resource in step S105. A time difference between the time resource of the PRACH resource and the PDSCH time difference in step S105 may be not less than a predefined time delay. For example, the UE receives the PDSCH in step S105, and transmits the PRACH on a first available PRACH resource after the PDSCH. The time and/or frequency domain and/or codeword resources of the PRACH may be different according to a decoding result of the PDSCH. The time resource of the PRACH resource may be not earlier than the time resource of the uplink channel for transmitting the HARQ-ACK in step S106 indicated by the PDCCH in step S104. The time resource of the PRACH resource may be not earlier than the time resource of the PUCCH for transmitting the HARQ-ACK in step S106 indicated by the PDCCH in step S104. The time resource of the PRACH resource may be not earlier than the PDCCH time resource of the in step S105. For example, after receiving the PDCCH in step S104, the UE tries to perform the PRACH transmission on the available PRACH resource without attempting to receive the PDSCH scheduled by the PDCCH.

In the exemplary embodiment of the present disclosure, an ACK of a higher level may be carried by the PUSCH. The PUSCH resources may be indicated according to the second type PDSCH, the PDCCH scheduling the second type PDSCH, or the first type PDSCH. The UE feeds back an ACK through the PUSCH if the PDSCH is correctly demodulated by the UE, and the UE does not transmit the PUSCH if the PDSCH is not correctly demodulated by the UE.

If the base station does not support the UE to transmit the PRACH spontaneously during the downlink transmission process in the RRC idle/deactivated state, when the UE's uplink timing is valid, the UE transmits a PUCCH carrying an HARQ-ACK, and when the UE's uplink timing is invalid, the UE does not transmit the PUCCH, that is, DTX (Discontinuous transmission). One implementation mode is that the base station may transmit a PDCCH to trigger a UE to transmit a PRACH when no PUCCH from the UE is monitored by the base station. When the UE receives the PDCCH to trigger the PRACH transmission, if the PDCCH indicates the contention-free PRACH transmission, for example, values of ra-Preamble Index indicated in the PDCCH are not zero, the UE performs the contention-free PRACH transmission, and please refer to the description on FIG. 1 for details. If the PDCCH indicates the contention-based PRACH transmission, for example, the value of the ra-Preamble Index indicated in the PDCCH are all zero, the UE returns to the contention-based random access process.

In the exemplary embodiment of the present disclosure, the UE does not transmit the PUCCH when the UE's uplink timing is invalid. The UE starts a time window T3. The UE returns to the contention-based random access process when no indication of the base station is received by the UE within the time window T3, wherein, a length of the time window T3 is equal to or greater than 0.

BWP transmitting the PRACH or PUCCH used for carrying the HARQ-ACK may be configured by the base station, or the BWP transmitting the PRACH or PUCCH used for carrying the HARQ-ACK is an initial BWP, i.e., a UL BWP for the initial random access in the cell where the UE is located, or the UL BWP which is used to transmit the PRACH in step S103 is used to transmit the PRACH or PUCCH carrying the HARQ-ACK.

In the exemplary embodiment of the present disclosure, the UE may transmit the PUCCH or PRACH for carrying the HARQ-ACK or the PUSCH carrying the higher level ACK according to the uplink timing, when the UE's uplink timing is valid.

When the UE's uplink timing is invalid, the UE may transmit the uplink channel for carrying the HARQ-ACK according to the downlink timing, or the UE does not transmit the HARQ-ACK.

The UE does not increase power of a PRACH during the subsequent second PRACH transmission, when the UE has transmitted the PRACH once and has received a downlink response based on this PRACH but the second type PDSCH is not correctly demodulated.

The UE increases the power of the PRACH during the subsequent second PRACH transmission, when the UE has transmitted the PRACH once but the downlink response based on this PRACH is not received.

The UE does not increase the power of the PRACH during the subsequent second PRACH transmission, when the UE has transmitted the PRACH once but the downlink response based on this PRACH is not received.

In the exemplary embodiment of the present disclosure, the UE may continue to monitor the PDCCH after step S105 and/or step S106. Furthermore, the UE may monitor the PDCCH within a predetermined time window. For example, the UE will monitor the PDCCH within a time window T0 after the UE transmits the HARQ-ACK feedback or transmits the high-level ACK each time. For another example, the UE will monitor the PDCCH within the time window T0 after the UE receives the PDSCH each time.

In addition, the UE may monitor the PDCCH in the second search space within the predetermined time window.

In addition, the UE may monitor the PDCCH in a search space other than the first and second search spaces within the predetermined time window. The resources in the second search space and the resources in the search space other than the first and second search spaces are configured independently. In addition, the search space other than the first and second search spaces may be considered to be equivalent to the second search space, if the base station does not configure the parameters of the search space other than the first and second search spaces.

Herein, a length of the predefined time window may be measured in a unit of absolute time, or in a period of a downlink physical control channel search space, or in the number of symbols, or in a slot/sub-slot.

Herein, the predetermined time window takes a specific time point as a start point. For example, an end symbol of the last uplink channel of the HARQ-ACK transmitted by the UE may be used as the start point, or an end position of a slot/sub-slot where an end symbol of the last uplink channel of the HARQ-ACK transmitted by the UE is located is used as the start point, or an end symbol of the uplink channel including the ACK transmitted by the UE is used as the start point, or an end position of a slot/sub-slot where an end symbol of the uplink channel including the ACK transmitted by the UE is located is used as the start point, or an end symbol of the last PDSCH received by the UE is used as the start point, or an end position of a slot/sub-slot where an end symbol of the last PDSCH received by the UE is located is used as the start point, or an end symbol of the last PUSCH transmitted by the UE is used as the start point, or an end position of a slot/sub-slot where an end symbol of the last PUSCH transmitted by the UE is located is used as the start point, or a start or end position of the PDCCH is used as the start point.

In the exemplary embodiment of the present disclosure, the time window length may be 0, and the start point of the time window may be the end symbol of the uplink channel containing ACK transmitted by the UE. The UE may immediately enter the dormant state after transmitting the ACK.

In addition, the predefined time window may be selectively configured, and the UE may use a time window for monitoring a Random Access Response (RAR) as the predefined time window if the time window is not configured by the base station. The UE may use a default value for this time window if the time window is not configured by the base station.

In addition, the time window may be configured through the UE-specific RRC signaling. Herein, the predefined time window may be configured by broadcasting the cell system information.

In the exemplary embodiment of the present disclosure, the base station may transmit downlink control channel resource configuration information within the time window. For example, the base station may transmit configuration of the second search space or other search spaces through the PDCCH or the PDSCH. The downlink control channel resource configuration information may become valid after a predefined time delay. For example, X milliseconds (ms) after the time when the UE receives the downlink control channel resource configuration information, the second search space and the search space other than the second search space is determined according to the downlink control channel resource configuration information.

In addition, the base station may transmit the downlink control channel resource configuration information within the time window. For example, the base station indicates whether it needs to monitor a DCI of other type, or monitor another search space (the search space other than the second search space) through the PDCCH or the PDSCH.

In addition, the base station may transmit the PRACH configuration information within the time window. For example, a PRACH format, a time-frequency code resource and the like may be configured by the base station through the PDCCH or the PDSCH.

In addition, the base station may transmit the uplink channel configuration information carrying an HARQ-ACK within the time window. For example, the base station may transmit the PRACH resource configuration information or the PUCCH resource configuration information through the PDCCH or the PDSCH. The resource configuration information becomes valid after a predefined time delay. For example, the resource configuration information becomes valid X ms after the time when the UE receives the PDSCH containing the resource configuration information, or becomes valid in a next second search space or other search space.

In addition, the base station may transmit scheduling information scheduling a second PDSCH (for example, scheduling the retransmission of the PDSCH) in the scheduling step included in the PDCCH within the time window. Alternatively, if the downlink control information for scheduling the PDSCH initial transmission does not include a new data indication (NDI) bit field, assuming that the NDI during the initial transmission is 0, the UE determines whether the PDSCH scheduled by the PDCCH is retransmitted according to whether the NDI bit field in the subsequently received PDCCH toggles.

The base station may transmit the PDCCH to indicate the UE action within the time window. For example, the PDCCH triggers the UE to perform the random access process, or the PDCCH indicates the UE to perform the PDSCH reception.

In addition, the base station may transmit the PDCCH to trigger the UE to transmit a specific PRACH within the time window. The base station may perform operations (for example, uplink synchronization etc.) according to the received PRACH. The base station may transmit the uplink timing adjustment information in the subsequently transmitted PDCCH or PDSCH. The uplink timing adjustment information is used for the uplink timing of the PUCCH carrying the HARQ-ACK of the PDSCH by the UE. This process is similar to the random access process triggered by the PDCCH. In addition, the base station may also carry downlink data in this PDSCH.

In addition, the base station may transmit the PDCCH to trigger the UE to perform the contention-based random access process within the time window. Herein, the PDCCH triggers the UE to perform the contention-based random access process and establishes RRC connection. It is not difficult to see that this is a fallback mechanism. For example, when the base station finds that the PUCCH cannot be detected, this is because the UE does not monitor the PDCCH, or this may be caused by uplink out-of-synchronization. The base station triggers the UE to transmit a PRACH to re-acquire uplink synchronization, and indicates the UE on uplink timing information so that the UE performs transmission during the subsequent transmission process in accordance with the reasonable uplink timing.

In addition, the base station may transmit the PDCCH to schedule the PUSCH transmission within the time window. For example, the UE may transmit the high-level ACK in this PUSCH. The base station may retransmit a PDCCH after receiving the PUSCH correctly to indicate that the PUSCH is received correctly, for example, transmitting an ACK through a DCI, or transmitting information indicating the UE to perform a predefined state X through the DCI.

In addition, the base station may transmit the PDCCH to indicate the UE to perform the dormant state within the time window.

In addition, the base station may transmit the PDSCH within the time window.

In step S107, the predefined state X is entered when a predefined condition is satisfied.

In the exemplary embodiment of the present disclosure, the predefined state X may represent that the UE enters a dormant mode. For example, the UE stops monitoring the PDCCH. However, the UE may still need to wake up at some specific time points, for example, the UE may wake up at a paging occasion, or the UE may wake up at a time resource corresponding to the second search space to monitor the PDCCH.

A predefined condition C1 includes at least one kind of following conditions:

(1) Signaling indicating the UE to perform the predefined state X is received by the UE within the predefined time window;

(2) No PDCCH is received by the UE within the predefined time window; and (3) The number of times the UE transmits the PRACH has reached the maximum number of transmissions with the predefined time window.

Herein, the signaling indicating the UE to perform the predefined state X may be carried by a specific DCI format, and/or a specific bit field, and/or a specific bit value. For example, the DCI indicates the UE to enter the dormant mode, or the DCI indicates that the ACK fed back by the UE is correctly received, or the DCI indicates the ACK of the uplink transmission.

Different time windows are configured for different downlink transmission or uplink transmission. When there exists a plurality of time windows, the UE enters a state X at the end of a last time window. When there exists a plurality of time windows, the UE enters a state X at an end of a first time window.

In order to better understand various solutions of the present embodiment, some examples are provided hereafter, but the solutions of the present embodiment are not limited hereto. In each step, the specific implementation modes are not repeated, and please refer to the previous descriptions.

Example 1

A UE receives a PDCCH scheduling a paging message in a first search space in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information, PUCCH resource information (PRI indicates which set of PUCCH resources) and uplink timing adjustment information. Or, the PDCCH is scrambled by the first type RNTI, and the PDCCH triggers the PRACH transmission. Or, the PDCCH is scrambled by the first type RNTI, the PDCCH schedules a PDSCH and the PDCCH includes PRI information, or the PDCCH schedules a PUSCH, or the PDCCH includes an action indication (whether entering a dormant state).

If it is monitored that a second type PDSCH is scheduled by a PDCCH scrambled by the RA-RNTI or a PDCCH scrambled by the first type RNTI in the second search space by the UE, the UE receives the second type PDSCH.

The UE generates an HARQ-ACK according to a demodulation result of the second type PDSCH, and determines a PUCCH resource according to the PRI of the PDCCH and a PUCCH resource set indicated by system information to transmit the HARQ-ACK. The UE determines uplink timing for transmitting the PUCCH according to the uplink timing adjustment information in the PDCCH. The UE monitors the second search space again, and starts a time window T0.

If a PDCCH scrambled by the first type RNTI is monitored in the second search space and the PDCCH scrambled by the first type RNTI triggers the PRACH transmission, the UE transmits the PRACH, monitors the second search space again, and starts the time window T0.

If a PDCCH scheduling the PUSCH is monitored in the second search space by the UE, the UE transmits the PUSCH, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 2

A UE receives a PDCCH scheduling a paging message in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information, PUCCH resource information (PRI indicates which set of PUCCH resources) and uplink timing adjustment information. Or, the PDCCH is scrambled by the first type RNTI, and the PDCCH triggers the PRACH transmission. Or, the PDCCH is scrambled by the first type RNTI, the PDCCH schedules a PDSCH and the PDCCH includes PRI information, or the PDCCH schedules a PUSCH, or the PDCCH includes an action indication (whether entering a dormant state).

If no PDCCH is monitored in the second search space within a time window T1, by the UE after transmitting a PRACH, and the maximum number of times the PRACH is transmitted has not been exceeded, the UE transmits the PRACH again according to the PRACH resource indicated in the paging message of the UE and starts the time window T1 again. The UE enters the dormant state when the maximum number of times the PRACH is transmitted has been reached.

If a PDCCH is monitored in the second search space within the time window T1 by the UE after transmitting a PRACH, and the PDCCH triggers the PRACH transmission, the UE transmits the PRACH according to the resource indicated by the PDCCH. Similarly, the UE determines the corresponding transmission action according to the time window T1 and the number of times the PRACH is transmitted.

If a PDCCH scrambled by the RA-RNTI or a PDCCH scrambled by the first type RNTI, which schedules a second type PDSCH, is monitored in the second search space within the time window T1, by the UE after transmitting the PRACH, the UE receives the second type PDSCH.

The UE generates an HARQ-ACK according to a demodulation result of the second type PDSCH, and determines a PUCCH resource according to the PRI of the PDCCH and a PUCCH resource set indicated by system information to transmit the HARQ-ACK. The UE determines uplink timing for transmitting the PUCCH according to the uplink timing adjustment information in the PDCCH. The UE monitors the second search space again, and starts a time window T0. If no PDCCH is monitored within the time window T0 by the UE, the UE enters the dormant state at the end of the time window T0, or if the an indication indicating the UE to enter the dormant state is received within the time window T0 by the UE, the UE enters the dormant state in advance.

If a PDCCH scheduling the PUSCH is monitored in the second search space within the time window T1, by the UE, after transmitting the PRACH, the UE transmits the PUSCH, monitors the second search space again, and starts the time window T0.

Example 3

A UE receives a PDCCH scheduling a paging message in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information, and PUCCH resource information (PRI indicates which set of PUCCH resources). Or, the PDCCH is scrambled by the first type RNTI, and the PDCCH triggers the PRACH transmission. Or, the PDCCH is scrambled by the first type RNTI, the PDCCH schedules a PDSCH, and the PDCCH includes PRI information, or the PDCCH schedules a PUSCH, or the PDCCH includes an action indication (whether entering a dormant state).

If it is monitored that a second type PDSCH (the second type PDSCH includes uplink time adjustment information) is scheduled by a PDCCH scrambled by the RA-RNTI or a PDCCH scrambled by the first type RNTI in the second search space by the UE, the UE receives the second type PDSCH.

If the second type PDSCH is correctly demodulated by the UE, the UE generates an ACK and determines a PUCCH resource according to the PRI of the PDCCH and a PUCCH resource set indicated by system information to transmit the ACK. The UE determines uplink timing for transmitting the PUCCH according to the uplink timing adjustment information in the second type PDSCH. The UE monitors the second search space again, and starts the time window T0. If the second type PDSCH is not correctly demodulated by the UE, the UE does not transmit the HARQ-ACK, but monitors the second search space again, and starts the time window T0.

If a PDCCH scrambled by the first type RNTI, which triggers the PRACH transmission is monitored in the second search space, the UE transmits the PRACH, monitors the second search space again, and starts the time window T0.

If a PDCCH scheduling the PUSCH is monitored in the second search space by the UE, the UE transmits the PUSCH, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 4

A UE receives a PDCCH scheduling a paging message in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information. Or, the PDCCH is scrambled by the first type RNTI, and the PDCCH triggers the PRACH transmission. Or, the PDCCH is scrambled by the first type RNTI, the PDCCH schedules a PDSCH or schedules a PUSCH, or the PDCCH includes an action indication (whether to enter the dormant state).

If it is monitored that a second type PDSCH is scheduled by a PDCCH scrambled by the RA-RNTI in the second search space by the UE, the UE receives the second type PDSCH. The second type PDSCH includes uplink time adjustment information, uplink scheduling information (UL grant), and downlink data.

If the UE demodulates the second type PDSCH correctly, the UE transmit the PUSCH containing a high-level ACK according to the UL grant in the second type PDSCH. The UE determines uplink timing for transmitting the PUCCH according to the uplink timing adjustment information in the second type PDSCH. The UE monitors the second search space again, and starts the time window T0. If the UE does not demodulate the second type PDSCH correctly, the UE does not transmit an uplink signal, but monitors the second search space again, and starts the time window T0.

If a PDCCH scrambled by the first type RNTI is monitored in the second search space and the PDCCH scrambled by the first type RNTI triggers the PRACH transmission, the UE transmits the PRACH, monitors the second search space again, and starts the time window T0.

If a PDCCH scrambled by the first type RNTI is monitored in the second search space and the PDCCH scrambled by the first type RNTI schedules the PRACH reception or the PUSCH transmission, the UE receives the PDSCH to transmit the HARQ-ACK or transmits the PUSCH, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 5

A UE receives a PDCCH scheduling a paging message in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information, and PUCCH resource information (PRI indicates which set of PUCCH resources). Or, the PDCCH is scrambled by the first type RNTI, and the PDCCH triggers the PRACH transmission. Or, the PDCCH is scrambled by the first type RNTI, the PDCCH schedules a PDSCH and the PDCCH includes PRI information, or the PDCCH schedules a PUSCH, or the PDCCH includes an action indication (whether entering a dormant state).

If no PDCCH is monitored within a time window T1, by the UE after transmitting a PRACH, and the maximum number of times the PRACH is transmitted has not been exceeded, the UE transmits the PRACH again according to the PRACH resource indicated in the paging message of the UE and starts the time window Ti again. The UE enters the dormant state when the maximum number of times the PRACH is transmitted has been reached.

If a PDCCH is monitored within the time window T1 by the UE after transmitting a PRACH, and the PDCCH triggers the PRACH transmission, the UE may select to transmit the PRACH according to the resource indicated by the PDCCH. Similarly, the UE determines the corresponding transmission action according to the time window T1 and the number of times the PRACH is transmitted.

If it is monitored that a second type PDSCH (the second type PDSCH includes uplink time adjustment information) is scheduled by a PDCCH scrambled by the RA-RNTI or a PDCCH scrambled by the first type RNTI is monitored within the time window T1, by the UE after transmitting the PRACH, the UE receives the second type PDSCH.

If the second type PDSCH is correctly demodulated by the UE, the UE generates an ACK and determines a PUCCH resource according to the PRI of the PDCCH and a PUCCH resource set indicated by system information to transmit the ACK. The UE determines uplink timing for transmitting the PUCCH according to the uplink timing adjustment information in the second type PDSCH. The UE monitors the second search space again, and starts the time window T0. If the second type PDSCH is not correctly demodulated by the UE, the UE does not transmit the HARQ-ACK, but monitors the second search space again, and starts the time window T0.

If a PDCCH scheduling the PUSCH is monitored within the time window by the UE after transmitting the PRACH, the UE transmits the PUSCH, monitors the second search space again, and starts the time window T0.

If no PDCCH is monitored within the time window by the UE after transmitting the PRACH, the UE enters the dormant state at the end of the time window, or if an indication indicating the UE to enter the dormant state is received within the time window T0 by the UE, the UE enters the dormant state in advance.

Example 6

A UE receives a PDCCH scheduling a paging message in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, wherein the second search space is a RA-Search space. The PDCCH is scrambled by the RA-RNTI, and the PDCCH includes PDSCH scheduling information, and PUCCH resource information (PRI indicates which set of PUCCH resources). Or, the PDCCH is scrambled by the first type RNTI, and the PDCCH triggers the PRACH transmission. Or, the PDCCH is scrambled by the first type RNTI, the PDCCH schedules a PDSCH and the PDCCH includes PRI information, or the PDCCH schedules a PUSCH, or the PDCCH includes an action indication (whether entering a dormant state).

If it is monitored that a second type PDSCH (the second type PDSCH includes uplink time adjustment information) is scheduled by a PDCCH scrambled by the RA-RNTI or a PDCCH scrambled by the first type RNTI in the second search space by the UE, the UE receives the second type PDSCH.

If the second type PDSCH is correctly demodulated by the UE, the UE generates an ACK and determines a PUCCH resource according to the PRI of the PDCCH and a PUCCH resource set indicated by system information to transmit the ACK. The UE determines uplink timing for transmitting the PUCCH according to the uplink timing adjustment information in the second type PDSCH. The UE monitors the second search space again, and starts the time window T0. If the second type PDSCH is not correctly demodulated by the UE, the UE transmits the PRACH. The UE determines a transmitting time for transmitting the PRACH according to the downlink timing. The UE monitors the second search space again, and starts the time window T0.

If a PDCCH scrambled by the first type RNTI, which triggers the PRACH transmission is monitored in the second search space, the UE transmits the PRACH, monitors the second search space again, and starts the time window T0.

If a PDCCH scheduling the PUSCH is monitored in the second search space by the UE, the UE transmits the PUSCH, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 7

A UE receives a PDCCH scheduling a paging message in PO, and receives a paging message PDSCH according to the PDCCH. In the paging message applicable to the UE, the UE receives the first type RNTI, configuration information of the second search space, the PRACH resource, scheduling information of the second type PDSCH, and a UE action (in this example, it is assumed that the UE action is performing MT-EDT downlink transmission in an RRC idle/inactive state).

The UE receives the second type PDSCH according to the paging message of the UE.

The UE generates an HARQ-ACK according to a demodulation result of the second type PDSCH, and transmits the same through the PRACH (for example, the ACK uses a PRACH sequence 1, while the NACK uses a PRACH sequence 2). The UE transmits the PRACH according to the downlink timing. The UE monitors the second search space, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

If a PDCCH, which schedules the PDSCH and includes up time adjustment information and a PUCCH resource indication (PRI), is monitored within the time window T0 by the UE, the UE generates an HARQ-ACK according to the demodulation result of the PDSCH, and transmits the PUCCH carrying the HARQ-ACK according to the uplink time adjustment information. The UE monitors the second search space again, and starts the time window T0.

If a PDCCH, which triggers the PRACH transmission is monitored within the time window T0 by the UE, the UE transmits the PRACH. The UE monitors the second search space again, and starts the time window T0.

Example 8

A UE receives a PDCCH scheduling a paging message in PO, and receives a paging message PDSCH according to the PDCCH. In the paging message applicable to the UE, the UE receives the first type RNTI, configuration information of the second search space, the PRACH resource, scheduling information of the second type PDSCH, and a UE action (in this example, it is assumed that the UE action is performing MT-EDT downlink transmission in an RRC idle/inactive state).

The UE receives the second type PDSCH according to the paging message of the UE.

The UE generates an HARQ-ACK according to a demodulation result of the second type PDSCH, and transmits the same through the PRACH (for example, the ACK uses a PRACH sequence 1, while the NACK uses a PRACH sequence 2). the UE transmits the PRACH according to the downlink timing. The UE monitors the second search space, and starts the time windows T0 and T1.

If no PDCCH is monitored within a time window T1 by the UE after transmitting a PRACH, and the maximum number of times the PRACH is transmitted has not been exceeded, the UE transmits the PRACH again according to the PRACH resource indicated in the paging message of the UE and starts the time window Ti again. The UE enters the dormant state when the maximum number of times the PRACH is transmitted has been reached.

If a PDCCH is monitored within the time window T1 by the UE after transmitting a PRACH, and the PDCCH triggers the PRACH transmission, the UE may select to transmit the PRACH according to the resource indicated by the PDCCH. Similarly, the UE determines the corresponding transmission action according to the time window T1 and the number of times the PRACH is transmitted.

If a PDCCH, which schedules the PDSCH and includes up time adjustment information and a PUCCH resource indication (PRI), is monitored within the time window T1 by the UE after transmitting the PRACH, the UE generates an HARQ-ACK according to the demodulation result of the PDSCH, and transmits the PUCCH carrying the HARQ-ACK according to the uplink time adjustment information. The UE monitors the second search space again, and starts the time window T0.

Example 9

A UE receives a PDCCH scheduling a paging message in PO, and receives a paging message PDSCH according to the PDCCH. In the paging message applicable to the UE, the UE receives the first type RNTI, configuration information of the second search space, the PRACH resource, scheduling information of the second type PDSCH, and a UE action (in this example, it is assumed that the UE action is performing MT-EDT downlink transmission in an RRC idle/inactive state).

The UE receives the second type PDSCH according to the paging message of the UE.

The UE generates an HARQ-ACK according to a demodulation result of the second type PDSCH, and transmits the same through the PRACH (for example, the ACK uses a PRACH sequence 1, while the NACK uses a PRACH sequence 2). The UE transmits the PRACH according to the downlink timing. The UE monitors the second search space, and starts the time windows T0 and T2.

If no PDCCH is monitored within the time window T2, by the UE after transmitting the PRACH, the UE returns to the contention-based random access process.

If a PDCCH, which triggers the PRACH transmission, is monitored within the time window T2 by the UE after transmitting the PRACH. The UE determines the contention-based or contention-free PRACH transmission process according to the indication of the PDCCH.

If a PDCCH, which schedules the PDSCH and includes up time adjustment information and a PUCCH resource indication (PRI), is monitored within the time window T2 by the UE after transmitting the PRACH, the UE generates an HARQ-ACK according to the demodulation result of the PDSCH, and transmits the PUCCH carrying the HARQ-ACK according to the uplink time adjustment information. The UE monitors the second search space again, and starts the time window T0. If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 10

A UE receives a PDCCH scheduling a paging message in PO, and receives a paging message PDSCH according to the PDCCH. In the paging message applicable to the UE, the UE receives the first type RNTI, the PRACH resource, scheduling information of the second type PDSCH, and a UE action (in this example, it is assumed that the UE action is performing downlink transmission in an RRC idle/inactive state).

The UE receives the second type PDSCH according to the paging message of the UE. The UE starts the time window T0.

The UE attempts to receive the PDSCH on each possible second type PDSCH transmitting resource within the time window T0. The UE generates an HARQ-ACK according to a demodulation result of the second type PDSCH, and transmits the same through the PRACH (for example, the ACK uses a PRACH sequence 1, while the NACK uses a PRACH sequence 2). The UE transmits the PRACH according to the downlink timing.

If no PDSCH is received for X consecutive times within the time window T0 by the UE, the UE stops trying to receive the PDSCH and enters the dormant state in advance.

The UE enters the dormant state after the time window T0 ends.

Example 11

A UE receives a PDCCH scheduling a paging message in PO, and receives a paging message PDSCH according to the PDCCH. In the paging message applicable to the UE, the UE receives the first type RNTI, configuration information of the second search space, the PRACH resource, and downlink data.

If the first type PDSCH is correctly demodulated by the UE, the UE transmits the PRACH. The UE monitors the second search space, and starts the time window T0.

If a PDCCH scheduling the paging message is correctly received by the UE but the first type PDSCH is not correctly demodulated by the UE, the UE monitors the second search space again, and starts the time window T0.

If no PDCCH scheduling the paging message is received by the UE, the UE enters the dormant state.

no PDCCH is monitored within the time window T0 by the UE, the UE enters the dormant state within the time window T0, or if an indication indicating the UE to enter the dormant state is received within the time window T0 by the UE, the UE enters the dormant in advance.

Example 12

A UE receives a PDCCH scheduling a paging message in PO, and receives a paging message PDSCH according to the PDCCH. In the paging message applicable to the UE, the UE receives a UE action indication (in this example, it is assumed that the UE action is performing MO-EDT downlink transmission in an RRC idle/inactive state).

The UE determines a PRACH resource according to the PRACH resource set of the MO-EDT, and transmits the PRACH.

The UE monitors a PDCCH in a second search space, wherein the second search space is a RA-Search space. The PDCCH is scrambled by the RA-RNTI.

If a PDCCH scrambled by the RA-RNTI (RAR PDCCH) is monitored in the second search space by the UE, the UE receives the PDSCH (RAR PDSCH).

If the second type PDSCH is correctly demodulated by the UE, the UE receives information (for example, the UL grant, uplink timing and the like) according to the information corresponding to the UE in the PDSCH.

The UE transmits the PUSCH (Msg 3) according to the UL grant and uplink timing.

The UE monitors the second search space again, and starts the time window T0. If a PDCCH scheduling a PDSCH Msg4 is monitored in the second search space by the UE, the UE receives the PDSCH. The PDSCH includes downlink data. If the second type PDSCH is correctly demodulated by the UE, and the information in the PDSCH matches the UE, the UE transmits the ACK through the PUCCH, or the UE transmits the ACK through the PUSCH scheduled by the UL grant in the Msg4. Since the UE just acquires the UL grant only after demodulating the PDSCH Msg 4, a time delay from the UL grant to the PUSCH is greater than a time delay for the UL grant to schedule the PUSCH in a normal PDCCH. Similar to Msg 3, a slot where the PUSCH scheduled by the PDSCH Msg 4 is located is jointly determined according to a slot offset K0 and an additional slot delay Δ in a PUSCH time resource allocation table. In some scenes, the UE needs to generate an ACK of an application layer according to the received PDSCH Msg 4, which requires a time delay greater than a time delay of Msg3, thus, an additional time delay different from Mg3 is required, for example, time delays Δ for Msg3 and Msg4 are defined by a standards, respectively.

In another implementation mode, when PDSCH Msg4 contains downlink data, the UE needs to transmit an ACK or NACK according to the demodulation result of the PDSCH; and when PDSCH Msg4 does not contain downlink data, the UE transmits the ACK only when the PDSCH is demodulated correctly and the information in the PDSCH matches the UE. For example, if the UE knows that the PDSCH Msg4 contains downlink data, the UE needs to transmit an ACK or NACK according to the demodulation result of the PDSCH, and the UE transmits the PUCCH according to a PUCCH resource indicated in the PDCCH scheduling the PDSCH Msg4. The ACK and NACK states may be distinguished through different codewords and/or frequency domains and/or time domain resources. If the PDSCH Msg4 does not contain downlink data, the UE transmits the ACK on the PUCCH (the PUCCH resource is indicated by the PDCCH scheduling the PDSCH Msg4) only when the PDSCH is demodulated correctly and the information in the PDSCH matches the UE. Otherwise, the UE does not transmit the PUCCH. For another example, if the UE knows that the PDSCH Msg4 contains downlink data, the UE transmits the PUCCH according to the PUCCH resource indicated in the PDCCH scheduling Msg4, the PUCCH merely carries an NACK; and the UE transmits the PUSCH according to the UL grant in Msg4, and the PUSCH carries an ACK. In the specific implementation, the base station may schedule retransmission of Msg4, if the base station merely receives the NACK. The base station may not necessarily schedule the retransmission of Msg4, if the base station at least receives the ACK. The receiving performance of Msg may be improved through this mode.

Example 13

A UE receives a PDCCH scheduling a paging message in a first search space in PO, and receives a paging message PDSCH according to the PDCCH. In the paging message applicable to the UE, the UE receives PRACH configuration information, a first type RNTI, and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space, The PDCCH is scrambled by the first type RNTI, and includes PDSCH scheduling information, PUCCH resource information (PRI indicates which set of PUCCH resources) and uplink timing adjustment information. Or, the PDCCH is scrambled by the first type RNTI, and triggers the PRACH transmission. Or, the PDCCH is scrambled by the first type RNTI, and schedules a PDSCH, or the PDCCH includes an action indication (whether to enter the dormant state).

If no downlink response is received in the second search space within the time window T1 by the UE after transmitting the PRACH, the UE may attempt to transmit the PRACH according to the PRACH configuration information again.

If it is monitored that a second type PDSCH is scheduled by a PDCCH scrambled by the first type RNTI in the second search space by the UE, the UE receives the second type PDSCH.

The UE generates an HARQ-ACK according to a demodulation result of the second type PDSCH. and determines a PUCCH resource according to the PRI of the PDCCH and a PUCCH resource set indicated by system information to transmit the HARQ-ACK. The UE determines uplink timing for transmitting the PUCCH according to the uplink timing adjustment information in the PDCCH. The UE monitors the second search space again, and starts the time window T0.

If a PDCCH scrambled by the first type RNTI, which triggers the PRACH transmission is monitored in the second search space, the UE transmits the PRACH, monitors the second search space again, and starts the time window T0.

If a PDCCH scheduling a PUSCH or a PDSCH is monitored in the second search space by the UE, the UE transmits the PUSCH or receives the PDSCH and transmits the HARQ-ACK, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Example 14

A UE receives a PDCCH scheduling a paging message in a first search space in PO, and receives a paging message PDSCH according to the PDCCH. In the paging message applicable to the UE, the UE receives PRACH configuration information and a UE action (in this example, it is assumed that the UE action is performing MT-EDT downlink transmission in an RRC idle/inactive state).

The UE transmits a PRACH according to the PRACH configuration information.

The UE monitors a PDCCH in a second search space. The PDCCH is scrambled by the RA-RNTI, and includes scheduling information of the second type PDSCH. Or, the PDCCH is scrambled by the first type RNTI, and schedules a PDSCH or PDSCH, or an action indication (whether to enter the dormant state).

If a PDCCH scrambled by the RA-RNTI corresponding to the UE or a second type PDSCH is not correctly received by the UE until the end of time window T1, the UE transmits the PRACH according to the PRACH configuration information again.

If it is monitored that a second type PDSCH is scheduled by a PDCCH scrambled by the RA-RNTI schedules in the second search space by the UE, and the second type PDSCH contains RAR corresponding to the UE, a TC-RNTI in the RAR is used as a first type RNTI. A third type PDSCH (carrying downlink data) is received according to DL grant in the RAR.

The UE transmits third type PDSCH HARQ-ACK information on the PUSCH or the PUCCH according to uplink timing, according to HARQ-ACK resource indication information (for example, a UL grant of the PUSCH carrying the HARQ-ACK, or the PUCCH resource configuration information carrying the HARQ-ACK) and the uplink timing. The UE monitors the second search space again, and starts the time window T0.

If it is monitored that a PUSCH or a PDSCH is scheduled by a PDCCH scrambled by the first type RNTI in the second search space by the UE, the UE transmits the PUSCH or receives the PDSCH and transmits the HARQ-ACK, monitors the second search space again, and starts the time window T0.

If a PDCCH scrambled by the first type RNTI, which triggers the PRACH transmission is monitored in the second search space, the UE transmits the PRACH, monitors the second search space again, and starts the time window T0.

If no PDCCH is monitored within the time window T0 by the UE, the UE enters the dormant state within the time window T0, or if an indication indicating the UE to enter the dormant state is received within the time window T0 by the UE, the UE enters the dormant in advance.

Figure 2:
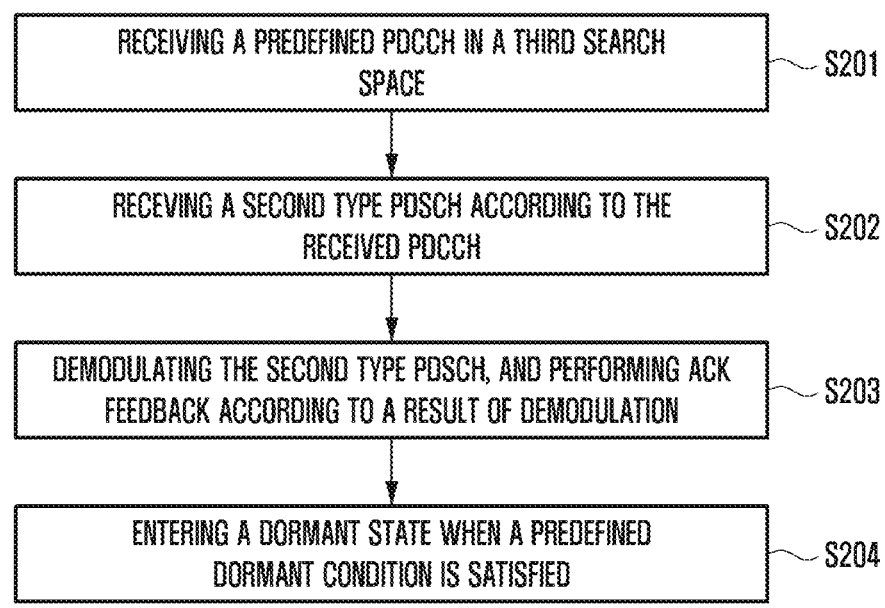
FIG. 2 illustrates a flowchart illustrating a downlink transmission method performed by a UE according to another exemplary embodiment of the present disclosure.

FIG. 2 is a flowchart illustrating a downlink transmission method performed by a UE according to another exemplary embodiment of the present disclosure.

Referring to FIG. 2, in step S201, a predefined PDCCH and/or wake-up signal is received in a third search space.

In the exemplary embodiment of the present disclosure, the third search space may support a UE to perform reception of a control channel for downlink transmission in an RRC idle/deactivated state. The third search space may be used to monitor a PDCCH scheduling a second type PDSCH.

In the exemplary embodiment of the present disclosure, parameters of the third search space are selectively configured, and a search space for predefined usage is used as a specific search space if parameters of the specific search space are not configured. Herein, the third search space is determined according to UE-specific RRC signaling, or the third search space is determined according to the cell system information, or the third search space is determined according to specific parameters of the UE and parameters of specific search spaces.

Herein, configuration information of the third search space may include at least one kind of: time resource information (for example, a cycle, an offset, time duration, symbols occupied within one time unit, etc.), frequency domain resource information (for example, the occupied PRBs), space resource information (for example, QCL/TCI information, precoding size, etc.), CCE-REG mapping information, PDCCH DMRS information, aggregation level information of a search space, monitored candidates information, and DCI format information. The parameters of the third search space are selectively configured, and the UE may use a search space for predefined usage as the third search space if the base station does not configure the third search space. For example, the search space for predefined usage is a search space (the first search space in Embodiment 1) for monitoring paging control information, or a search space (search space SIBI) for receiving SIM system information, or a corresponding search space (RA-search space) for receiving random access, or a search space 0 (Search Space zero). If a Control Resource Set (CORESET) corresponding to a search space D is not configured by the base station, the UE may use a CORESET for predefined usage as the CORESET corresponding to the search space D. For example, the CORESET for predefined usage may be a Type2-PDCCH CSS for paging, or a CORESET of a Type-0 PDCCH CSS. The third search space may be configured through the UE-specific RRC signaling. In addition, the third search space may be configured by broadcasted system information. In addition, the third search space may be determined according to the UE-specific parameters and the cell specific search space parameters.

In order to save power, the base station may configure a WUS for the UE. The UE attempts to receive the WUS in the third search space, or at the beginning of X slots/sub-slots/symbols/absolute time before a start point of the third search space. If no WUS is received, the UE does not need to perform PDCCH monitoring and enters the dormant state. If the UE receives the WUS, the UE performs PDCCH monitoring.

In the exemplary embodiment of the present disclosure, the third search space may further be used to support the UE to perform reception of a control channel for downlink transmission in an RRC connected state. For example, when the UE is in the RRC connected state, the base station has downlink small data transmission, and the UE is out of synchronization, the base station may transmit a PDCCH in the third search space to trigger the UE to transit a PRACH, to establish uplink synchronization and transmit data in a subsequent downlink PDSCH. Herein, the third search space may be a UE-specific search space. According to the specific implementation, the base station may overlap all of or partial of resource configuration of the third search space with that of the search space for monitoring paging control information. In this case, in the overlapped search space, the UE not only needs to detect a PDCCH scrambled by a P-RNTI, i.e., detecting a paging PDCCH, but also needs to detect a PDCCH scrambled by a first type RNTI, i.e., detecting a PDCCH used for the UE to perform downlink transmission in the RRC idle/deactivated state.

In the exemplary embodiment of the present disclosure, the UE may perform reception of the PDCCH according to the first type RNTI, for example, the first RNTI is used to CRC scramble the PDCCH. The UE may determine a start point of the UE-specific search space according to the first type RNTI. The UE performs reception of the PDSCH according to the first type RNTI. The UE determines a DMRS sequence according to the first type RNTI. The UE performs scrambling on a PUSCH or PUCCH according to the first type RNTI. The UE determines a DMRS sequence according to the first type RNTI. The first type RNTI may be configured by the base station. Please refer to the descriptions in Embodiment 1 for the specific configuration method. For example, a first type RNTI value is determined by a UE-specific RRC signaling configuration manner or a manner of broadcasting configuration through cell system information, or the like.

In the exemplary embodiment of the present disclosure, for example, when the UE is in the RRC connected state, the UE may perform reception of the PDCCH according to the C-RNTI.

In the exemplary embodiment of the present disclosure, the PDCCH may include scheduling information scheduling the PDSCH. In the exemplary embodiment of the present disclosure, the PDCCH may include indication information of a UE action. For example, the PDCCH triggers the UE to perform random access process (contention-based or contention-free), or the PDCCH indicates the UE to perform the PDSCH reception, or the PDCCH indicates a type of an uplink channel for HARQ-ACK feedback to the UE. For example, the PDCCH indicates that the type of the uplink channel for HARQ-ACK feedback is a PRACH or PUCCH, and/or the PDCCH indicates transmitting the PRACH or PUCCH according to downlink timing or uplink timing. Specifically, different indication contents are distinguished by a separate bit field in a DCI of the PDCCH, or different indication contents are distinguished by a specific bit value/ value combination in the DCI of the PDCCH, or different indication contents are distinguished by performing CRC scrambling on the PDCCH through different RNTIs, or different indication contents are distinguished through different DCI formats. When the base station does not determine whether the UE still maintains valid uplink timing, the base station may trigger the UE to transmit the PRACH to acquire uplink synchronization through the PDCCH firstly, and then transmits the PDCCH to schedule the PDSCH to carry data after the uplink synchronization is acquired. The base station indicates uplink timing information in the PDCCH or PDSCH, so that the UE may perform the uplink transmission according to the uplink timing information in the subsequent uplink transmission. Or, when the base station cannot determine whether the UE still maintains valid uplink timing, the base station may indicate the UE to carry data through the PRACH so as to avoid interference between respective uplink signals caused by inaccurate uplink timing. In addition, the UE still receives the PDCCH in the search space D after the PRACH is transmitted, or receives the PDCCH in another search space, for example, receives the PDCCH in the RA-search space.

In the exemplary embodiment of the present disclosure, it is possible that no PDCCH is monitored by the UE in the third search space, then the UE enters the dormant state. For example, the third search space may be configured, by the base station, with a period of 40 slots, a slot offset of 0, a time duration of 5 slots, and first to third symbols within each slot being a search space. Thus, the UE monitors the PDCCH on the first to third symbols of each slot among slots of 0-4, 40-44 and 80-84. For example, if no PDCCH is monitored on a resource corresponding to the slots 40-44 by the UE, the UE enters the dormant state and attempts to receive the PDCCH in the slots 80-84 again. The UE may receive the PDCCH periodically at the start point of the third search space within a predefined time window.

In step S202, the second type PDSCH is received according to the received PDCCH.

If the UE receives the PDCCH for triggering the PRACH transmission in the third search space, the UE transmits the PRACH according to the information indicated by the PDCCH. Subsequently, the UE monitors the PDCCH in the third search space, and receives the second type PDSCH according to the received PDCCH. The UE may perform the reception of the PDCCH according to the first type RNTI or C-RNTI.

The UE may determine the second type PDSCH resources according to the PDSCH at first. Herein, the UE may determine one or more second type PDSCH resources according to the PDCCH, and/or configuration of the RRC connected state, and/or system information.

If the PDCCH indicates spatial characteristics of the second type PDSCH, the second type PDSCH may be received according to the indicated spatial characteristics. If the PDCCH does not indicate the spatial characteristics of the second type PDSCH, the second type PDSCH may be received according to the spatial characteristics of the PDCCH. Or, the second type PDSCH may be received according to the spatial characteristics for the last downlink transmission in the connected state.

In the exemplary embodiment of the present disclosure, the second type PDSCH includes downlink data.

In the exemplary embodiment of the present disclosure, the second type PDSCH may include uplink channel information for carrying an HARQ-ACK.

In the exemplary embodiment of the present disclosure, the second type PDSCH may include uplink timing adjustment information (Timing advance).

In the exemplary embodiment of the present disclosure, the second type PDSCH may include uplink scheduling information (UL grant).

In the exemplary embodiment of the present disclosure, the second type PDSCH may include downlink control information. The downlink control information schedules a third type PDSCH. The third type PDSCH includes downlink data.

In the exemplary embodiment of the present disclosure, the second type PDSCH may indicate the first type RNTI for downlink transmission in the RRC idle/inactive state next time. The first RNTI may be indicated explicitly by bits in the PDSCH, or determined implicitly by the PDSCH resource, or indicated in a combination of explicitly and implicitly.

In the exemplary embodiment of the present disclosure, the second type PDSCH indicates a TC-RNTI, and the UE uses the TC-RNTI as the first type RNTI for downlink transmission in the RRC idle/inactive state next time, for example, scrambling of the PDCCH for scheduling downlink data retransmission, or scrambling of the PDSCH for carrying the downlink data.

In the exemplary embodiment of the present disclosure, the second type PDSCH may be scrambled according to the first type RNTI, and/or a cell ID.

In the exemplary embodiment of the present disclosure, the second type PDSCH may be scrambled according to the C-RNTI, and/or a cell ID.

In the exemplary embodiment of the present disclosure, the second type PDSCH may be a Msg 2 or Msg B in the random access process. The Msg 2 or Msg B may contain at least one kind of the above described various information and data.

In step S203, the second type PDSCH is demodulated, and ACK feedback is performed according to the demodulation result.

The UE feeds back an ACK if the UE demodulates the PDSCH correctly, and the UE does not provide feedback if it does not demodulate the PDSCH correctly. Or, the UE may provide an ACK or NACK according to the demodulation result of the PDSCH.

In the exemplary embodiment of the present disclosure, an HARQ-ACK may be carried by the PRACH. a specific PRACH resource is configured by the base station for the UE, and the PRACH resource does not belong to the cell specific PRACH resource set indicated in the system information (for example, SIB1), or belongs to the cell specific PRACH resources. Or, a PRACH resource set dedicated to the downlink transmission process of the UE in the RRC idle/deactivated state may be configured in the system information by the base station, and the UE may select one PRACH resource from the set according to a predefined rule. For example, the PRACH resource is determined according to the received PDCCH resource and/or PDSCH resource. The PRACH resource includes a time-frequency resource and a codeword resource.

In addition, the HARQ-ACK may be carried by the PUCCH. The PUCCH resources may be selectively configured. A specific PUCCH resource may be configured by the base station for the UE, and the PUCCH resource may be specific for the downlink transmission process of the UE in the RRC idle/deactivated state. For example, the PUCCH resource for UE in the RRC idle/deactivated state and the PUCCH resource for UE in the RRC connected state may be configured by the base station, respectively. Or, a set of PUCCH resources used in both of the RRC idle/deactivated state and the RRC connected state may be configured by the base station. If no the UE-specific PUCCH resource is configured by the base station, the PUCCH resource set predefined by a standard and the PUCCH resource determined by the indication in the system information are used for the UE in the RRC idle/deactivated state during the downlink transmission process. For example, one or more PUCCH resource sets specific for the downlink transmission process of the UE in the RRC idle/deactivated state is configured by the base station when the UE is in the RRC connected state. The base station determines one of the one or more PUCCH resources through the PDCCH. For another example, if one or more groups of PUCCH resources are predefined by a standard, one group of the one or more groups of the PUCCH resources may be indicated in the system information (for example, pucch-Resource Common) by the base station, and the base station may determine one PUCCH resource in this group of the PUCCH resources through PDCCH.

The PUCCH resource includes one or more items of: a PUCCH format, a PUCCH frequency domain resource, a PUCCH time-frequency resource, a PUCCH codeword resource, spatial characteristics of the PUCCH (for example, QCL with which reference signal of which cell), a set of HARQ-ACK feedback time delays K1 of the PUCCH, PUCCH power control information, a maximum bit rate of the PUCCH, a cyclic prefix of the PUCCH and the like. In a PUCCH power control, a closed-loop power control parameter may not be accumulated with a closed-loop power control parameter in the RRC connected state, that is, the closed-loop power control parameter of the first PUCCH transmission of the UE in the RRC idle/deactivated state is reset to 0, and the accumulation is performed according to the closed-loop power control parameter of the PDCCH in the RRC idle/deactivated state.

In the exemplary embodiment of the present disclosure, it is determined that whether to adopt the PUCCH or the PRACH to transmit the HARQ-ACK according to the indication of the PDCCH or the PDSCH. Specifically, the UE may be configured to transmit the HARQ-ACK using the PUCCH or the PRACH by the base station, for example, when the UE is in the RRC connected state, the base station may indicate the UE to transmit an uplink channel of the HARQ-ACK in the RRC idle/deactivated state through high-level signaling. The UE may determine whether the PUCCH or the PRACH is adopted to transmit the HARQ-ACK according to whether the uplink timing is valid. The UE may only transmit the PRACH when the uplink timing maintained by the UE is invalid. Herein, the time resource of the PRACH resource may be not earlier than the PDSCH time resource. Alternatively, a time difference between the time resource of the PRACH resource and the PDSCH time difference may be not less than a predefined time delay. For example, the UE receives the PDSCH after receiving the PDCCH in step 1, and transmits the PRACH on a first available PRACH resource after the PDSCH. The time domain and/or frequency domain and/or codeword resources of the PRACH may be different according to a decoding result of the PDSCH. Alternatively, the time resource of the PRACH resource may be not earlier than the time resource of the uplink channel used for transmitting the HARQ-ACK and indicated by the PDCCH. Alternatively, the time resource of the PRACH resource may be not earlier than a time resource of the PUCCH used for transmitting the HARQ-ACK and indicated by the PDCCH. Alternatively, the time resource of the PRACH resource may be not earlier than a time resource of the PDCCH in step 1. For example, after receiving the PDCCH, the UE immediately tries to perform the PRACH transmission on the available PRACH resource without attempting to receive the PDSCH scheduled by the PDCCH.

If the base station does not support the UE to transmit the PRACH spontaneously during the downlink transmission process in the RRC idle/deactivated state, when the UE's uplink timing is valid, the UE transmits a PUCCH carrying an HARQ-ACK, and when the UE's uplink timing is invalid, the UE does not transmit the PUCCH, that is, DTX (Discrete Transmission). One implementation mode is that the base station may transmit a PDCCH to trigger a UE to transmit a PRACH when no PUCCH from the UE is monitored by the base station. When the UE receives the PDCCH to trigger the PRACH transmission, if the PDCCH indicates the contention-free PRACH transmission, for example, values of ra-Preamble Index indicated in the PDCCH are not zero, the UE may perform the contention-free PRACH transmission, and please refer to the description on FIG. 1 for details. If the PDCCH indicates the contention-based PRACH transmission, for example, the values of the ra-Preamble Index indicated in the PDCCH are all zero, the UE returns to the contention-based random access process.

The UE does not transmit the PUCCH when the UE's uplink timing is invalid. The UE starts a time window T3. The UE returns to the contention-based random access process when no indication is received by the UE from the base station within the time window T3, wherein, a length of the time window T3 is equal to or greater than 0.

A BWP for transmitting the PRACH or PUCCH may be configured by the base station, or the BWP for transmitting the PRACH or PUCCH is an initial BWP, i.e., a UL BWP for the initial random access in the cell where the UE is located.

The UE may continue to monitor the PDCCH after step S203. Further, the UE may monitor the PDCCH within a predetermined time window, wherein the predefined time window is a time window of the third search space, and determined according to a time start point and time duration of the third search space. For example, the third search space is configured, by the base station, with a period of 40 slots, a slot offset of 0, a time duration of 5 slots, and first to third symbols within each slot being a search space. In this example, a start point of the time window is a first symbol of slots, 0, 40, 80 . . . , respectively, and an end position of the time window is a third symbol of the slots 4, 44, 84 . . . , respectively. The UE monitors the PDCCH on the first to third symbols of each slot within the time window. The UE enters the dormant state at the end of the time window. Or, the predefined time window is determined according to the time window of the third search space and a predefined second time duration. The third search space is configured as above, and the predefined second time duration is 2 slots. Thus, a start point of the predetermined time window is a first symbol of slots, 0, 40, 80 . . . , respectively, and an end position of the time window is a last symbol of slots 6, 46, 86 . . . , respectively. The UE only monitors the PDCCH in the third search space, but may receive the PDSCH or transmit the PUSCH/PUCCH within the predefined time window. Or, the predefined time window is determined according to the time window of the third search space, the predefined second time duration, and an end position of the PDSCH or PUCCH or PUSCH. For example, when the UE receives the PDCCH scheduling the PDSCH or PUSCH transmission in the third search space within the time window, the UE, after transmitting the HARQ-ACK of the PDSCH or transmitting the PUSCH, determines the predefined time window by using the end position of the PUCCH or PUSCH according to the predetermined second time duration. One mode is that the UE receives the PDCCH on the time resource of the third search space within the predefined time window, and the other mode is that the third search space is extended to other slots within the predefined time window, and the UE may receive the PDCCH on all of these resources. For example, the third search space configured by the base station is first to third symbols of each slot among the slots of 0-4, 40-44, and 80-84. It is assumed that the predefined second time duration is 2 slots. The UE monitors the PDCCH on the first to third symbols in the slot 42, schedules the PDSCH to be transmitted in the slot 43, and transmits the PUCCH carrying the HARQ-ACK in the slot 44. Thus, the time window with a duration of two slots is started at a start point of the slot 45. The UE still needs to detect the PDCCH on the first to third symbols within the slots 45 and 46. The UE may enter the dormant state at the end of the third symbol of the slot 46 if no PDCCH is monitored by the UE.

In order to prevent that a signal transmitted by the base station on an initial service cell of the UE cannot be accepted by the UE due to the reason that the UE changes the service cell, the UE may be configured, by the base station, to report the change when the UE changes the service cell. For another example, when the UE is configured, by the base station, with a transmission mode of receiving the predefined PDCCH and/or wake-up signal in the third search space, the UE needs to report the change if the UE changes the service cell.

Figure 3:
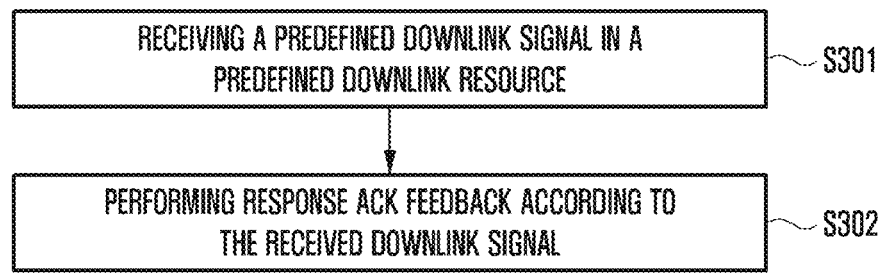
FIG. 3 illustrates a flowchart illustrating a downlink transmission method performed by a UE according to another exemplary embodiment of the present disclosure.

In the exemplary embodiment of the present disclosure, the description on the time window in FIG. 3 is also applicable here.

In step S204, the dormant state is entered when a predefined dormant condition is satisfied.

In order to better understand various solutions of the present embodiment, some examples are provided hereafter, but the solutions of the present embodiment are not limited hereto. In each step, the specific implementation modes are not repeated, and please refer to the previous descriptions.

Example 1

A base station configures a UE in an RRC idle/inactive state to monitor a PDCCH in a third search space. The base station configures third search space information, a first type RNTI, and a PUCCH resource set.

The UE monitors the PDCCH in the third search space. The PDCCH is scrambled by the first type RNTI. The PDCCH includes PDSCH scheduling information, PUCCH resource information (PRI indicates which set of PUCCH resource) and uplink timing adjustment information, or schedules the PUSCH, or the PDCCH includes an action indication (whether to enter the dormant state), or the PDCCH triggers PRACH transmission.

If it is monitored that the second type PDSCH is scheduled by the PDCCH by the UE in the third search space:

If the UE's uplink timing is valid, the UE generates an HARQ-ACK according to a demodulation result of the PDSCH, and transmits the PUCCH according to uplink timing. The UE continues to monitor the third search space.

If the UE's uplink timing is invalid, the UE does not transmit the PUCCH. The UE continues to monitor the third search space.

If it is monitored that the PRACH transmission is triggered by the PDCCH in the third search space by the UE, the UE transmits the PRACH according to the PRACH resource indicated in the PDCCH. The UE continues to monitor the third search space.

If it is monitored that the PUSCH is scheduled by the PDCCH in the third search space by the UE, the UE transmits the PUSCH according to the PUSCH resource indicated in the PDCCH. The UE continues to monitor the third search space.

If it is monitored that no PDCCH is monitored until the time duration of the third search space ends or an indication of entering the dormant state is monitored by the UE, the UE enters the dormant state.

Example 2

A base station configures a UE in an RRC idle/inactive state to monitor a PDCCH in a third search space. The base station configures third search space information, a first type RNTI, and a PUCCH resource set.

The UE monitors the PDCCH in the third search space. The PDCCH is scrambled by the first type RNTI. The PDCCH includes PDSCH scheduling information, PUCCH resource information (PM indicates which set of PUCCH resources) and uplink timing adjustment information, and schedules the PUSCH, or the PDCCH includes an action indication (whether to enter the dormant state), or the PDCCH triggers PRACH transmission.

If it is monitored that the second type PDSCH is scheduled by the PDCCH by the UE in the third search space:

If the UE's uplink timing is valid, the UE generates an HARQ-ACK according to a demodulation result of the PDSCH, and transmits the PUCCH according to uplink timing. The UE continues to monitor the third search space, and starts a time window.

If the UE's uplink timing is invalid, the UE does not transmit the PUCCH. The UE continues to monitor the third search space, and starts a time window.

If it is monitored that the PRACH transmission is triggered by the PDCCH in the third search space by the UE, the UE transmits the PRACH according to the PRACH resource indicated in the PDCCH. The UE continues to monitor the third search space, and starts a time window.

If it is monitored that the PUSCH is scheduled by the PDCCH in the third search space by the UE, the UE transmits the PUSCH according to the PUSCH resource indicated in the PDCCH. The UE continues to monitor the third search space, and starts a time window.

If it is monitored that no new PDCCH is monitored until the end of the time window or an indication of entering the dormant state is monitored by the UE, the UE enters the dormant state.

If it is monitored that no PDCCH is monitored from the startpoint of the third search space to the end position of third search space determined according to the time duration of a search space or an indication of entering the dormant state is monitored by the UE, the UE enters the dormant state.

Example 3

A base station configures a UE in an RRC idle/inactive state to monitor a PDCCH in a third search space. The base station configures third search space information, a first type RNTI, and a PUCCH resource set.

The UE monitors the PDCCH in the third search space. The PDCCH is scrambled by the first type RNTI. The PDCCH includes PDSCH scheduling information, PUCCH resource information (PRI indicates which set of PUCCH resource) and uplink timing adjustment information, or schedules the PUSCH, or the PDCCH includes an action indication (whether to enter the dormant state).

If it is monitored that the second type PDSCH is scheduled by the PDCCH by the UE in the third search space:

If the UE's uplink timing is valid, the UE generates an HARQ-ACK according to a demodulation result of the PDSCH, and transmits the PUCCH according to uplink timing. The UE continues to monitor the third search space.

If the UE's uplink timing is invalid but the base station supports a MO-EDT based transmission, the UE switches to the MO-EDT based transmission mode.

If it is monitored that the PUSCH is scheduled by the PDCCH in the third search space by the UE, the UE transmits the PUSCH according to the PUSCH resource indicated in the PDCCH. The UE continues to monitor the third search space.

If it is monitored that no PDCCH is monitored before the end position of the third search space or an indication of entering the dormant state is monitored by the UE, the UE enters the dormant state.

FIG. 3 is a flowchart illustrating a downlink transmission method performed by a UE according to another exemplary embodiment of the present disclosure.

Referring to FIG. 3, in step S301, a predefined downlink signal is received in a predefined downlink resource.

In the exemplary embodiment of the present disclosure, the predefined downlink resource is a predefined second type PDSCH resource, and the predefined second type PDSCH resource is configured by the base station when the UE is in an RRC connected state, and may be used for downlink transmission in an RRC idle/inactive state. Or, the predefined downlink resource is a RAR PDSCH resource determined according to an RAR PDCCH.

In the exemplary embodiment of the present disclosure, the base station may configure a predefined downlink PDSCH for downlink transmission in the RRC idle/inactive state when the UE is in the RRC connected state. Similar to a DL SPS in the RRC connected state, the predefined PDSCH resource for the downlink transmission in the RRC idle/inactive state includes one or more parameters of: a period, a time offset, the number of repetitions, a symbol start point/duration/an end symbol, a frequency domain resource, spatial characteristics and the like of a PDSCH.

Herein, for example, signaling for configuring the PDSCH resource in the RRC idle/inactive state and RRC signaling for configuring the DL SPS parameter in the RRC connected state may be the same signaling, during the configuration the base station may use a specific signaling to indicate that the DL SPS parameter is only used in the RRC idle/inactive state, only used in the RRC connected state or used in both of the RRC idle/inactive state and the RRC connected state, and a DL SPS resource may also be configured additional when the DL SPS is used in the RRC idle/inactive state. For example, signaling for configuring the PDSCH parameter in the RRC idle/inactive state and RRC signaling for configuring the DL SPS parameter in the RRC connected state may be two different signalings, that is, the parameters are configured separately, for example, a value configured for a corresponding C-RNTI value (SPS-RNTI) and a transmission time duration or the like parameters may be different.

In order to save power, the base station may configure a WUS for the UE. The UE attempts to receive the WUS at the beginning of X slots/sub-slots/symbols/absolute time before a start point of the PDSCH time resource. If no WUS is received, the UE does not need to perform PDSCH transmission and enters the dormant state. If the UE receives the WUS, the UE performs the PDSCH reception.

In the exemplary embodiment of the present disclosure, in the random access process, the base station may indicate a RAR PDSCH resource through the RAR PDCCH, the UE receives the second type PDSCH, i.e., the RAR PDSCH, on the corresponding resource according to the indication of the PDCCH.

In step S302, ACK feedback is performed according to the received downlink signal.

In the exemplary embodiment of the present disclosure, the UE feeds back an ACK if the UE demodulates the PDSCH correctly, and the UE does not provide feedback if it does not demodulate the PDSCH correctly. Or, the UE may provide an ACK or NACK according to the demodulation result of the PDSCH.

In the exemplary embodiment of the present disclosure, when the second type PDSCH is an Msg B RAR PDSCH, the UE feeds back the ACK when the UE demodulates an Msg B RAR sPDU which is successfully matched in the Msg B RAR PDSCH.

In the exemplary embodiment of the present disclosure, the ACK and NACK may be carried by a PRACH or PUCCH, or the ACK may be carried by a PUSCH.

In order to transmit the ACK or NACK, the UE needs to determine an uplink slot for transmitting an HARQ-ACK. According to one implementation mode, a HARQ-ACK timing information (PDSCH-to-HARQ-timing-indicator) is indicated in the PDCCH scheduling the PDSCH, the UE determines an uplink time unit for transmitting the HARQ-ACK according to this HARQ-ACK timing information and an end position of the PDSCH. For example, the end position of the PDSCH corresponds to an uplink slot n, the HARQ-ACK timing information indicates k uplink slots, and the uplink time unit for transmitting the HARQ-ACK is an uplink slot n+k. The base station may configure a set of HARQ-ACK timing values, and indicate one of the values through a DCI, or a set of HARQ-ACK timing values is predefined by a standard and one of the values is indicated through a DCI. Or, the base station may configure or predefine one HARQ-ACK timing value k. The setting of k generally considers a minimum time delay for the UE to process the PDSCH, i.e., a shortest time delay from the time when the UE receives the PDSCH to the time when the UE generates the PUCCH carrying the HARQ-ACK. The k indicated by the base station cannot be less than this shortest time delay. In Release-15, the HARQ-ACK timing set predefined by a standard is an $\{1, 2, 3, \ldots, 8\}$ uplink slot. This predefined set is adopted, when the base station does not configure a specific HARQ-ACK timing set for the UE, for example, HARQ-ACK feedback of the Msg4 in the random access process, or HARQ-ACK feedback of the PDSCH scheduled by the DCI in a fallback mode.

In some scenes, the UE receives the PDSCH, the UE generates an ACK if the CRC check of the PDSCH is successful, the UE generates a NACK if the CRC check fails, and the UE transmits the ACK/NACK through the PUCCH. However, in other scenes, After the UE completes the CRC check, the UE needs to further process a MAC PDU carried by the PDSCH, and determines whether to generate the ACK according to the MAC PDU. For example, in the random access process, the UE receives the RAR PDSCH, and after the CRC check is successful, the UE needs to further process the MAC PDU carried by the PDSCH, generates an ACK only after acquiring the success RAR, and prepares to transmit this ACK information on this PUCCH resource. The UE determines the k1 according to the HARQ-ACK timing information indicated in the Msg B RAR PDSCH or RAR PDCCH, and determines uplink slot n+k1 according to the slot where the end position of the received RAR PDSCH is located. In addition, the UE further needs to acquire uplink timing Timing advanced command according to the success RAR to determine the transmission timing of the PUCCH. In consideration of additional time required for processing the MAC PDU, a value of the HARQ-ACK timing k1 in this case is often greater than a value of the HARQ-ACK timing k in normal case, and the current n+k mechanism may not satisfy the processing time of the UE. In order to resolve this problem, the present disclosure provides the following several solutions.

Solution 1:

An uplink slot of a PUCCH for determining the ACK feedback of a MsgB RAR PDSCH is $n+k+j+\Delta$, that is, $k1=k+j+\Delta$, wherein k is an HARQ-ACK timing set predefined by a standard. One value thereof is indicated by $X_0$ bits in the Msg B RAR PDSCH or PDCCH, for example, $X_0=3$ bits refers to one value in $\{1, 2, \ldots, 8\}$, or $X_0=2$. Values of j and $\Delta$ may be determined according to parameter $\mu_{PUCCH}$ of a subcarrier spacing for the PUCCH. Table 4 is a schematic diagram of the values of j, and Table 5 is a schematic diagram of the values of $\Delta$. $\mu_{PUCCH}=0,1,2,3$ in Table 4/5 represents subcarrier spacing is 15, 30, 60, 120 KHz, respectively.

Preferably, a value range of j can reuse the predefined PUSCH timing j, that is, a slot offset from the PDCCH to the PUSCH is K2. Preferably, a group of values of j may be separately defined other than PUSCH timing j.

Preferably, a value range of $\Delta$ can reuse the predefined additional slot offset $\Delta$ for the first PUSCH scheduled by the RAR, wherein a slot offset from the UL grant in the RAR to the first PUSCH scheduled by the RAR is $K2+\Delta$. Preferably, a group of values of $\Delta$ may be separately defined other than slot offset $\Delta$ for the first PUSCH scheduled by the RAR.

TABLE 4

| $\mu_{PUCCH}$ | j |
|---|---|
| 0 | 1 |
| 1 | 1 |
| 2 | 2 |
| 3 | 3 |

TABLE 5

| $\mu_{PUCCH}$ | $\Delta$ |
|---|---|
| 0 | 2 |
| 1 | 3 |
| 2 | 4 |
| 3 | 6 |

Preferably, $j+\Delta$ is equal to or greater than a processing time delay of the UE from decoding the Msg. B RAR PDSCH and acquiring the uplink timing command (TAC, Timing Advance Command) in the RAR MAC sPDU to transmitting the PUCCH.

Preferably, j is equal to or greater than a lowest time delay for preparing the PUCCH, and $\Delta$ is equal to or greater than the lowest time delay for parsing the MAC sPDU as described above.

Solution 2:

An uplink slot of a PUCCH for determining ACK feedback of a MsgB RAR PDSCH is $n+k+\Delta$, that is, $k1=k+\Delta$, wherein k is an HARQ-ACK timing set predefined by a standard. One value thereof is indicated by an $X_0$ bit in the Msg B RAR PDSCH or the PDCCH, for example, $X^0=3$ bits refers to one value in $\{1,2,\ldots 8\}$, or $X_0=2$. Similarly, values of $\Delta$ may be determined according to an interval parameter $\mu_{PUCCH}$ of a subcarrier carrying the PUCCH, as shown in Table 5.

Preferably, $\Delta$ is equal to or greater than a processing time delay of the UE from decoding the Msg. B RAR PDSCH and acquiring the uplink timing command TAC in the RAR MAC sPDU to transmitting the PUCCH.

Preferably, $\Delta$ is equal to or greater than the lowest time delay for parsing the MAC sPDU as described above. The time delay for preparing the PUCCH may have been considered in k.

Solution 3:

An uplink slot of a PUCCH for determining ACK feedback of a MsgB RAR PDSCH is n+k1, that is, k1=k+j, wherein k is an HARQ-ACK timing set predefined by a standard. One value thereof is indicated by an $X_0$ bit in the Msg B RAR PDSCH or the PDCCH, for example, $X^0$=3 bits refers to one value in {1,2, . . . 8}, or $X_0$=2. Similarly, values of j may be determined according to an interval parameter $\mu_{PUCCH}$ of a subcarrier carrying the PUCCH, as shown in Table 4.

Preferably, j is equal to or greater than a processing time delay of the UE from decoding the Msg. B RAR PDSCH and acquiring the uplink timing command TAC in the RAR MAC sPDU to transmitting the PUCCH.

Solution 4:

An uplink slot of a PUCCH for determining ACK feedback of a MsgB RAR PDSCH is $n+k+\lceil N_{slot}^{subframe,\mu} \cdot T_0/T_{sf} \rceil$, that is, $k1=k+\lceil N_{slot}^{subframe,\mu} \cdot T_0/T_{sf} \rceil$, wherein k is an HARQ-ACK timing set predefined by a standard, for example, a value in {1,2, . . . 8}. One value thereof is indicated by an $X_0$ bit in the Msg B RAR PDSCH or PDCCH, for example, $X^0$=3 bits refers to one value in {1, 2, . . . , 8}, or $X_0$32 2, $\lceil N_{slot}^{subframe,\mu} \cdot T_0/T_{sf} \rceil$ is the number of uplink slots determined according to $T_0$. Preferably, $T_0$=0.5. $N_{slot}^{subframe,\mu}$ is a number of slots in a sub-frame, and $T_{sf}$ is a time duration 1 ms of a sub-frame.

Solution 5:

An uplink slot of a PUCCH for determining ACK feedback of a MsgB RAR PDSCH is $n+k+\lceil N_{slot}^{subframe,\mu} \cdot (N_{T,1}+0.5)/T_{sf} \rceil$, that is, $k1=k+\lceil N_{slot}^{subframe,\mu} \cdot (N_{T,1}+0.5)/T_{sf} \rceil$, wherein k is an HARQ-ACK timing set predefined by a standard. One value thereof is indicated by an $X_0$ bit in the Msg B RAR PDSCH or PDCCH, for example, $X^0$=3 bits refers to one value in {1, 2, . . . , 8}, or $X_0$=2. $N_{slot}^{subframe,\mu}$ is a number of slots in a sub-frame, $T_{sf}$ is a time duration 1 ms of a sub-frame, and $N_{T,1}$ is PDSCH processing time according to a processing capacity 1 of the UE when the PDSCH has an additional reference signal DMRS, and may be represented as N1 symbols.

Solution 6:

An uplink slot of a PUCCH for determining ACK feedback of a MsgB RAR PDSCH is n+k1. A set of k1 is predefined by a standard, and this set of k1 and the set of k are defined or configured, respectively. One value of k1 is indicated by an $X_0$ bit in the Msg B RAR PDSCH or the PDCCH, for example, $X_0$=3 or 2.

The method of determining the HARQ-ACK PUCCH uplink slot of the Msg B RAR PDSCH by adding an additional time offset on the basis of a common k, not only ensures an enough time delay but also implements flexible allocation of this type of PUCCH resource and other types of PUCCH resource (a feedback slot determined according to n+k), thereby improving PUCCH resource efficiency.

In the exemplary embodiment of the present disclosure, whether the PUCCH is transmitted may be determined according to whether the uplink timing is valid. The PUCCH carrying the ACK or NACK is transmitted according to the uplink timing if the uplink timing is valid, and the PUCCH is not transmitted if the uplink timing is invalid; or, the PUCCH carrying the ACK or NACK is transmitted according to the uplink timing if the uplink timing is valid, and the PRACH is transmitted but the PUCCH is not transmitted if the uplink timing is invalid.

In the exemplary embodiment of the present disclosure, after the downlink signal (the second type PDCCH) is received, the PDCCH is monitored in the third search space within the predetermined time window. Herein, the predefined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

In the exemplary embodiment of the present disclosure, an HARQ-ACK may be carried by the PRACH, or may be carried by the PUCCH.

If the base station configures the PRACH/PUCCH resource when the UE is in the RRC connected state, or configures the PRACH/PUCCH resource in the second type PDSCH, or the base station configures the PRACH/PUCCH resource set specific for the downlink transmission process of the UE in the RRC idle/deactivated state in the system information, the UE may select one PRACH/PUCCH resource from the PRACH/PUCCH resource set according to a predefined rule. For example, the PRACH/PUCCH resource is determined according to the received PDCCH resource and/or PDSCH resource.

Specifically, the base station may indicate using the PRACH or PUCCH to transmit the HARQ-ACK through the second type PDSCH. In addition, the base station may configure the UE to transmit the HARQ-ACK using the PUCCH or the PRACH, for example, when the UE is in the RRC connected state, the base station may indicate the UE to transmit an uplink channel of the HARQ-ACK in the RRC idle/deactivated state through high-level signaling. In addition, the UE may determine whether the PUCCH or the PRACH is adopted to transmit the HARQ-ACK according to whether the uplink timing is valid. The UE may only transmit the PRACH when the uplink timing maintained by the UE is invalid. In addition, the base station may indicate using the uplink timing or the downlink timing to transmit the HARQ-ACK through the second type PDSCH.

If the base station does not support the UE to transmit the PRACH spontaneously during the downlink transmission process in the RRC idle/deactivated state, when the UE's uplink timing is valid, the UE transmits a PUCCH carrying an HARQ-ACK, and when the UE's uplink timing is invalid, the UE does not transmit the PUCCH, that is, DTX. One implementation mode is that the base station may transmit a PDCCH to trigger a UE to transmit a PRACH when no PUCCH from the UE is monitored by the base station. When the UE receives the PDCCH to trigger the PRACH transmission, if the PDCCH indicates the contention-free PRACH transmission, for example, values of ra-Preamble Index indicated in the PDCCH are not zero, the UE performs the contention-free PRACH transmission, and please refer to the description on FIG. 1 for details. If the PDCCH indicates the contention-based PRACH transmission, for example, the values of the ra-Preamble Index indicated in the PDCCH are all zero, the UE returns to the contention-based random access process.

The UE does not transmit the PUCCH when the UE's uplink timing is invalid. The UE starts a time window T3. The UE returns to the contention-based random access process when no indication is received by the UE from the base station within the time window T3, wherein, a length of the time window T3 is equal to or greater than 0.

The UE may continue to monitor the PDCCH after step S302. Further, the UE monitors the PDCCH within a predetermined time window T0. Please refer to FIGS. 1 and 2 for the detailed descriptions on the search space and the time window T0.

In the exemplary embodiment of the present disclosure, a predefined state X is entered when a predefined condition C1 is satisfied.

Figure 4:
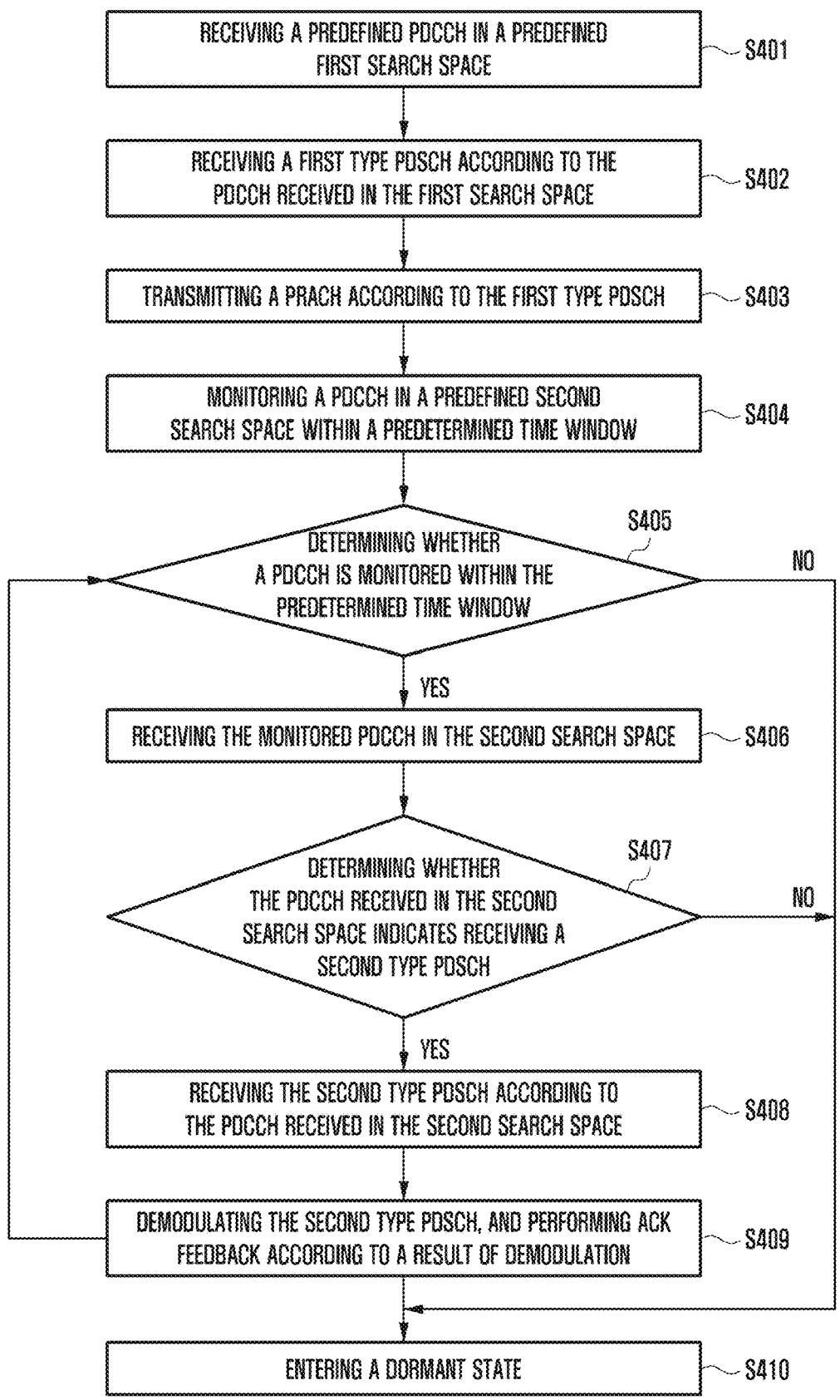
FIG. 4 illustrates a flowchart illustrating a downlink transmission method performed by a UE according to another exemplary embodiment of the present disclosure.

FIG. 4 is a flowchart illustrating a downlink transmission method performed by a UE according to another exemplary embodiment of the present disclosure.

Referring to FIG. 4, in step S401, a predefined PDCCH is received in a predefined first search space.

In step S402, a first type PDSCH is received according to the PDCCH received in the first search space.

In step S403, a PRACH is transmitted according to the first type PDSCH.

In step S404, a PDCCH is monitored in a predefined second search space within a predetermined time window.

In step S405, it is determined that whether the PDCCH is monitored with the predetermined time window, if yes, step S406 is performed, and if no, step S410 is directly performed.

In step S406, the monitored PDCCH is received in the second search space;

in step S407, it is determined that whether the PDCCH received in the second search space indicates receiving the second type PDSCH, if yes, step S408 is directly performed, and otherwise, step S410 is directly performed when the PDCCH received in the second search space indicates entering a dormant state.

In step S408, the second type PDSCH is received according to the PDCCH received in the second search space.

In step S409, the second type PDSCH is demodulated, and HARQ-ACK feedback is performed according to a demodulation result, and step S405 is skipped.

In step S410, the dormant state is entered.

In the exemplary embodiment of the present disclosure, in step S406, if the PDCCH received in the second search space includes PDSCH scheduling information, the UE transmits the PUSCH according to the scheduling information, and step S405 is returned to.

In addition to the above described method, the base station may trigger the UE to perform contention-based 2-step or 4-step random access through a paging message, and carry downlink data in MsgB or Msg4 to implement downlink transmission of the UE in a RRC idle/inactive state. Similarly, the UE monitors the PDCCH within a predefined time window after receiving the MsgB and Msg4 including downlink data, and enters the dormant state if the condition is satisfied.

According to the above-described various methods, the base station or the UE may switch between various downlink transmission methods. For example, the base station may configure the UE to perform transmission in the RRC idle/inactive state according to the transmission method in the Embodiment 1, 2 or 3 when the UE is in the RRC connected state. For another example, the base station may indicate the MT-EDT or MO-EDT transmission method based on the RRC idle/inactive state in the first type PDSCH. According to the above-described various methods, the UE may report its capability of supporting which downlink transmission methods in the RRC idle/inactive state, for example, supporting the transmission methods of the Embodiment 1 and/or 2 and/or 3. The base station may configure the downlink transmission method in the RRC idle/inactive state for the UE according to the supported downlink transmission methods reported by the UE. In addition, the base station may configure the downlink transmission method in the RRC idle/inactive state for the UE according to the UE type information, for example, whether the UE has stationary characteristics.

In the above-described of transmitting the PRACH by the UE, may be replaced with transmitting an Msg A (including PRACH and Msg A PUSCH and the Msg A PUSCH carrying specific uplink control information) by the UE, i.e., a first step of the 2-step random access process in proposed embodiments.

The UE performs an uplink synchronization operation if the UE finds out that the uplink synchronization is invalid before receiving the downlink data. For example, as for FIG. 2 or FIG. 3, the UE performs the contention-based random access process, or the UE transmits the PRACH on the specific PRACH resource configured by the base station, if the UE finds out that the uplink synchronization is invalid before step S201 or step S301. Consequently, the UE may be enabled to transmit the HARQ-ACK according to the valid uplink timing after receiving the PDSCH.

In the above descriptions regarding FIGS. 1 to 4, different service characteristics and terminal characteristics are better adapted to by supporting different downlink transmission methods, to improve transmission efficiency.

In the above descriptions regarding FIGS. 1 to 4, the network resources may be allocated better and reliability of the downlink transmission is ensured by indicating the UE to return to the contention-based random access process or establish RRC connection by the base station.

In the above descriptions regarding FIGS. 1 to 4, the network resources may be allocated better and reliability of the downlink transmission is ensured by triggering the UE to return to the contention-based random access process or establish RRC connection through the predefined rule.

Figure 5:
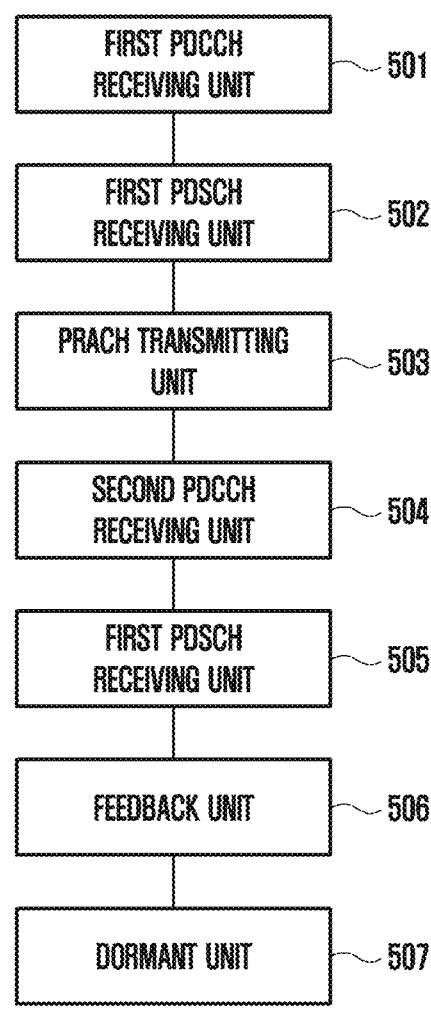
FIG. 5 illustrates a block diagram illustrating a UE according to an exemplary embodiment of the present disclosure.

The downlink transmission method performed by the UE according to the exemplary embodiments of the present disclosure have been described in conjunction with FIGS. 1 to 4. Hereinafter, the UE and its units according to the exemplary embodiments of the present disclosure will be described with reference to FIGS. 5 to 8. FIG. 5 is a block diagram illustrating a UE according to an exemplary embodiment of the present disclosure.

Referring to FIG. 5, the UE includes a first PDCCH receiving unit 501, a first PDSCH receiving unit 502, a PRACH transmitting unit 503, a second PDCCH receiving unit 504, a second PDSCH receiving unit 505, a feedback unit 506, and a dormant unit 507.

The first PDCCH receiving unit 501 is configured to receive a predefined downlink resource in a first search space when the predefined downlink resource is the first search space.

The first PDSCH receiving unit 502 is configured to receive a first type PDSCH according to the PDCCH received in the first search space.

In the exemplary embodiment of the present disclosure, the first type PDSCH may include downlink data.

In the exemplary embodiment of the present disclosure, the first type PDSCH may include at least one item: PRACH resource information, second type PDSCH resource information, HARQ-ACK resource information, transmission mode information, a first type RNTI, and second search space resource information.

In the exemplary embodiment of the present disclosure, the UE may further include a mode determining unit. The mode determining unit is configured to, after receiving the first type PDSCH, according to the first type PDSCH, determine at least one of following transmission modes: performing EDT in an RRC idling/inactive state, performing MT-EDT in an RRC idling/inactive state, performing MO-EDT in an RRC idling/inactive state, establishing an RRC connection, performing contention-based random access, performing contention-free random access, performing 4-step random access channel or 2-step random access channel, returning to a specific transmission process when a predefined condition is satisfied.

In the exemplary embodiment of the present disclosure, the PRACH resource information may be determined according to the first type PDSCH.

In the exemplary embodiment of the present disclosure, the second type PDSCH resource information may be determined according to the first type PDSCH.

In the exemplary embodiment of the present disclosure, the ACK resource information may be determined according to the first type PDSCH.

In the exemplary embodiment of the present disclosure, the first type RNTI may be determined according to the first type PDSCH.

In the exemplary embodiment of the present disclosure, the second search space may be determined according to the first type PDSCH.

In the exemplary embodiment of the present disclosure, the PRACH resource information included in the first type PDSCH may include at least one item of: a preamble index, a number of repetitions of a preamble, a PRACH format, a PRACH time-frequency resource, a synchronization signal for determining a RACH occasion, and broadcast channel SS/PBCH information.

The PRACH transmitting unit 503 is configured to transmit a PRACH according to the first type PDSCH.

The second PDCCH receiving unit 504 is configured to receive a PDCCH in the second search space.

In the exemplary embodiment of the present disclosure, the UE may include a space determining unit. The space determining unit is configured to, when the predefined downlink resource is the first search space, determine the second search space according to at least one manner of: determining the second search space according to configuration information of cell system information, determining the second search space according to UE-specific RRC signaling configuration information, determining the second search space according to the first type PDSCH, determining the second search space by combining various kinds of signaling, and determining the second search space according to a predefined search space.

In the exemplary embodiment of the present disclosure, the first PDCCH receiving unit 502 and the second PDCCH receiving unit 504 may be configured to receive the PDCCH according to a first type RNTI or RA-RNTI. Herein, the first type RNTI may be determined by at least one item of: a first type RNTI allocated when the UE is in an RRC connected state, an RNTI included in the first type PDSCH, a C-RNTI allocated when the UE is in the previous RRC connected state, a Paging UE-Identity, and a RA-RNTI.

In the exemplary embodiment of the present disclosure, the PDCCH received in the second search space may include at least one item of: PDSCH scheduling information, uplink timing adjustment information, uplink channel information for feeding back an HARQ-ACK, first type RNTI information, and an indication of UE transmission mode.

In the exemplary embodiment of the present disclosure, the indication of UE transmission mode may include: an indication of transmitting the PRACH, an indication of receiving the PDSCH, and an indication of feeding back the HARQ-ACK through the PRACH or the PUCCH.

In the exemplary embodiment of the present disclosure, different indication contents may be distinguished by a separate bit field in a DCI of the PDCCH in the second search space, or different indication contents may be distinguished by a specific bit value/value combination in the DCI of the PDCCH in the second search space, or different indication contents may be distinguished by performing CRC scrambling on the PDCCH in the second search space through different RNTIs, or different indication contents may be distinguished through different DCI formats.

In the exemplary embodiment of the present disclosure, the UE may further include a fallback unit. The fallback unit is configured to return to a contention-based random access process when no corresponding downlink response is received in the second search space within a time window. Or, the UE may further include a retransmitting unit. The retransmitting unit is configured to retransmit a specific PRACH when no corresponding downlink response is received in the second search space within the time window. Or, the dormant unit may be further configured to enter a dormant state when no corresponding downlink response is received in the second search space within the time window.

The second PDSCH receiving unit 505 is configured to receive the second type PDSCH according to the PDCCH received in the second search space.

In the exemplary embodiment of the present disclosure, the UE may further include a resource determining unit. The resource determining unit is configured to determine the second type PDSCH resource according to the PDSCH resource information included in the PDCCH, the PDSCH resource information included in the first type PDSCH, or at least one set of PDSCH resource information configured by a base station in an RRC connected state, or determine the second type PDSCH resources according to the PRACH.

In the exemplary embodiment of the present disclosure, the second type PDSCH may include at least one item of: downlink data, information for uplink channel carrying an ACK, uplink timing adjustment information, uplink scheduling information, and a first type RNTI. Herein, the second type PDSCH is scrambled according to the first type RNTI, and/or the RA-RNTI, and/or a cell ID, and/or a sequence determined by the PRACH.

The feedback unit 506 is configured to demodulate the second type PDSCH, and perform ACK feedback according to the demodulation result.

In the exemplary embodiment of the present disclosure, the UE may further include a PDCCH monitoring unit. The PDCCH monitoring unit is configured to monitor a PDCCH in a second search space or a third search space within a predetermined time window. Herein, the predefined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

The dormant unit 507 is configured to enter the dormant state when a predefined dormant condition is satisfied.

In the exemplary embodiment of the present disclosure, the UE may further include an information receiving unit. The information receiving unit is configured to, within a predetermined time window, receive at least one of the following items transmitted by a base station: downlink control channel resource configuration information, PRACH configuration information, uplink channel configuration information for HARQ-ACK feedback, scheduling information of the second type PDSCH, PUSCH scheduling information, transmission method indication information, PRACH transmission triggering information, triggering information of the contention-based random access process, indication information for entering a dormant state.

In the exemplary embodiment of the present disclosure, the dormant unit may further be configured to enter the dormant state when no PDCCH is received within the predetermined time window or the indication information for entering the dormant state is received.

In the exemplary embodiment of the present disclosure, the fallback unit is further configured to return to the contention-based random access process according to a received fallback indication or based on a fallback triggering condition being detected. Herein, the fallback triggering condition includes at least one item of: the uplink timing being invalid, the PDCCH scheduling the second type PDSCH is received but the uplink timing being invalid, no response is received within a predefined time window after the contention-free PRACH is transmitted.

Figure 6:
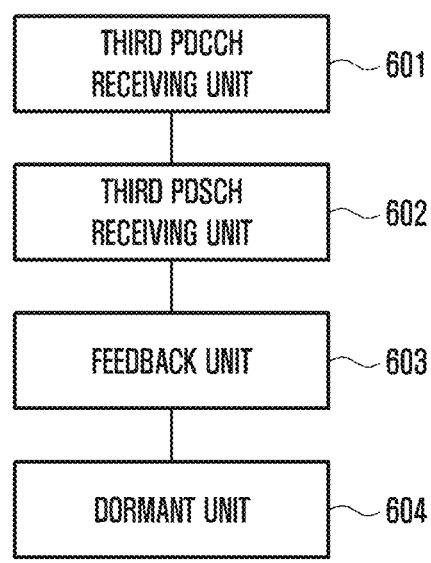
FIG. 6 illustrates a block diagram illustrating a UE according to another exemplary embodiment of the present disclosure.

FIG. 6 is a block diagram illustrating a UE according to another exemplary embodiment of the present disclosure.

Referring to FIG. 6, the UE includes a third PDCCH receiving unit 601, a third PDSCH receiving unit 602, a feedback unit 603, and a dormant unit 604.

The third PDCCH receiving unit 601 is configured to receive a predefined PDCCH in a third search space.

In the exemplary embodiment of the present disclosure, the third search space may support a UE to perform reception of a control channel for downlink transmission in an RRC idle/deactivated state. The third search space may be used to monitor a PDCCH scheduling a second type PDSCH.

In the exemplary embodiment of the present disclosure, parameters of the third search space are selectively configured, and a search space for predefined usage is used as a specific search space if parameters of the specific search space are not configured. Herein, the third search space is determined according to UE-specific RRC signaling, or the third search space is determined according to the cell system information, or the third search space is determined according to specific parameters of the UE and parameters of specific search spaces.

The third PDSCH receiving unit 602 is configured to receive a second type PDSCH according to the PDCCH received in the third search space.

The feedback unit 603 is configured to perform ACK feedback according to the received downlink signal.

The dormant unit 604 is configured to enter the dormant state when a predefined dormant condition is satisfied.

Figure 7:
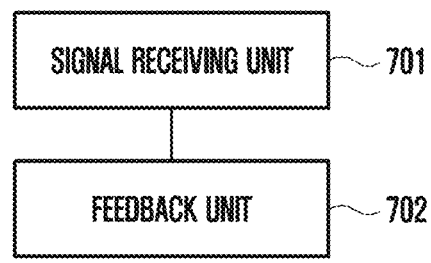
FIG. 7 illustrates a block diagram illustrating a UE according to another exemplary embodiment of the present disclosure.

FIG. 7 is a block diagram illustrating a UE according to another exemplary embodiment of the present disclosure;

Referring to FIG. 7, the UE includes a signal receiving unit 701 and a feedback unit 702.

The signal receiving unit 701 is configured to receive a predefined downlink signal in a predefined downlink resource.

In the exemplary embodiment of the present disclosure, the predefined downlink resource is a predefined second type PDSCH resource, and the predefined second type PDSCH resource is configured by the base station when the UE is in an RRC connected state, and may be used for downlink transmission in an RRC idle/inactive state.

The feedback unit 702 is configured to perform ACK feedback according to the received downlink signal.

In the exemplary embodiment of the present disclosure, the UE feeds back an ACK if the UE demodulates the PDSCH correctly, and the UE does not provide feedback if it does not demodulate the PDSCH correctly. Or, the UE may provide an ACK or NACK according to the demodulation result of the PDSCH.

In the exemplary embodiment of the present disclosure, the ACK and NACK may be carried by a PRACH or a PUCCH, or the ACK may be carried by a PUSCH.

In the exemplary embodiment of the present disclosure, the UE may further include a determining unit. The determining unit is configured to determine whether to transmit a PUCCH according to whether uplink timing is valid. The PUCCH carrying the ACK or NACK is transmitted according to the uplink timing if the uplink timing is valid, and the PUCCH is not transmitted if the uplink timing is invalid; or, the PUCCH carrying the ACK or NACK is transmitted according to the uplink timing if the uplink timing is valid, and the PRACH is transmitted but the PUCCH is not transmitted if the uplink timing is invalid.

In the exemplary embodiment of the present disclosure, after the downlink signal (the second type PDCCH) is received, the PDCCH is monitored in the third search space within the predetermined time window. Herein, the predefined time window takes any following item as a start point: an end symbol of an uplink channel for performing the ACK feedback by the UE, an end position of a slot/sub-slot at which the end symbol of the uplink channel for performing the ACK feedback by the UE is located, an end symbol of the PDSCH transmitted by the UE, an end position of the slot/sub-slot at which the end symbol of the PDSCH transmitted by the UE is located, an end symbol of the PUSCH transmitted by the UE, and an end position of the slot/sub-slot at which an end symbol of the PUSCH transmitted by the UE is located.

Figure 8:
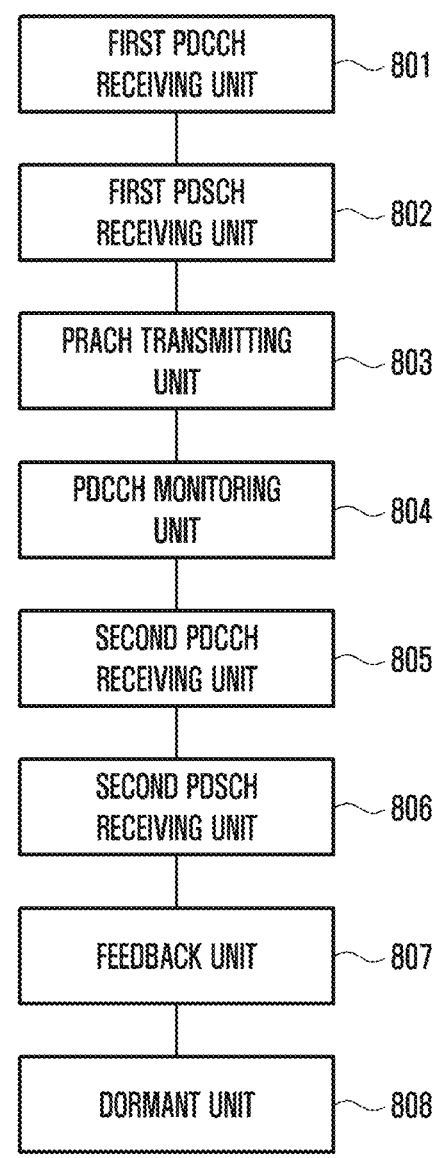
FIG. 8 illustrates a block diagram illustrating a UE according to another exemplary embodiment of the present disclosure.

FIG. 8 is a block diagram illustrating a UE according to another exemplary embodiment of the present disclosure.

Referring to FIG. 8, the UE includes a first PDCCH receiving unit 801, a first PDSCH receiving unit 802, a PRACH transmitting unit 803, a PDCCH monitoring unit 804, a second PDCCH receiving unit 805, a second PDSCH receiving unit 806, a feedback unit 807, and a dormant unit 808.

The first PDCCH receiving unit 801 is configured to receive a predefined PDCCH in a first search space.

The first PDSCH receiving unit 802 is configured to receive a first type PDSCH according to the PDCCH received in the first search space.

The PRACH transmitting unit 803 is configured to transmit a PRACH according to the first type PDSCH.

The PDCCH monitoring unit 804 is configured to monitor a PDCCH in the second search space within a predetermined time window.

The second PDCCH receiving unit 805 is configured to receive the PDCCH in the second search space when the PDCCH is monitored within the predetermined time window.

The second PDSCH receiving unit 806 is configured to receive a second type PDSCH when the PDCCH received in the second search space indicates receiving the second type PDSCH.

The feedback unit 807 is configured to demodulate the second type PDSCH, and perform ACK feedback according to the demodulation result.

The dormant unit 808 is configured to enter a dormant state when the PDCCH received in the second search space indicates entering the dormant state, or enter the dormant state when no PDCCH is monitored within the predetermined time window.

In addition, according to the exemplary embodiments of the present disclosure, a computer-readable storage medium stored with a computer program is provided, and when the computer program is executed, the downlink transmission method according to the present disclosure is implemented.

As an example, the computer-readable storage medium may store one or more programs thereon, and when the computer programs are executed, the following steps may be implemented: receiving the predefined downlink signal in the predefined downlink resource, and performing the ACK feedback according to the received downlink signal.

As an example, the computer-readable storage medium may store one or more programs thereon is provided, and when the computer programs are executed, the following steps may be implemented: receiving the predefined PDCCH in the predefined first search space; receiving the first type PDSCH according to the PDCCH received in the first search space; transmitting the PRACH according to the first type PDSCH; monitoring the PDCCH in the predefined second search space within the predetermined time window; determining whether the PDCCH is monitored within the predetermined time window; receiving the monitored PDCCH in the second search space if the PDCCH is monitored, and entering the dormant state when the PDCCH received in the second search space indicates entering the dormant state; receiving the second type PDSCH when the PDCCH received in the second search space indicates receiving the second type PDSCH; receiving the second type PDSCH according to the PDCCH received in the second search space; demodulating the second type PDSCH; performing the HARQ-ACK feedback according to the demodulation result, and then skipping to the determining whether the PDCCH is monitored within the predetermined time window to determine whether the PDCCH is monitored within the predetermined time window again, until entering the dormant state when no PDCCH is monitored within the predetermined time window; and directly entering the dormant state when no PDCCH is monitored.

The computer-readable storage medium may be, but is not limited to an electrical, magnetic, optical, electromagnetic, infrared, or semiconductor system, device, or component, or any combination thereof. More specific examples of the computer-readable storage medium may include, but are not limited to: electrical connection with one or more wires, portable computer disk, hard disk, random access memory (RAM), read-only memory (ROM), erasable programmable read-only memory (EPROM or flash memory), optical fiber, portable compact disk read memory (CD-ROM), optical storage device, magnetic storage device, or any suitable combination thereof. In the embodiments of the present disclosure, the computer-readable storage medium may be any tangible medium containing or storing a computer program that may be used by or in combination with an instruction execution system, device, or component. The computer program included on the computer-readable storage medium may be transmitted using any suitable medium including, but not limited to: electrical wires, optic cables, RF (radio frequency), etc., or any suitable combination thereof. The computer-readable storage medium may be included in any device, or may exist independently without being assembled into the device.

The downlink transmission devices according to the exemplary embodiments of the present disclosure have been described in conjunction with FIGS. 5 to 8 above. Next, a computing device according to the exemplary embodiments of the present disclosure is described in conjunction with FIG. 9.

Figure 9:
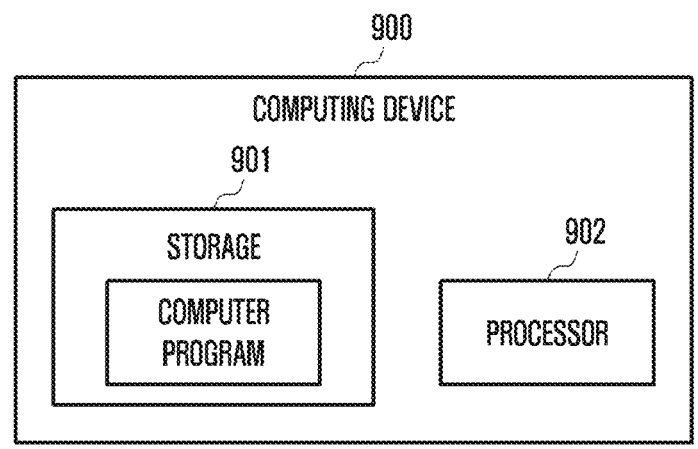
FIG. 9 illustrates a schematic diagram illustrating a computing device according to exemplary embodiments of the present disclosure.

FIG. 9 is a schematic diagram illustrating a computing device according to exemplary embodiments of the present disclosure.

Referring to FIG. 9, a computing device 900 according to the exemplary embodiments of the present disclosure includes a storage 901 stored with a computer program, and a processor 902, wherein when the computer program is executed by the processor, the downlink transmission method according to the present disclosure is implemented.

As an example, when the computer program is executed, the following steps may be implemented: receiving the predefined downlink signal in the predefined downlink resource, and performing the ACK feedback according to the received downlink signal.

As an example, when the computer program is executed, the following steps may be implemented: receiving the predefined PDCCH in the predefined first search space; receiving the first type PDSCH according to the PDCCH received in the first search space; transmitting the PRACH according to the first type PDSCH; monitoring the PDCCH in the predefined second search space within the predetermined time window; determining whether the PDCCH is monitored within the predetermined time window; receiving the monitored PDCCH in the second search space if the PDCCH is monitored, and entering the dormant state when the PDCCH received in the second search space indicates entering the dormant state; receiving the second type PDSCH when the PDCCH received in the second search space indicates receiving the second type PDSCH; receiving the second type PDSCH according to the PDCCH received in the second search space; demodulating the second type PDSCH; performing the HARQ-ACK feedback according to the demodulation result, and then skipping to the determining whether the PDCCH is monitored within the predetermined time window to determine whether the PDCCH is monitored within the predetermined time window again, until entering the dormant state when no PDCCH is monitored within the predetermined time window; and directly entering the dormant state when no PDCCH is monitored.

The computing device illustrated in FIG. 9 is merely an example, and should not bring any restriction on function and application scopes of the embodiments of the present disclosure.

The downlink transmission method performed by the UE and the UE according to the exemplary embodiments of the present disclosure have been described in conjunction with FIGS. 1 to 9 above. However, it should be understood that: the user equipment and its units as shown in FIG. 5 to FIG. 8 may be respectively configured as software, hardware, firmware, or any combination of the above for performing specific functions, and the computing device as shown in FIG. 9 is not limited to including the above shown components, some components may be added or deleted according to the needs, and the above components may also be combined.

The downlink transmission method performed by the UE and the UE according to the exemplary embodiments of the present disclosure implement the performing of downlink data transmission in the RRC idling or inactive state by receiving the predefined downlink signal in the predefined downlink resource, and performing the HARQ-ACK feedback according to the received downlink signal.

In a new radio (NR, New Radio) communication system, before the establishment of radio resource control, such as during a random access process, the performance of random access directly affects the user experience. In traditional wireless communication systems, such as LTE and LTE-Advanced, the random access process is used in multiple scenarios such as initial link establishment, cell handover, uplink re-establishment, RRC connection reestablishment, etc., and the preamble resources are exclusively used by users Divided into contention-based random access (Contention-based Random Access) and non-contention-based random access (Contention-free Random Access). In contention-based random access, each user selects a preamble sequence from the same preamble sequence resource in the process of trying to establish an uplink, and multiple users may select the same preamble sequence to send to the base station, so the conflict resolution mechanism It is an important research direction in random access. How to reduce the probability of collision and how to quickly resolve the conflict that has occurred are the key indicators that affect the performance of random access.

Figure 10:
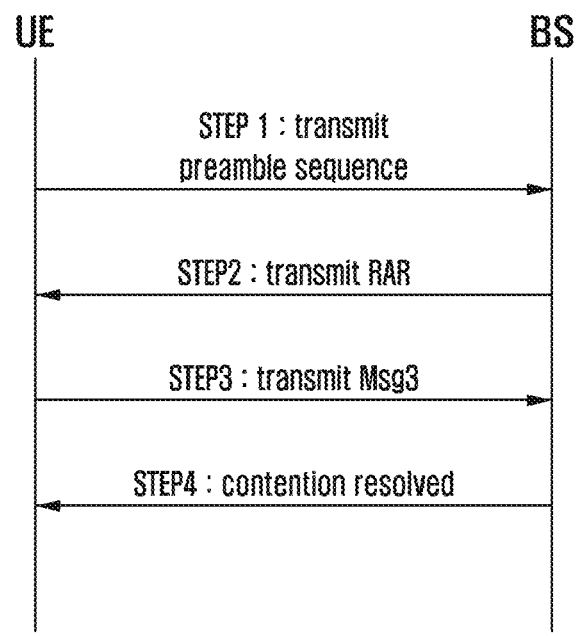
FIG. 10 illustrates an example diagram of a contention-based random access process.

The contention-based random access process in LTE-A is divided into four steps, as shown in FIG. 10. In the first step, the user randomly selects a preamble sequence from the preamble resource pool and sends it to the base station. The base station performs correlation detection on the received signal to identify the preamble sequence sent by the user; in the second step, the base station sends a random access response (Random Access Response, RAR) to the user, which contains the random access preamble sequence identifier The timing advance command determined by the time delay estimation between the user and the base station, the temporary cell radio network temporary identifier (C-RNTI) and the time-frequency resource allocated for the user's next uplink transmission; the third step, The user sends a third message (Msg3) to the base station based on the information in the RAR. Msg3 contains user terminal identification and RRC link request and other information. Among them, the user terminal identification is unique to the user and is used to resolve conflicts. In the fourth step, the base station sends the conflict resolution identification to the user, including the user who wins the conflict resolution Terminal identification. After detecting its own identity, the user upgrades the temporary C-RNTI to C-RNTI and sends an ACK signal to the base station to complete the random access process and wait for the base station's scheduling. Otherwise, the user will start a new random access process after a delay.

For the non-contention-based random access process, since the base station knows the user identity, the user can be assigned a preamble sequence. Therefore, when sending a preamble sequence, the user does not need to randomly select a sequence, but will use the assigned preamble sequence. After detecting the allocated preamble sequence, the base station will send a corresponding random access response, including information such as timing advance and uplink resource allocation. After receiving the random access response, the user considers that uplink synchronization has been completed and waits for further scheduling by the base station. Therefore, the non-contention-based random access process only includes two steps: step one is to send a preamble sequence; step two is to send a random access response.

The random access process in LTE is applicable to the following scenarios:
1. Initial access under RRC_IDLE;
2. Re-establish RRC connection;
3. Cell handover
4. Downlink data arrives in RRC connection state and requests random access process (when uplink is not synchronized);
5. In the RRC connection state, uplink data arrives and requests a random access process (when the uplink is not synchronized or PUCCH resources are not allocated resources for scheduling requests); and
6. Positioning.

In order to make the purpose, technical means and advantages of the disclosure more clear, the disclosure will be further described in detail below with reference to the drawings and specific implementations.

The method of effectively transmitting data will be described in detail below with reference to the drawings.

Figure 11:
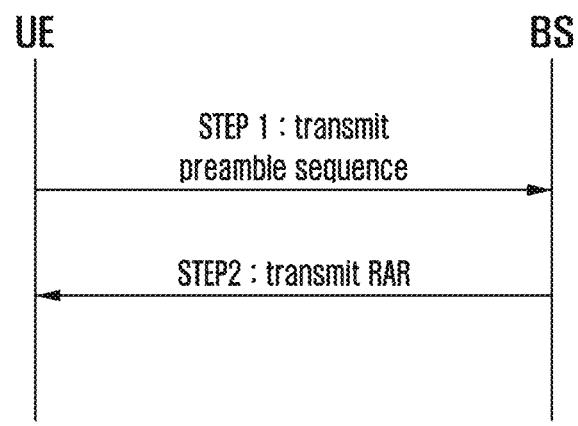
FIG. 11 illustrates an example diagram of a non-contention based random access procedure.

FIG. 10 shows an example diagram of a contention-based random access process; FIG. 11 shows an example diagram of a non-contention-based random access process and FIG. 12 shows a method for determining the type of data transmission according to an embodiment of the present disclosure flow chart.

Figure 12:
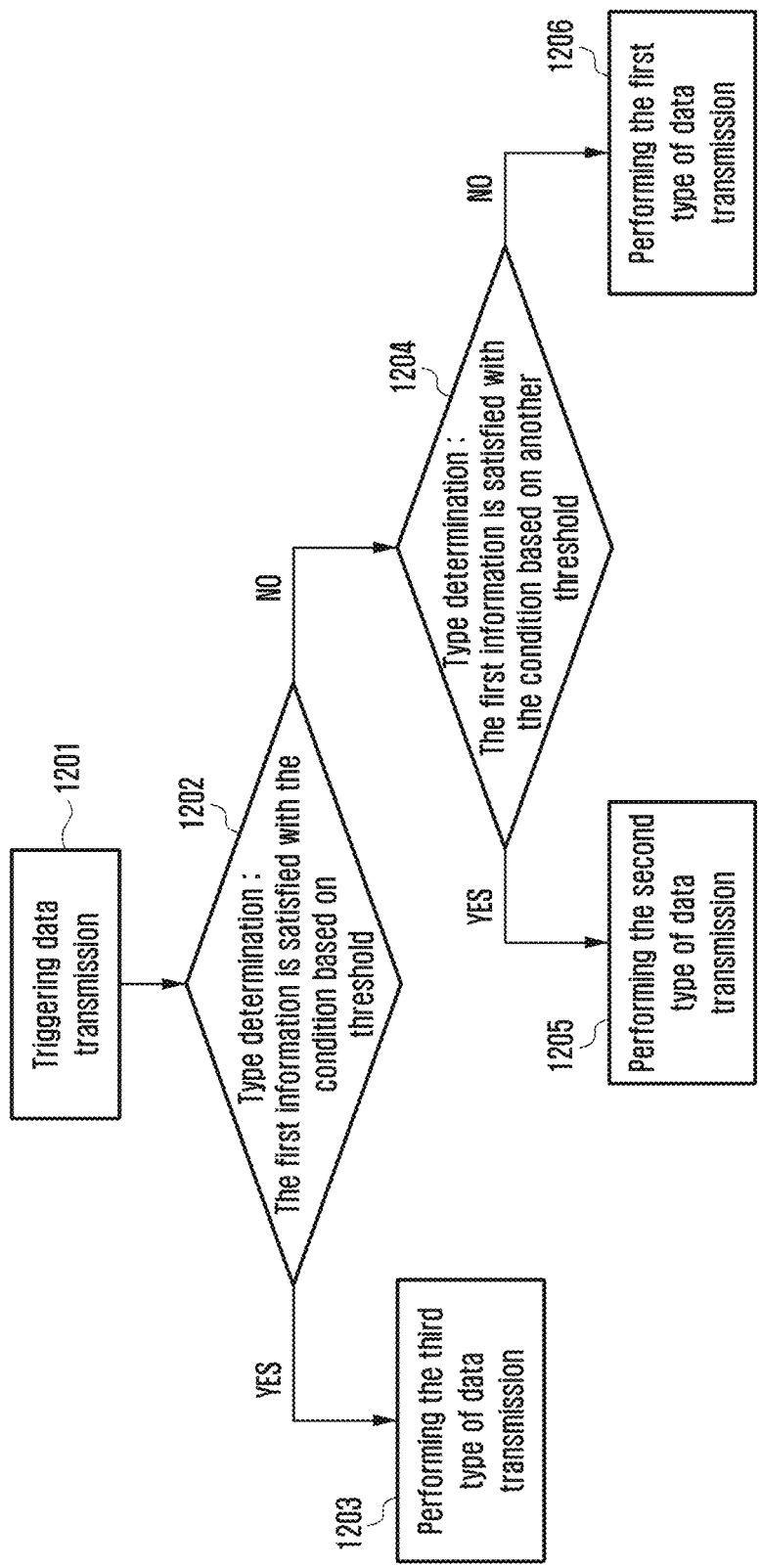
FIG. 12 illustrates a flowchart of determining the type of data transmission according to an embodiment of the present disclosure.

As shown in FIG. 12, when the user equipment (UE) finds that at least one of the following conditions is met, the data transmission is triggered (that is, the determination of the subsequent data transmission type is triggered):

The user equipment does not have uplink resources (e.g., uplink control channel resources) for sending scheduling request information;

If the amount of data to be sent by the user equipment (such as the size of data in the buffer, or the number of bits of data information to be sent) is less than or not greater than a base station configuration or a preset predetermined threshold (or resources configured by the base station) The maximum amount of data allowed in the));

When other existing random access trigger events occur;

When the base station directly instructs data transmission through downlink control signaling and/or higher layer signaling.

As shown in FIG. 12, after the data transmission is triggered (1201), the determination of the data transmission type is continued. The type of data transmission includes at least one of the following: a first type, four-step random access; a second type, two-step random access; and a third type, pre-configured uplink resource transmission. Additionally, the data transmission type may be the first type, four-step random access; the second type, two-step random access; the third type, one or more combinations of pre-configured uplink resource transmission, and when the data When there are multiple transmission types, you can select one of them as the confirmation type.

Specifically, the confirmation of the type of data transmission includes: judging based on the information X, which may be at least one of the following: data service priority, service quality, delay requirement, downlink measurement result (reference signal Received power, RSRP) and/or (reference information received quality, RSRQ). When the information X is greater than (not less than) the first threshold set or configured by the network (1202, Yes), the UE determines to use the third type for data transmission (1203); otherwise, the UE determines to use the second type or first type for service transmission (1202, No), or further Determine in the second type and the first type, and then according to the information X is greater than (not less than) the second threshold value preset or configured by the network (1204, Yes), the UE determines to perform the second type of data transmission (1205); otherwise, the UE determines to perform the first type of data transmission (1206). The two pieces of information X used for comparing the first threshold value and the second threshold value may be the same or different.

Preferably, the information X may also be the cell size supported by the base station (for example, by different preamble formats), and/or the validity of the UE's timing advance information, for example, when the supported cell size is less than (not greater than) a network The third threshold set or configured, and/or the configured preamble format is one or more of the predefined types, and/or the UE timing advance value is valid (the timing advance timer is still running), The UE determines to perform the third type of data transmission, otherwise the UE determines to use the second type or the first type for service transmission, or further determines between the second type and the first type, and then according to the information X is greater than (not less than) When the network presets or configures the fourth threshold value, the UE determines to perform the second type of data transmission; otherwise, the UE determines to perform the first type of data transmission. The two pieces of information X used for comparing the third threshold value and the fourth threshold value may be the same or different.

The above describes how to determine the type of data transmission based on the information X in conjunction with FIG. 12, and different types of transmission can be separately performed by determining the type of data transmission, thereby reducing signaling overhead and efficiently sending data.

Figure 13:
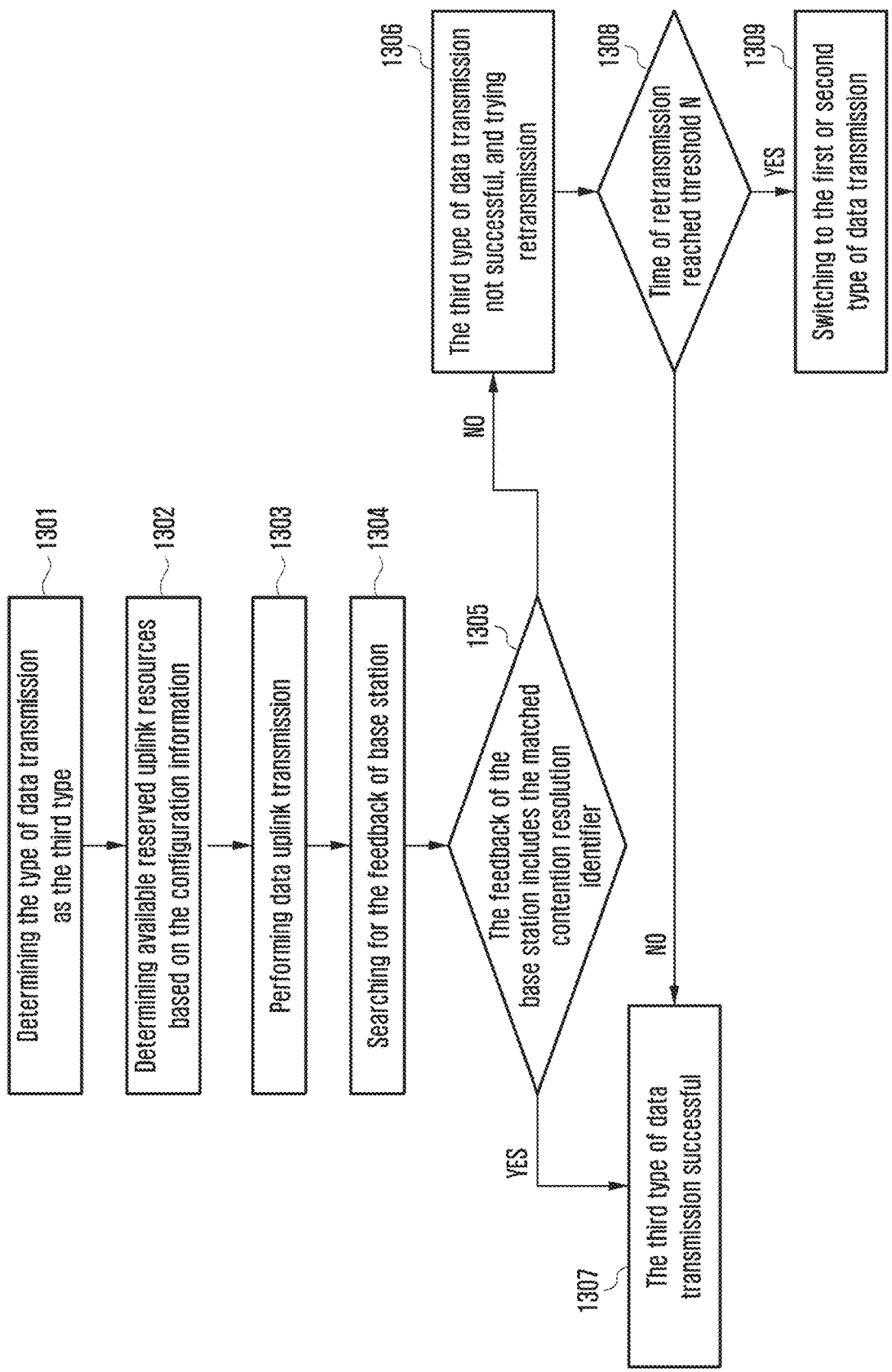
FIG. 13 illustrates a flowchart of a third type of data transmission performed by user equipment according to an embodiment of the present disclosure.

FIG. 13 shows a flowchart of a third type of data transmission performed by user equipment according to an embodiment of the present disclosure. The operation performed when the UE determines to perform the third type of data transmission is described in detail with reference to FIG. 13.

Specifically, when the UE determines to perform the third type of data transmission (1301), it performs at least one of the following operations:

Determine the available reserved uplink resources based on the configuration information of the reserved uplink resources configured by the network (1302) (through downlink control information and/or higher layer signaling), which may be UE-specific or network-specific. Further, determining the available reserved uplink resources includes at least one of the following: determining the resource size for transmitting uplink resources (at least including one of: the number of OFDM symbols, the number of PRBs, and the resource configuration of the demodulation reference signal), where the resource configuration of the demodulation reference signal includes: scrambling index, port configuration index, number of DMRS symbols, position, etc.; the number of repeated transmissions, and/or, the frequency hopping pattern within the time slot, and/or time slot frequency hopping pattern; set transmission counter and/or power increase counter.

Perform uplink data transmission (1303), including at least one of the following: transmission power confirmation: use of open-loop power control; sequence index for bit-level scrambling may be: DMRS resource index used and/or uplink resource used Index, or cell ID (when the base station is not configured with other sequence indexes);

After sending the uplink data, check and search the feedback of the base station (1304), including at least one of the following:

Determine (1305) the set of control resources and/or search space used to search for base station feedback, including: The PDCCH searched by the UE is scrambled by its CRC using the UE-specific RNTI, for example, when the uplink data sent includes the UE-specific RNTI, for example C-RNTI; or the PDCCH searched by the UE is scrambled by the CRC using the third type of RNTI, for example, when the transmitted uplink data includes CCCH, such as S-TMSI.

When the searched base station feedback (consisting of PDCCH and/or PDSCH) includes a matching conflict resolution identifier, the third type of uplink transmission is successful (1307), where the conflict resolution identifier may be a UE-specific RNTI, UE identity, CCCH, DMRS resource index or uplink resource index used;

When a matching conflict resolution identifier that is not included in the feedback of the searched base station, or the UE does not search for the feedback of the base station, it indicates that the above third type data transmission of the UE is unsuccessful (1306), then the UE may continue the third type message data retransmission, if the number of unsuccessful UEs reaches the threshold set or configured by the base station N times (1308), the UE switches (1309) to the second type or the first type of data transmission, or further between the second type and the first type the determination method is as described above.

The third type of data transmission process according to an embodiment of the present disclosure has been described above in conjunction with FIG. 13. By adopting the third type of transmission, signaling overhead is reduced and data is sent efficiently.

Figure 14A:
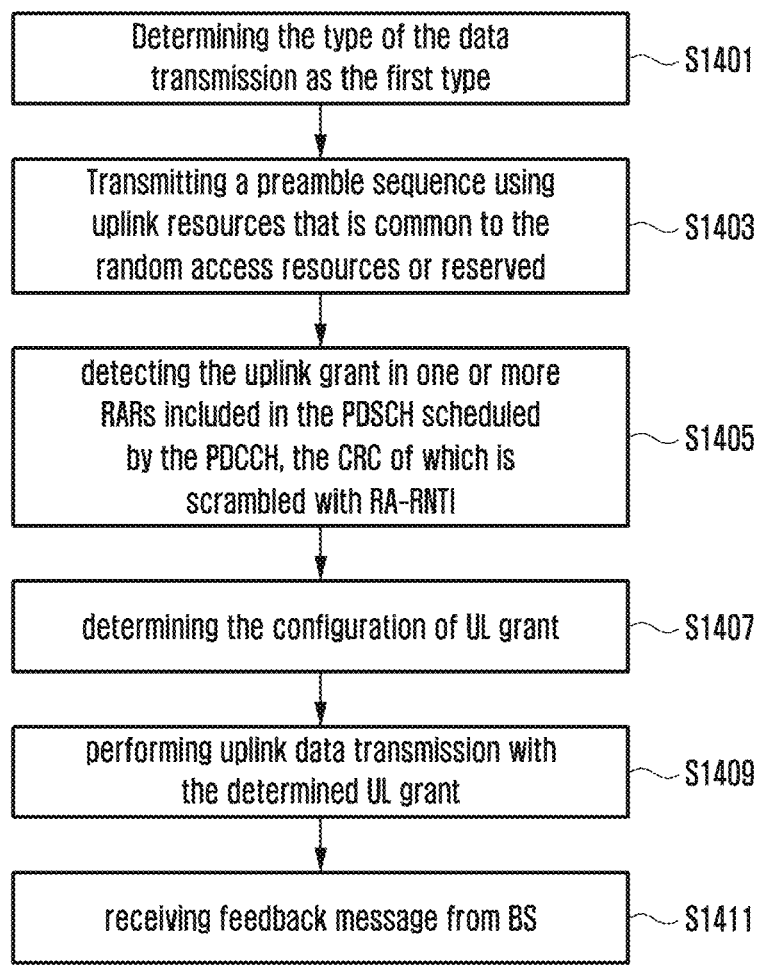
FIGS. 14A and 14B illustrate a flowchart of a first type of data transmission performed by user equipment according to an embodiment of the present disclosure.
Figure 14B:
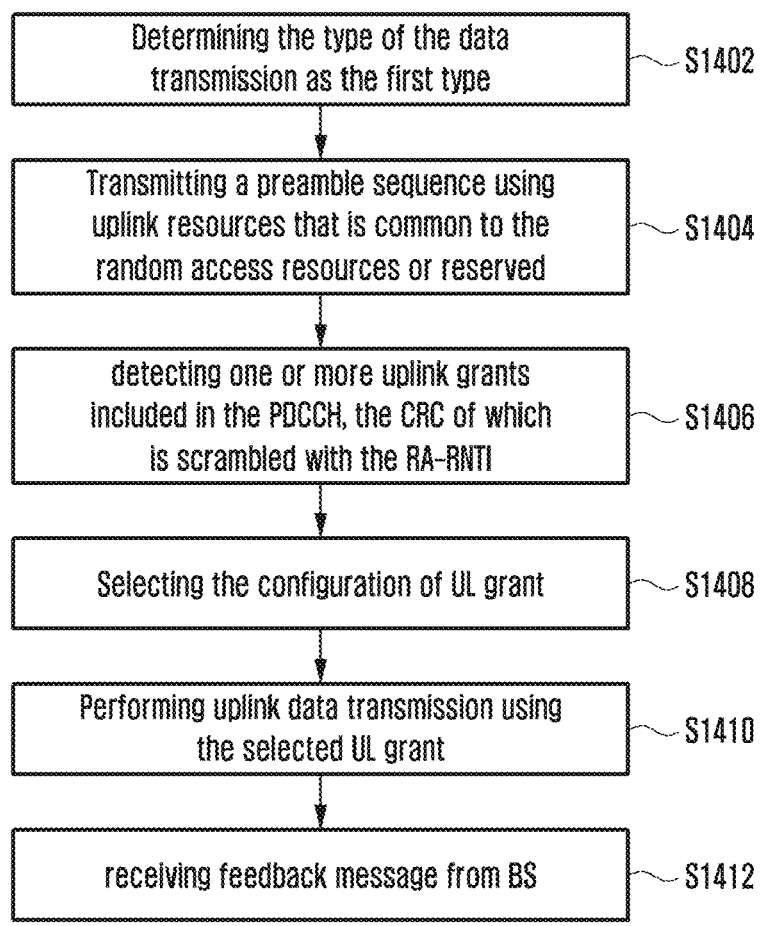

FIGS. 14A and 14B show a flowchart of a first type of packet data transmission performed by a user equipment according to an embodiment of the present disclosure. FIGS. 14A and 14B, the operation performed when the UE determines to perform the first type of data transmission is described in detail with reference to FIG. 10.

Specifically, when the UE determines to perform the first type (four-step random access) (S1401, S1402), the following operations are performed:

In the first step, the UE sends a preamble (S1403, S1404). Two methods may be adopted: method 1), completely shared with random access resources, or partially shared random access resources; method 2), select a random access resource (including random access) configured by the base station specifically for indicating data transmission Time-frequency resource and/or preamble), also known as reserved uplink resource, that is, the preamble detected by the base station comes from the configured random access resource specifically used to indicate data transmission, then the base station can know to send The UE with the preamble needs to perform data transmission; it can enable the base station to better configure uplink resources in the feedback.

In the second step, the UE receives feedback from the base station (S1405, S1406). The first way is used to perform reception: detect the PDCCH scrambled by the RA-RNTI CRC. The PDDCH schedules a PDSCH (including one or more RARs), and a single RAR corresponding to each RAPID (random access preamble index) may include an uplink grant (UL grant). A new RA-RNTI design can be adopted for data transmission, such as: adding the preamble index selected by the UE to the calculation of the new RA-RNTI; whether to add the calculation of data transmission, for example, if it is data transmission RA-RNTI+1, if it is not data transmission, RA_RNTI+0, which is unchanged; and the UE-specific RNTI configured by the base station is used, but the RNTI of different UEs may be the same, depending on the configuration of the base station.

In addition, the newly configured CORESET, or search space can be used for the feedback of the receiving station.

On the other hand, reception is performed in the second way: detecting the PDCCH scrambled by the RA-RNTI CRC, where the PDCCH contains (timing advance) TA, one or more UL grants. Unlike preamble transmission using random access resources, the UE does not resolve the conflict at this time, and directly obtains the UL grant through PDCCH scheduling; therefore, it may be obtained by multiple UEs. When there are multiple UL grants, the multiple UL grants may be: completely independent UL grants; there are some shared parameter configurations, such as time-frequency resource size, but there are some independent parameter configurations, such as different UL grants, which are different The number of time-frequency resources, for example, a single time-frequency resource is N time units, M frequency domain units, but the first UL grant, there are X such time-frequency resources; the second UL grant, there are Y such time-frequency resources.

For one or more of the above UL grants, the UE selects (S1407, S1408) one of the following: a. The most recent UL grant; b. The UL grant that is closest to the amount of data to be sent by the user equipment; c. The user equipment selects a larger than the pending user UL grant with the smallest amount of data sent by the device; d. Choose a UL grant randomly with equal probability.

In the second step, after receiving the base station feedback, the UE performs data transmission according to the determined (configured or selected) ul grant; and when the feedback is not received, or the correct feedback is not received (for example, the PDCCH of the RARNTI found, But the RAPID does not match), the UE returns to the first step to retransmit the preamble.

In the third step, the UE performs data transmission (S1409, S1410) according to the determined (configured or selected) ul grant. If the conflict has not been resolved before (for example, using the traditional method), the third message (msg3) may carry the UE ID; and if the conflict has been resolved before (for example, using the UE-specific RNTI), the third message may not be carried UE ID.

In the fourth step, the UE receives (S1411, S1412) the conflict resolution message, or receives the ACK of the base station, and/or uplink scheduling of the PDCCH continues to perform UL transmission.

The first type of data transmission process according to an embodiment of the present disclosure has been described above in conjunction with FIGS. 14A and 14B. By adopting the first type of transmission, signaling overhead is reduced and data is sent efficiently.

Figure 15:
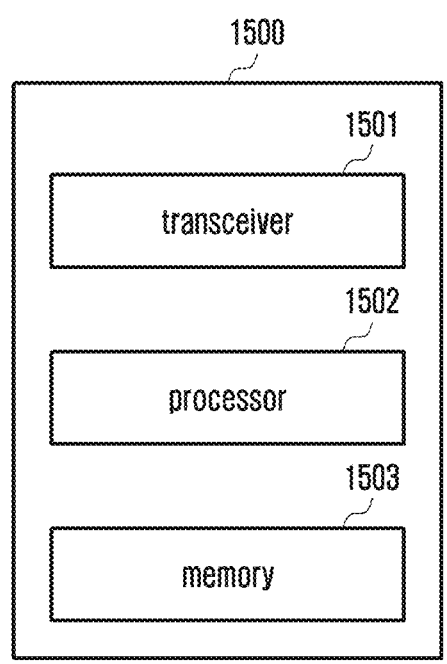
FIG. 15 illustrates a block diagram of a user equipment according to an embodiment of the present disclosure.

FIG. 15 is a block diagram illustrating a UE according to an embodiment of the present disclosure.

Referring to FIG. 15, the UE 1500 includes a transceiver 1501, a processor 1502, and a memory 1503. The transceiver 1501, the processor 1502, and the memory 1503 are configured to perform the operations of the UE shown in the figure (e.g., FIGS. 3 to 5) or described above.

Through the operation of the UE shown in FIG. 15, signaling overhead can be reduced and data can be efficiently transmitted.

Figure 16:
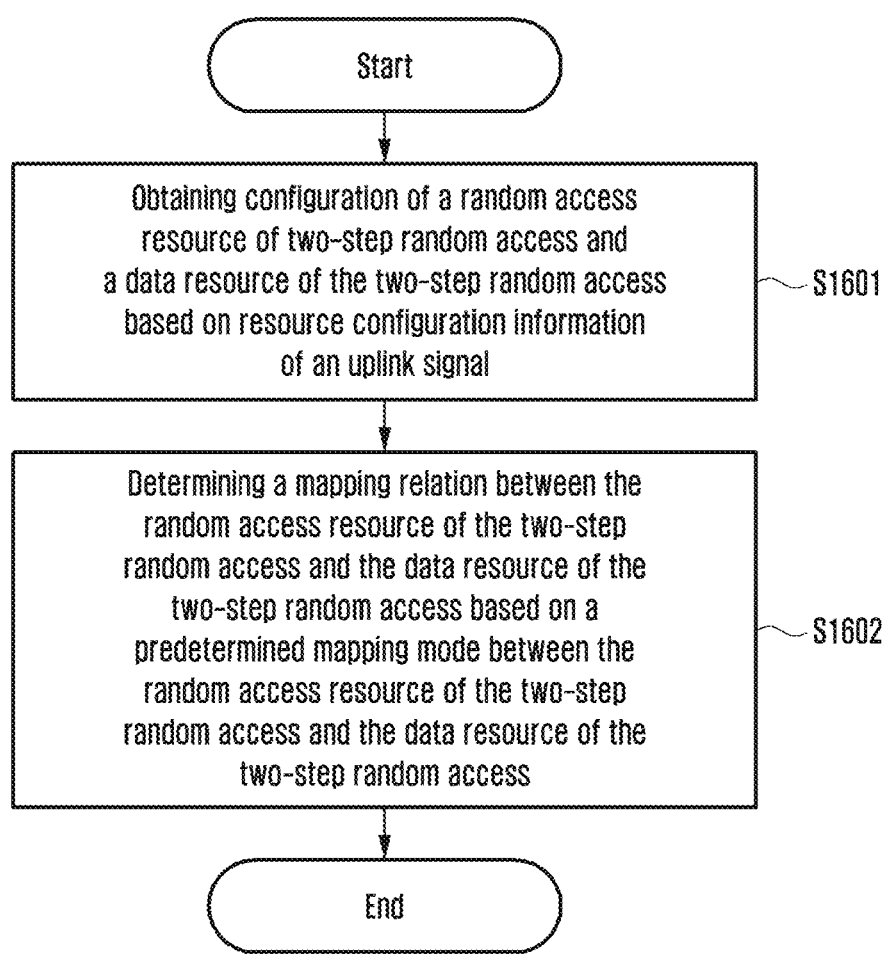
FIG. 16 illustrates a flowchart illustrating a configuration method of an uplink transmission resource according to an exemplary embodiment of the present disclosure.

FIG. 16 is a flowchart illustrating a configuration method of an uplink transmission resource according to an exemplary embodiment of the present disclosure.

As shown in FIG. 16, in step S1601, obtaining configuration of a random access resource of the two-step random access and a data resource of the two-step random access based on resource configuration information of an uplink signal.

In step S1602, determining a mapping relation between the random access resource of the two-step random access and the data resource of the two-step random access based on a predetermined mapping mode between the random access resource of the two-step random access and the data resource of the two-step random access.

After the mapping relation is determined, a preamble sequence and data may be transmitted accordingly by using the random access resource of the two-step random access and the data resource of the two-step random access.

The method as shown in FIG. 16 may be performed by a user equipment (UE).

Here, only as an example, the resource configuration information may include at least one of: four-step random access configuration information, two-step random access configuration information, downlink beam configuration information, data resource configuration information of the two-step random access, and configuration type information. It should be understood that the items listed above are only exemplary, and the present disclosure is not limited thereto.

Specifically speaking, the four-step random access configuration information (i.e., conventional random access configuration information) may include at least one of: a four-step random access configuration period (P_4STEPRACH); a four-step random access occasion (4STEPRO) time unit index (e.g., a time slot index, a symbol index, a subframe index and the like); a four-step random access occasion frequency domain unit index (e.g., a carrier index, a BWP index, a PRB index, a subcarrier index and the like); the number of the four-step random access occasion; a preamble format of the four-step random access (e.g., a cyclic prefix length, a preamble length and the number of repetitions, a guard interval length, an interval size of the used subcarriers, etc.); the number of four-step random access preambles, an index of a root sequence, a cyclic shifting value; the number of SSBs that can be mapped on one four-step random access occasion; one or more channel status information-reference signal (CSI-RS) indexes used for four-step random access; the number of 4STEPRO mapped by one CSI-RS; and one or more 4STEPRO indexes mapped by one CSI-RS. It should be understood that the items listed above are only exemplary, and the present disclosure is not limited thereto.

The two-step random access configuration information may include at least one of: a two-step random access configuration period (P_2STEPRACH); a two-step random access occasion (2STEPRO) time unit index (e.g., the time slot index, the symbol index, the subframe index and the like); a two-step random access occasion frequency domain unit index (e.g., the carrier index, the BWP index, the PRB index, the subcarrier index and the like); the number of the two-step random access occasions; a preamble format of the two-step random access (e.g., the cyclic prefix length, the preamble length and the number of repetitions, the guard interval length, the interval size of the used subcarriers, etc.); the number of two-step random access preambles, an index of a root sequence, a cyclic shifting value; the number of SSB that can be mapped on one two-step random access occasion; one or more CSI-RS indexes used for the two-step random access; the number of 2STEPROs mapped by one CSI-RS; and one or more 2STEPRO indexes mapped by one CSI-RS. If the parameters in the above two-step random access configuration information are not separately configured, the UE may determine the parameter in the two-step random access configuration information based on a relative relation of corresponding parameters in the four-step random access configuration information, for example, the four-step random access configuration period is calculated with a predefined parameter to obtain the two-step random access configuration period. It should be understood that the items listed above are only exemplary, and the present disclosure is not limited thereto.

The downlink beam (e.g., SSB and/or CSI-RS) configuration information may include at least one of: a downlink beam period; the number of downlink beams transmitted in one downlink beam period; indexes of the downlink beams transmitted in one downlink beam period; time unit positions of the downlink beams transmitted in one downlink beam period; and frequency domain unit positions of the downlink beams transmitted in one downlink beam period. It should be understood that the items listed above are only exemplary, and the present disclosure is not limited thereto.

The data resource configuration information of the two-step randomly access, for example, the data resource configuration information of a physical uplink shared channel (PUSCH), each PUSCH resource unit (composed of one PUSCH time-frequency source unit and one DMRS resource) may include at least one of time-frequency resource configuration information and DMRS configuration information of the PUSCH. It should be understood that the items listed above are only exemplary, and the present disclosure is not limited thereto.

Here, the time-frequency resource configuration information of the PUSCH may include at least one of: the sizes of one or more PUSCH time-frequency resource units (i.e., the sizes of a PUSCH time-frequency resource corresponding to one two-step random access preamble, including M time units and N frequency domain units; and if there are a plurality of PUSCH time-frequency resource units, the sizes of different PUSCH time-frequency resource units may be different, that is, the values of M and/or N may be different according to different PUSCH time-frequency resource units), the size of the PUSCH time-frequency resource unit being able to be determined by looking up a table; a PUSCH time-frequency resource configuration period (P_PUSCH); a time unit index of the PUSCH time-frequency resource units (e.g., the time slot index, the symbol index, the subframe index and the like); a frequency domain unit index of the PUSCH time-frequency resource units (e.g., the carrier index, the BWP index, the PRB index, the subcarrier index and the like); a time domain start position of the PUSCH time-frequency resource; a frequency domain start position of the PUSCH time-frequency resource; the number of the PUSCH time-frequency resource units (or the number of the PUSCH time-frequency resource units on the time domain and/or the number of the PUSCH time-frequency resource units on the frequency domain are respectively configured); a PUSCH time-frequency resource unit format (e.g., the number of repetitions, a guard interval (GT) length, an guard frequency domain interval GP, etc.); the number of downlink beams that can be mapped on one PUSCH time-frequency resource unit; one or more downlink beam indexes for two-step random access PUSCH transmission; the number of PUSCH time-frequency resource units mapped by one downlink beam; and one or more PUSCH time-frequency resource unit indexes mapped by one downlink beam and the like. It should be understood that the items listed above are only exemplary, and the present disclosure is not limited thereto.

The time domain start position of the PUSCH time-frequency resource may include at least one of: a PUSCH time-frequency resource configured through a network device and a time domain interval of a corresponding two-step random access time-frequency resource (i.e., N time units); a time length occupied by the PUSCH time-frequency resource configured by the network device (i.e., M1 time units or M1 source units of the two-step random access PUSCH (the definition of the resource unit is that a size of the time-frequency resource transmitting a specific size of data part is formed by predefined X time units and Y frequency domain units)); and the first time unit after N (or N+x_id*M1; or N+x_id*M1*X; or N+x_id*M1+delta; or N+x_id*M1*X+delta) time units after the last time unit in a time range in which the two-step random access time-frequency resource selected by the UE is located being the time domain start position of the two-step PUSCH time-frequency resource corresponding to the selected two-step random access time-frequency resource, wherein the x_id may be an index t_id or RO index on the time domain of the selected RO, and the delta may be a predefined or configured extra time unit interval. It should be understood that the items listed above are only exemplary, and the present disclosure is not limited thereto.

Here, the time range in which the selected two-step random access time-frequency resource is located may include at least one of: the selected two-step random access time-frequency resource (i.e., the selected RO); a random access time slot in which the selected two-step random access time-frequency resource is located or the last RO on the time domain therein; a random access configuration period in which the selected two-step random access time-frequency resource is located or the last RO on the time domain therein; a mapping circle from the downlink beam in which the selected two-step random access time-frequency resource is located to the random access resource or the last RO on the time domain therein; an association period from the downlink beam in which the selected two-step random access time-frequency resource is located to the random access resource or the last RO on the time domain therein; and an association pattern period from the downlink beam in which the selected two-step random access time-frequency resource is located to the random access resource or the last RO on the time domain therein. It should be understood that the items listed above are only exemplary, and the present disclosure is not limited thereto.

The frequency domain start position of the time-frequency resource of the PUSCH may be a predefined or configured frequency domain start position, for example, the frequency domain start position of the two-step random access PUSCH and/or M2 frequency domain units are after N frequency domain units at a distance of one frequency domain position (or the resource units of the two-step random access PUSCH). Here, the one frequency domain position may be: a band width part, a carrier and the like; and the frequency domain start position of the selected two-step random access RO. The UE may determine the frequency domain start position of the two-step random access PUSCH corresponding to the selected RO may be the first frequency domain unit after N (or N+x_id*M2, or N+x_id*M2*Y, or N+x_id*M2+delta or N+x_id*M2*Y+delta) frequency domain units, wherein the x_id is the frequency domain index or RO index of the selected RO, or the selected preamble index (the preamble index on the whole RO or available preamble index corresponding to the two-step random access, for example, the preamble index on the whole RO is 0~63, the available preamble of the two-step random access is 54~63 therein, and the available x_id here is 0~9), and a specific N mat be used to be 0, the delta may be indicated as a guard carrier to avoid inter-carrier interference as much as possible. Specifically, the indicated time domain start position of the PUSCH time-frequency resource is the position of the first PUSCH time-frequency resource unit, the indicated frequency domain start position of the PUSCH time-frequency resource is the position of the first PUSCH time-frequency resource unit, and other time-frequency resources corresponding to all the two-step random access time-frequency resource in the time range in which the two-step random access time-frequency resource selected by the UE is located are obtained by inferring through frequency domain preferred then time domain or time domain preferred and then frequency domain in sequence.

The DMRS configuration information may include at least one of: the number of DMRS ports N_DMRS and/or indexes (i.e., port configuration information correspondingly included by each DMRS port) of DMRS ports and/or DMRS sequence indexes (e.g., scrambled IDs and the like) available on one PUSCH time-frequency resource unit; and DMRS port configuration information. Here, the DMRS port configuration information may include at least one of: a sequence type, for example, indicating whether it is a ZC sequence, a gold sequence and the like; a cyclic shift interval; a sequence length (i.e., the subcarriers occupied by a DMRS sequence); a time domain orthogonal cover code (TD-OCC), for example, the TD-OCC having a length of 2 may be [+1 −1], [−1,+1]; a frequency domain orthogonal cover code (FD-OCC), for example, the FD-OCC having a length of 2 may be [+1 −1], [−1,+1]; and a comb configuration, which may include a comb size and/or a comb shift, for example, if the comb size is 4, and the offset is 0, it indicates the 0th RE of every 4 REs in the DMRS sequence, and if the offset is 1, it indicates the 1st RE of every 4 REs in the DMRS sequence. It should be understood that the items listed above are only exemplary, and the present disclosure is not limited thereto.

The configuration type information may indicate one configuration type of two configuration types, wherein the first configuration type may indicate at least one of the positions, sizes and the number of the two kinds of resources of the random access resource of the two-step random access and the data resource of the two-step random access, and the second configuration type may indicate the position of the random access resource of the two-step random access and a positional relationship between the random access resource of the two-step random access and the data resource of the two-step random access. More specifically, under the first configuration type, the UE may obtain the configured data resource of the two-step random access through the resource configuration information (for example, the size, the position and the like of the data resource) separately configured by the base station, and then, through the predefined mapping mode of the random access resource and the data resource, the UE may obtain the mapping relation between the random access resource and the data resource; and under the second configuration type, the base station may obtain the configured random access resource of the two-step random access, and may obtain the configured data resource of the two-step random access and the mapping relation between the random access resource and the data resources by configuring a relative time-frequency relation (e.g., the time domain and/or the frequency domain intervals) between the data resource of the two-step random access and the random access resource of the two-step random access or through the predefined mapping mode between the random access resource and the data resource. It should be understood that the items listed above are only exemplary, and the present disclosure is not limited thereto.

The resource configuration information may be obtained based on at least one of: a random access response (RAR) in a random access process, for example, uplink (UL) grant information in the RAR; downlink control information of granting uplink transmission, for example, UL grant information or separate DCI configuration in the downlink control information, wherein the granted uplink transmission may be new transmission of data and may also be retransmission of data; a high-level control signaling, for example, a system message transmitted by the base station or RRC configuration information obtained by the user and the like; and pre-configured parameter information. It should be understood that the items listed above are only exemplary, and the present disclosure is not limited thereto.

Here, the UE may obtain the entire or part of the resource configuration information through at least one of the above information, for example, the PUSCH time-frequency resource configuration information may be obtained from the system message, and the DMRS configuration information may be obtained from the RRC configuration information of the UE. More specifically, the UE may obtain transmission resource configuration for the two-step random access through the system message, and the UE may obtain another transmission resource configuration for the two-step random access when the user is in a connected state through the RRC configuration information of the UE, for example, the DMRS resource in the transmission resource of the two-step random access configured by the system message only includes the DMRS port and uses a preset DMRS sequence (for example, a preset scrambled ID), while the RRC configuration information of the UE may configure the DMRS resource including the DMRS port and the DMRS sequence (e.g., different scrambled IDs). Similarly, the above information may be used to configure an exclusive power control parameter (alphaMsgApusch) in the connected state to adjust PUSCH transmitting power of the msgA of the UE while performing the two-step random access in the connected state.

Specifically, when the first condition is satisfied, the configured DMRS resource received by the UE only includes the DMRS port and uses the preset DMRS sequence (e.g., the preset scrambled ID, and only one scrambled ID), that is, it indicates that the PUSCH resource unit is formed by the PUSCH time-frequency resource unit and the DMRS port at this time; when the first condition is not satisfied, the DMRS resource of the DMRS resource configuration received by the UE may include the DMRS port and the DMRS sequence (for example, there may be W different scrambled IDs, W is larger than 1, for example, W=2), that is, it indicates that the PUSCH resource unit is formed by the PUSCH time-frequency resource unit and the DMRS resource (including the DMRS port and the DMRS sequence) at this time; wherein the first condition may be one of or a combination of a plurality of:

1. The number of random access preambles configured for the two-step random access in one time period or the number of random access preambles required to be mapped with the PUSCH resource units of two-step random access is less than (or no larger than) a preset value (or a value configured by the base station) X, for example, X=12 (considering a current maximum number of 12 DMRS ports may be supported), or X=8 (considering it is mathematically easier to perform an integer mapping with the preamble); wherein the time period may be one of: one or more ROs, one or more RACH time slots, one or more RACH frames, one or more POs (PUSCH occasions, used to transmit the time-frequency resource of the data part of the two-step random access, which is the same meaning with the PUSCH time-frequency resource unit in the present disclosure), one or more PUSCH time slots (including one or more POs), one or more PUSCH frames (including one or more PUSCH time slots), a mapping period of the random access resource of the two-step random access and the data resource of the two-step random access, a related period of the random access resource of the two-step random access, and the related period of the data resource of the two-step random access; and wherein the number of the random access preambles required to be mapped with the PUSCH resource unit of two-step random access may be obtained through the number M1 of the PUSCH source units of the two-step random access and the mapping parameter N of the random access preambles and the PUSCH resource units, for example, if N=4, it indicates that four two-step random access preambles are mapped to one two-step random access PUSCH resource unit, if N=1/4, it indicates that one two-step random access preamble is mapped to four two-step random access PUSCH resource units, and if M1=12, and N=4, the number of random access preambles required to be mapped with the PUSCH resource unit of two-step random access is M/N=3.

2. The number of the DMRS resources configured for the two-step random access in one time period or the number of DMRS resources in the PUSCH resource units required to be mapped with the random access preambles of two-step random access is less than (or no larger than) one preset value (or a value configured by the base station) X, for example, X=12 (considering a current maximum number of 12 DMRS ports may be supported), or X=8 (considering it is mathematically easier to perform an integer mapping with the preamble); wherein the time period may be one of: one or more ROs, one or more RACH time slots, one or more RACH frames, one or more POs (PUSCH occasions, used to transmit the time-frequency resource of the data part of the two-step random access), one or more PUSCH time slots (including one or more POs), one or more PUSCH frames (including one or more PUSCH time slots), a mapping period of the random access resource of the two-step random access and the data resource of the two-step random access, a related period of the random access resource of the two-step random access, and the related period of the data resource of the two-step random access; and wherein the number of the DMRS resources in the PUSCH resource units required to be mapped with the random access preambles of two-step random access may be obtained through the random access preamble M2 of the two-step random access and the mapping parameter N of the random access preambles and the PUSCH resource units, for example, if N=4, it indicates that four two-step random access preambles are mapped to one two-step random access PUSCH resource unit, if N=1/4, it indicates that one two-step random access preamble is mapped to four two-step random access PUSCH resource units, and if M2=12, and N=4, and there are M3=1 PO in the time period, the number of the DMRS resources in the PUSCH resource unit required to be mapped with the random access preamble of two-step random access is M2*N/M3=48.

3. An initial power value (P0) configured by the base station is less than or no larger than one preset value (or a value configured by the base station).

In this way, the UE may preferably use (the base station needs to be preferably configured) the DMRS port when the required DMRS number is no larger than a certain value, which may ensure the performance of the two-step random access.

In addition, the UE may obtain the mapping information from the downlink beam to the RO (including the four-step random access RO and/or the two-step random access RO) based on the resource configuration information, and the mapping information may include at least one of (here, assuming that the downlink beam is the SSB): the mapping period from the SSB to the RO (for example, the number of the random access configuration periods required to complete at least one mapping from the SSB to the RO); the mapping pattern period from the SSB to the RO (for example, ensuring the time lengths of the mapping from the SSB to the RO in two adjacent mapping pattern periods are completely the same, for example, the number of the required mapping periods from the SSB to the RO or the number of the required random access configuration periods). Similarly, the UE may obtain the mapping information from the CSI-RS to the RO based on the resource configuration information, and the mapping information may include at least one of: the mapping period from the CSI-RS to the RO (for example, the number of the random access configuration periods required to complete all mappings from the CSI-RS to the RO within at least one CSI-RS period for at least one time); the mapping pattern period from the CSI-RS to the RO (for example, ensuring the time lengths of the mapping from the CSI-RS to the RO in two adjacent mapping pattern periods are completely the same, for example, the number of the required mapping periods from the CSI-RS to the RO or the number of the required random access configuration periods). It should be understood that the items listed above are only exemplary, and the present disclosure is not limited thereto.

The predetermined mapping relation between the random access resource of the two-step random access and the data resource of the two-step random access may include: a mapping period of the random access resource of the two-step random access and the data resource of the two-step random access; and a mapping rule between the random access resource of the two-step random access and the data resource of the two-step random access. It should be understood that the items listed above are only exemplary, and the present disclosure is not limited thereto.

Here, the mapping period of the random access resource of the two-step random access and the data resource of the two-step random access may include at least one of: a predefined period, for example, 10 milliseconds, 20 milliseconds, 40 milliseconds, 80 milliseconds, 160 milliseconds and the like; a related period of the random access resource of the two-step random access; a related period of the data resource of the two-step random access; and a larger period or a smaller period of the related period of the random access resource of the two-step random access and the related period of the data resource of the two-step random access. It should be understood that the items listed above are only exemplary, and the present disclosure is not limited thereto.

The related period of the random access resource of the two-step random access may include at least one of: a mapping cycle from the downlink beam to the random access resource of the two-step random access, for example, the mapping cycle from the SSB to the RO; a configuration period of the random access resource of the two-step or four-step random access; the mapping period from the downlink beam to the random access resource of the two-step or four-step random access; and a mapping pattern period from the downlink beam to the random access resource of the two-step or four-step random access. It should be understood that the items listed above are only exemplary, and the present disclosure is not limited thereto.

The related period of the data resource of the two-step random access may include at least one of: the mapping cycle from the downlink beam to the data resource of the two-step random access, for example, the mapping cycle from the SSB to the PUSCH; the configuration period of the data resource of the two-step random access; the mapping period from the downlink beam to the data resource of the two-step random access; and the mapping pattern period from the downlink beam to the data resource of the two-step random access. It should be understood that the items listed above are only exemplary, and the present disclosure is not limited thereto.

A relevant comparison of the larger period or the smaller period of the related period of the random access resource of the two-step random access and the related period of the data resource of the two-step random access may be based on at least one of: the time length occupied by a single related period (which may include influences of different subcarrier sizes); the number of time units included in a single related period, for example, including N time slots, M OFDN symbols, and the like; the number of configuration resources included in the single related period; and the number of equivalent configuration resources included in the single related period. It should be understood that the items listed above are only exemplary, and the present disclosure is not limited thereto.

Here, regarding the number of the configuration resources included in the single related period, 1) regarding the related period of the random access resource of the two-step random access, the number of the included configuration resource is the number of the random access occasions of the two-step random access included in the related period of the random access resource of the two-step random access N_ro, and/or the number of the preambles configured for the two-step random access on one random access occasion N_preambleperro, and/or the number of the random access occasions multiplied by the number of the preambles configured for the two-step random access on one random access occasion, i.e., N_ro*N_preambleperro; the number of the configuration resource may be the number of valid resources, for example, there are 20 random access occasions configured in one period, the resources determined to be invalid through a predefined validity judging rule may not be taken into account, for example, if 6 ROs become invalid ROs due to conflicting with the downlink, the remaining 14 ROs are valid, then the number of the achievable (valid) configuration resources is 14; and 2) regarding the related period of the data resource of the two-step random access, the number of the included configuration resources is the number of the PUSCH time-frequency resource units of the two-step random access included in the related period of the data resource of one the two-step random access N_pusch, and/or the number of DMRS resources configured for the two-step random access on one PUSCH time-frequency resource N_dmrsperpusch, and/or the number of the PUSCH time-frequency resource units multiplied by the number of the DMRS resources configured for the two-step random access on one PUSCH time-frequency resource, i.e., N_pusch*N_dmrsperpusch, also i.e., the number of the PUSCH resource units; the number of the configuration resources may be the number of valid resources, for example, there are 20 PUSCH time-frequency resource units configured in one period, the resources determined to be invalid through a predefined validity judging rule may not be taken into account, for example, if 6 PUSCH time-frequency resource units become invalid PUSCH time-frequency resource units due to conflicting with the downlink, the remaining 14 PUSCH time-frequency resource units are valid, then the number of the achievable (valid) configuration resources is 14. It should be understood that the items listed above are only exemplary, and the present disclosure is not limited thereto.

Here, regarding the number of the equivalent configuration resources included in the single related period, that is, whether the configuration resources in the related period of the random access resource of one two-step random access can be completely mapped to the configuration resources of the related period of the data resource of one two-step random access is determined, if yes, it can be determined that the related period of the data resource of the two-step random access is the mapping period; or whether the configuration resources of the related period of the data resource of one two-step random access can be completely mapped to the configuration resources in the related period of the random access resource of one two-step random access is determined, if yes, it can be determined that the related period of the random access resource of the two-step random access is the mapping period. For example, the UE may obtain the mapping parameter N of the random access resource of the two-step random access and the data resource of the two-step random access (which may be obtained from the RRC configuration, the system message, the downlink control information or pre-configured parameter information of the UE), for example, if N=4, it indicates that four two-step random access preambles are mapped to one two-step random access PUSCH resource unit, if N=1/4, it indicates that one two-step random access preamble is mapped to four two-step random access PUSCH resource units. The number of the equivalent configuration resources may be the number of the equivalent configuration resources of the data resource of the two-step random access obtained from the number of the configuration resources included in the related period of the random access resource of one two-step random access through the mapping parameter N, or the number of the equivalent configuration resources of the random access resource of the two-step random access obtained from the number of the configuration resource included in the related period of the data resource of one two-step random access through the mapping parameter N. For example, if the number of the configuration resources included in the related period of the random access resource of one two-step random access is 20 ROs, and the mapping parameter is N=4, the number of the equivalent configuration resources is 20/5=5 PUSCH resource units; if the number of the configuration resources included in the related period of the data resource of one two-step random access is 20 PUSCH resource units, which is larger than the number of the equivalent configuration resources included in the related period of the random access resource of one two-step random access, it indicates that the number of the configuration resources included in the related period of the data resource of one two-step random access may completely map the random access resources included in the related period of the random access resource of one two-step random access, and thus, it can be determined that the related period of the data resource of the one two-step random access is the mapping period; and similarly, the number of the equivalent configuration resources may be obtained through the number of the configuration resources of the related period of the data resource of one two-step random access and the mapping parameters, and then is compared with the configuration resources included in the related period of the random access resource of one two-step random access to obtain the mapping period, wherein the configuration resources may be the valid configuration resources. It should be understood that the items listed above are only exemplary, and the present disclosure is not limited thereto.

The mapping rule between the random access resource of the two-step random access and the data resource of the two-step random access may include at least one of:

I) determining the mapping between the random access resource of the two-step random access and the data resource of the two-step random access from a predetermined start point, for example, staring (or resetting) from a system frame number (SFN) 0, and then mapping to a maximum SFN; and II) when the mapping period of the random access resource of the two-step random access and the data resource of the two-step random access is determined, obtaining a mapping parameter N of the random access resource of the two-step random access and the data resource of the two-step random access from RRC configuration, a system message, the downlink control information or pre-configured parameter information of a user equipment transmitted from the base station, wherein N indicates that N random access resources of the two-step random access are mapped to one data resource of the two-step random access; and more specifically, when the UE determines the mapping period of the random access resource of the two-step random access and the data resource of the two-step random access and obtains the mapping parameter N of the random access resource of the two-step random access and the data resource of the two-step random access (from the RRC configuration, the system message, the downlink control information or pre-configured parameter information of the UE transmitted from the base station), the UE may then determine the number of the random access occasions of the two-step random access in one mapping period N_roperassocationperiod, and/or the number of preambles configured for the two-step random access in one random access occasion N_preambleperro, and/or the number of the random access occasions multiplied by the number of the preambles configured for the two-step random access in one random access occasion according to the resource configuration information, i.e., the number of all the preambles included in the mapping period N_preambleperassociationperiod= N_roperassocationperiod*N_preambleperro; the UE may then determine the number of the of the PUSCH time-frequency resource units of the two-step random access in one the mapping period N_puschperassociationperiod according to the resource configuration information, and/or the number of DMRS resources configured for the two-step random access in one PUSCH time-frequency resource N_dmrsperpusch, and/or the number of the PUSCH time-frequency resource units multiplied by the number of the DMRS resources configured for the two-step random access in one PUSCH time-frequency resource, i.e., N_pruperassociationperiod=N_ puschperassociationperiod*N_dmrsperpusch, that is, the number of the PUSCH resource units; and at this time, the mapping mode may be at least one of:

i) through the obtained N_preambleperassociationperiod and the mapping parameter N, the UE obtains the number of the PUSCH resource units required to completely map the N_preambleperassociationperiod random access resources of two-step random access N_pusch_needed=N_preambleperassociationperiod/N (if N_pusch_needed=N_preambleperassociationperiod/N is not an integer, the N_pusch_needed=N_preambleperassociationperiod/N may be rounded up or down to get N_pusch_needed), wherein, if N_pusch_needed is less than or not equal to the obtained N_pruerassociationperiod, N_preambleperassociationperiod is mapped to N_pusch_needed according to the configuration, and the remaining (N_pruperassociationperiod–N_pusch_needed) is not used; in addition, if N_pruperassociationperiod=W*N_pusch_needed+delta, that is, the number of the PUSCH resource units in one mapping period may complete W (W is a positive integer larger than 0) complete mappings from the random access resources to the data resources, only the remaining delta (i.e., one complete mapping from the random access resources to the data resources cannot be completed) PUSCH resource units are deemed as useless PUSCH resource units, and the UE does not map them or use the same to transmit the two-step random access uplink data; and if N_pusch_needed is less than or equal to the obtained N_pruperassociationperiod, the UE may determine at least one of: a) this is an error condition, and the UE behavior is not defined; b) the UE does not expect that this condition occurs; c) through the obtained N_pruperassociationperiod and the mapping parameter N, the UE obtains the number of the random access resources required to completely map the N_pruperassociationperio data resources of two-step random access N_preamble_needed=N_pruperassociationperio*N (if N_pruperassociationperio*N is not an integer, N_pruperassociationperio*N may be rounded up or down to get N_preamble_needed); N_pruperassociationperiod is mapped to N_preamble_needed according to the configuration, and the remaining (N_preambleperassociationperiod–N_preamble_needed) is not used; and in addition, if N_preambleperassociationperiod =X*N_preamble_needed+delta, that is, the number of the random access resources in one mapping period may complete X (X is a positive integer larger than 0) complete mapping from data resources to the random access resources, only the remaining delta (i.e., one complete mapping from the data resources to the random access resources cannot be completed) random access resources are deemed as useless random access resources, and the UE does not map or select them.

ii) through the obtained N_pruperassociationperiod and the mapping parameter N, the UE obtains the number of the random access resource required to completely map the N_pruperassociationperio data resources of two-step random access N_preamble_needed=N_pruperassociationperio*N (if N_pruperassociationperio*N is not an integer, N_pruperassociationperio*N may be rounded up or down to get N_preamble_needed), wherein if N_preamble_needed is less than or equal to the obtained N_premableperassociationperiod, N_pruperassociationperiod is mapped to N_preamble_needed according to the configuration, and the remaining (N_preambleperassociationperiod–N_preamble_needed) is not used; in addition, if N_preambleperassociationperiod=X* N_preamble_needed+delta, that is, the number of the random access resources in one mapping period may complete X (X is a positive integer larger than 0) complete mapping from data resources to the random access resources, only the remaining delta (i.e., one complete mapping from the data resources to the random access resources cannot be completed) random access resources are deemed as useless random access resources, and the UE does not map or select them; and if N_preamble_needed is less than or equal to the obtained N_preambleperassociationperiod, the UE may determine at least one of: a) this is an error condition, and the UE behavior is not defined; b) the UE does not expect that this condition occurs; c) through the obtained N_preambleperassociationperiod and the mapping parameter N, the UE obtains the number of the PUSCH resource units required to completely map the N_preambleperassociationperiod random access resources of two-step random access N_pusch_needed=N_preambleperassociationperiod/N (if N_preambleperassociationperiod/N is not an integer, the N_preambleperassociationperiod/N may be rounded up or down to get N_pusch_needed); N_preambleperassociationperiod is mapped to N_pusch_needed according to the configuration, and the remaining (N_pruperassociationperiod-N_pusch_needed) is not used; and in addition, if N_pruperassociationperiod=W* N_pusch_needed+delta, that is, the number of the PUSCH resource units in one mapping period may complete W (W is a positive integer larger than 0) complete mappings from the random access resources to the data resources, only the remaining delta (i.e., one complete mapping from the random access resources to the data resources cannot be completed) PUSCH resource units are deemed as useless PUSCH resource units, and the UE does not map them or use the same to transmit the two-step random access uplink data.

III) when the mapping period of the random access resource of the two-step random access and the data resource of the two-step random access is determined, the number of the random access occasions of the two-step random access in one mapping period N_roperassocationperiod, the number of preambles configured for the two-step random access on one random access occasion N_preambleperro and the number of the time-frequency resource units of a physical uplink shared channel of the two-step random access in one mapping period N_puschperassociationperiod are determined according to the resource configuration information, and the mapping parameter of the random access resource of the two-step random access and the data resource of the two-step random access N=N_roperassocationperiod*N_preambleperro/N_puschperassociationperiod is determined; more specifically, when the UE determines the mapping period of the random access resource of the two-step random access and the data resource of the two-step random access, the UE then determines the number of the random access occasions of the two-step random access in one mapping period N_roperassocationperiod, and/or the number of preambles configured for the two-step random access on one random access occasion N_preambleperro, and/or the number of the random access occasions multiplied by the number of the preambles configured for the two-step random access on one random access occasion according to the resource configuration information, i.e., the number of all preambles included in the mapping period N_preambleperassociationperiod=N_roperassocationperiod*N_preambleperro; the UE then determines the number of the of the PUSCH time-frequency resource units of the two-step random access included in one the mapping period, and/or the number of DMRS resources configured for the two-step random access on one PUSCH time-frequency resource N_dmrsperpusch, and/or the number of the PUSCH time-frequency resource units multiplied by the number of the DMRS resources configured for the two-step random access on one PUSCH time-frequency resource, i.e., N_pruperassociationperiod=N_puschperassociationperiod*N_dmrsperpusch, also i.e., the number of the PUSCH resource units; at this time, the UE determines the mapping parameter N of the random access resources and the data resources through the obtained N_preambleperassociationperiod and N_puschperassociationperiod, that is, N=N_preambleperassociationperiod/N_puschperassociationperiod, more specifically, N[N_preambleperassociationperiod/N_puschperassociationperiod], wherein [x] indicates a value operation performed on x, and the value operation may be a round operation (for example, an upper round or a lower round), the closest value to the preset or configured parameter set (or larger (not less) than the valued minimum parameter value) may also be found according to N_puschperassociationperiod/N_preambleperassociationperiod, for example, if N_puschperassociationperiod=10, and N_preambleperassociationperiod=56, the preset parameter set is {16, 8, 4, 2, 1, ½, ¼, ⅛, 1/16}, it may be in accordance with the closest value larger than N_puschperassociationperiod/N_preambleperassociationperiod=5.6, that is, N=4, if it is in accordance with the minimum parameter value calculated larger (not less) than the calculated value 5.6, N=8; and here, N=4 indicates that four two-step random access preambles are mapped to one two-step random access PUSCH resource unit, and N=1/4 indicates that one two-step random access preamble is mapped to four two-step random access PUSCH resource units. In addition, after completing the mapping according to the obtained mapping parameter, if there are remaining random access resources or data resource of the two-step random access, the remaining resources are not mapped, for example, in the above examples, N=8, 56/8=7 PUSCH resource units are required to map 56 preambles in one mapping period, while there are 10 PUSCH resource units in one mapping period, and the remaining 3 PUSCH resource units are not mapped.

According to the above received configuration information and mapping relation setting, the UE may find available PUSCH resources (the PUSCH time-frequency resources and the DMRS resources) through the determined (selected) two-step random access RO and preambles and then through the mapping relations, and if the N>1 PUSCH resources are found, the UE may select one PUSCH resource therefrom with equal probability to perform the corresponding PUSCH transmission.

After transmitting a message A, the UE may search for possible downlink feedback on configured or preset downlink control channel resources, and perform subsequent operations according to the received downlink feedback and contents in the downlink feedback. Preferably, when searching for the possible downlink feedback, the UE may use one second message radio network temporary identifiers, for example, msgB-RNTI; for example, when the UE searched the RNTI used by a CRC scrambling of one PDCCH and the msgB-RNTI, the UE may deem that the correct PDCCH is found, and then further decode or unscramble the contents of the PDCCH. A possible generating method of the msgB-RNTI may be related to the random access occasion in the preambles used by the UE to transmit the message A, and is calculated by the following method:

msgB-RNTI=1+s'_id+14×t_id+14×80×f_id+14×80×8×ul_carrier_id wherein, s'_id is the index (indicated as s_id) of the first OFDM symbol of the random access occasion in one time slot plus 1, (0≤s_id<14), or s'_id is the index of the second OFDM symbol of the random access occasion in one time slot, e.g., (1≤s'_id<14); or s'_id is the index of the last OFDM symbol of the random access occasion in one time slot, e.g., (1≤s'_id<14); t_id is the index value of the (first) time slot, in which the random access occasion is, in the system frame, e.g., 0≤t_id<80, f_id is the random access occasion index of the random access occasion in the frequency domain, e.g., (0≤f_id<8), and ul_carrier_id is a band distinction used to transmit a random access signal; for example, (if the transmitted preambles are on the normal UL (NUL) band, ul_carrier_id=0; and if the transmitted preambles are on the supplementary UL (SUL) band, ul_carrier_id=1).

Figure 18:
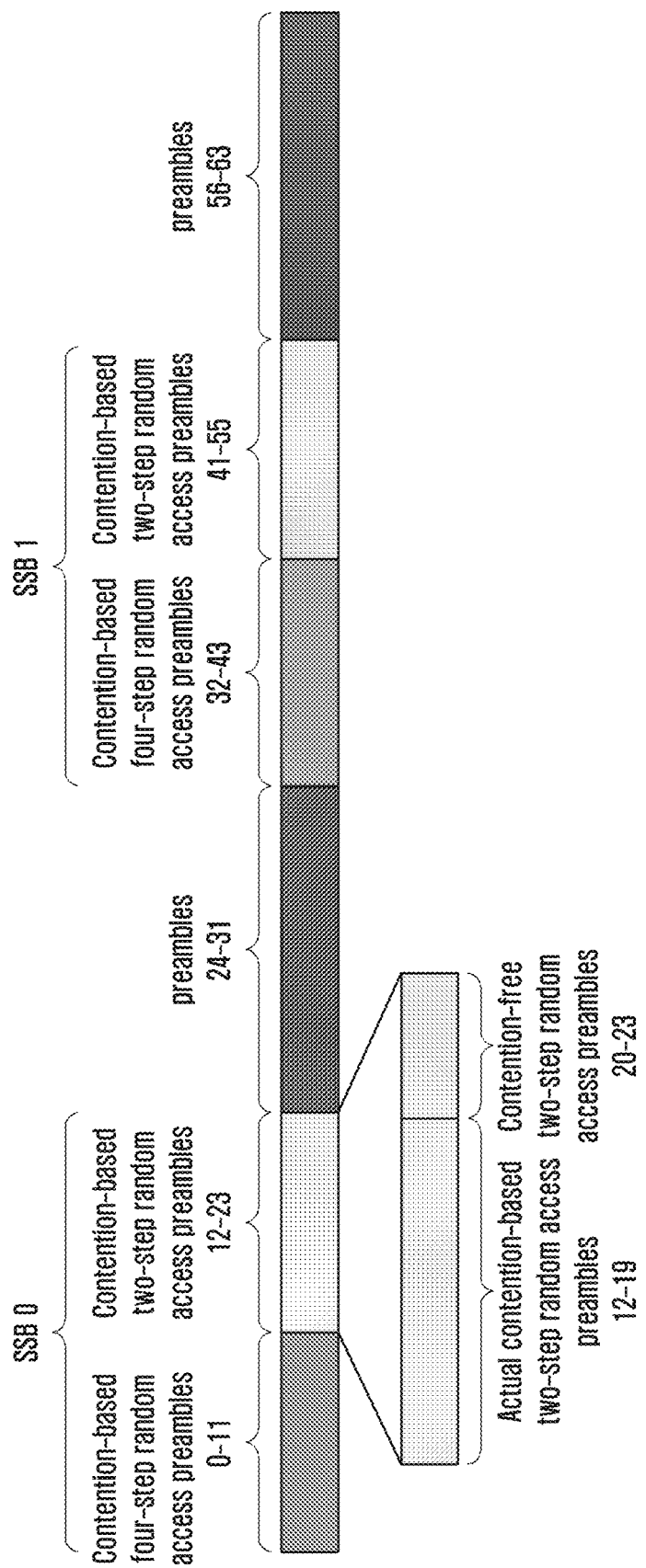
FIG. 18 illustrates an example I schematic view of configuring contention-free two-step random access preamble.

In another embodiment of the present disclosure, the present disclosure provides a transmitting method of contention-free (or non-contention) two-step random access performed by a user equipment and a receiving method of receiving feedback information of a base station. A user may obtain configuration information for the contention-free two-step random access through one of the following methods (or a combination of a plurality of methods):

1. carrying the configuration information through DCI; for example, when base station equipment uses a PDCCH order to indicate that the UE performs the contention-free two-step random access;
2. carrying the configuration information through a high-level configuration signaling; for example, when the base station equipment uses a switching command to indicate that the UE performs the contention-free two-step random access to perform switching;
3. carrying the configuration information through a beam failure recovering configuration signaling; for example, when the base station configures the configuration information available for the contention-free two-step random access through the UE-exclusive beam failure recovering configuration signaling, then when the UE satisfies the beam failure recovering rule and performs the contention-free two-step random access according to the instruction of the base station; and
4. carrying the configuration information through system information configuration;

specifically, the configuration information for the contention-free two-step random access may include at least one of:

1. an exclusive preamble sequence index,
2. an exclusive two-step random access occasion (RACH occasion, RO) (which may be informed through direct RO index, or informed through PRACH mask index),
3. a downlink beam index (e.g., an SSB index or an CSI-RS index), the exclusive preamble sequence index and/or the exclusive two-step random access occasion have a mapping relation with the downlink beam index; and specifically, the UE determines a message A (including the preamble of the two-step random access and/or the data part of the two-step random access) transmitting the contention-free two-step random access through at least one of the following methods:

1. configuring a preamble set used for the contention-free two-step random access, and the exclusive preamble sequence index received by the UE being from the preamble set. In conjunction with the configured contention-based two-step random access configuration information; that is, when the UE has obtained the configuration information used for the contention-based two-step random access (e.g., the mapping relation of the downlink beam index and the random access resources (including the preambles and/or the random access occasions) of the contention-based two-step random access, the mapping relation of the random access resources of the two-step random access and the data resources of the two-step random access, e.g., a time domain interval and the like), the UE may find available random access occasion (set) and/or random access preamble (set) through the selected downlink beam index, and may find corresponding PUSCH resources (including PUSCH time-frequency resources and DMRS resources, wherein the DMRS resources include DMRS port configuration and/or DMRS sequence configuration) of the transmission data part through the determined random access occasion and the random access preamble according to the mapping relation. Wherein, the UE may obtain that the number of available random access preambles with respect to a given SSB index is W through the configuration information of the contention-based two-step random access, and from preamble index x to preamble index y, i.e., y=x+W−1; then, the configuration used for the preamble set of the contention-free two-step random access may be determined through at least one of the following methods:

a. separating (reserving) one subset of preambles specifically used for the preambles of the contention-based two-step random access from the configured preamble set of the contention-based two-step random access, the configuration information used for the contention-free two-step random access may further include a start preamble index x', and/or an end preamble index y', and/or the number Z of the preambles used for the contention-free two-step random access (in single RO mapped by a given SSB index); specifically, the preamble index may be an actual preamble index (e.g., obtained by numbering according to all of the 64 preambles in one RO), or a logic preamble index (e.g., numbering according to the number of the preambles used for the contention-based two-step random access in one RO, i.e., W, preambles corresponding to different SSBs may be serially numbered again); and specially,
      i. the start preamble index x' is preset as a contention-based start preamble index x, and the end preamble index y'=x+Z−1; and/or
      ii. the end preamble index y' is preset as a contention-based end preamble index y, and the start preamble index x'=y−Z+1; and as shown in FIG. 18, if two SSBs are mapped to 64 preambles of one RO, taking SSB0 as an example, the contention-based four-step random access preambles are W=12, if the configured contention-based two-step random access preambles are also 12, and x=12, y=23, Z=4 preambles are configured for the contention-free random access, and it is obtained that 20~23 are used for contention-free random access preambles.

Figure 19:
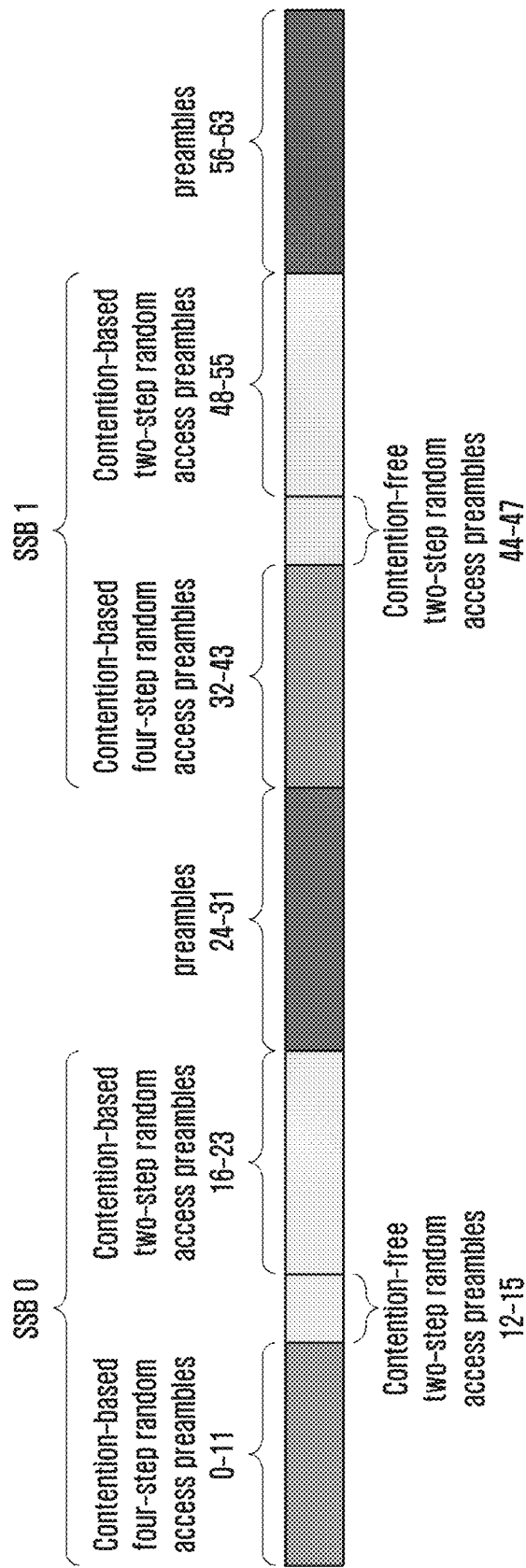
FIG. 19 illustrates an example II schematic view of configuring contention-free two-step random access preamble.

In this method, the exclusive preamble sequence index obtained by the user needs to be from given contention-free two-step random access preambles, specially, the base station may rewrite the SSB mapped by the preamble by configuring the SSB index, for example, being originally mapped to SSB 0, but the base station may separately configures SSB 1, the UE deems that the preamble is mapped with SSB1. Meanwhile, when the UE performs the contention-based two-step random access, it needs to select the preamble from the actual contention-based two-step random access preamble set, that is, the actual contention-based two-step random access preamble set is obtained by removing the preamble set reserved for contention-free two-step random access from the configured contention-based two-step random access preamble set. The advantage of this method is that the UE may reuse the defined mapping relation between the preamble and the PUSCH resources in the contention-based two-step random access, the UE may find the corresponding PUSCH resources through the configured exclusive preamble sequence index. If the configured exclusive preamble sequence index does not have corresponding valid PUSCH resources, the UE deems that it is an error configuration, or the UE does not expect to receive such a configuration.

b. Separating (reserving) one set of preambles specifically used for the preambles of the contention-based two-step random access from the outside of the configured preamble set of the contention-based two-step random access, the configuration information used for the contention-free two-step random access may further include a start preamble index x', and/or an end preamble index y', and/or the number Z of the preambles configured for the contention-free two-step random access (in single RO mapped by a given SSB index); specifically, the preamble index may be an actual preamble index (e.g., obtained by numbering according to all of the 64 preambles in one RO), or a logic preamble index (e.g., numbering according to the number of the preambles configured for the contention-based two-step random access in one RO, i.e., W, preambles corresponding to different SSBs may be serially numbered again); specially, i. the start preamble index x' is preset as a contention-based end preamble index y, and the end preamble index y'=y+Z−1; specially, the contention-based end preamble index may be the contention-based end preamble index of the four-step random access, or the contention-based end preamble index of the two-step random access; and/or ii. the end preamble index y' is preset as a contention-based start preamble index x, and the start preamble index x'=x−Z+1, which corresponds to configuring that the contention-free random access preamble set is between the contention-based end preamble index of the four-step random access and the contention-based start preamble index of the two-step random access at this time; and/or iii. the start preamble index x' is preset as a contention-based end preamble index y2 of the four-step random access, and the end preamble index y' is preset as the contention-based start preamble x of the two-step random access. This is also equal to x'=y2, y'=x, which implicitly informs that Z=x−y2+1; and as shown in FIG. 19, x'=y2=11, y'=x=16, the UE may infer that the preamble set used for the contention-free two-step random access is preambles 12~15.

In this method, the exclusive preamble sequence index obtained by the user needs to be from the given contention-free two-step random access preambles, specially, the base station may configure the SSB index mapped by the preamble by configuring the SSB index, if not configure, reuse the SSB index mapped by the contention-based preamble set. The advantage of this method is that the UE may reuse the defined mapping relation between the preamble and the PUSCH resources in the contention-based two-step random access, the UE may find the corresponding PUSCH resources through the configured exclusive preamble sequence index. If the configured exclusive preamble sequence index does not have corresponding valid PUSCH resources, the UE deems that it is an error configuration, or the UE does not expect to receive such a configuration.

2. The exclusive preamble sequence index received by the UE is from the reserved preamble set, that is, the base station configures the exclusive preamble sequence index from removing the contention-based four-step random access preambles and/or the contention-based two-step random access preambles, without separately configuring the preamble set used for the contention-free two-step random access. At this time, regarding the configuration of the PUSCH resources, it may be completed through at least one of the following methods:

a. the configuration information used for the contention-free two-step random access further includes exclusive PUSCH resource configuration information, specifically, i. a time domain position interval corresponding to the random access slot (RACH slot) in which the configured exclusive two-step random access occasion or the two-step random access occasion selected by the UE is located, e.g., M time unit intervals, e.g., M time slots; informing the frequency domain start position on the frequency domain by N frequency domain unit intervals from the first PRB of the BWP; while the specific size of the PUSCH resource unit may be the same as the size of the PUSCH resource unit of the contention-based two-step random access configuration, or it may be reconfigured according to a manner of the size of the PUSCH resource unit of the contention-based two-step random access configuration (e.g., reconfiguring a start and length indicator (SLIV) value); and/or ii. configuring an exclusive uplink grant (in which the time domain resource start position and size, and the frequency domain resource start position and size, and the PUSCH mapping type and the like are included), or configuring a PUSCH uplink grant of the contention-free two-step random access according a "configured grant" manner; and/or iii. configuring exclusive period information of the PUSCH resource, e.g., appearing repeatedly by 10 ms, 20 ms and the like, or configuring a proportionality coefficient of the period in the random access configuration (P_prachperiod), such as X*P_prachperiod, for example, X=0.5, P_prachperiod=10 ms, which indicates that the period of the exclusive PUSCH resource is 5 ms, at this time, one exclusive preamble may correspond to two PUSCH resources, and the UE may transmit on both of the two PUSCH resources, or randomly select one to transmit or transmit the first available resource; for example, X=2, P_prachperiod=10 ms, which indicates that the period of the exclusive PUSCH resource is 20 ms, at this time, there are two random access occasions to transmit the exclusive preamble, which may correspond to one PUSCH resource, and the UE may transmit on both of the two random access occasion, or randomly select one occasion to transmit, or transmit on the first available occasion; specially, when the period information of the exclusive PUSCH resource is not configured, the UE configures the random access configuration period to be equal to the period of the exclusive PUSCH resource; and specially, directly fixing the period of the exclusive PUSCH resource is equal to the random access configuration period; and b. if the exclusive PUSCH resource configuration information is not configured, the UE obtains the PUSCH resource used to transmit the contention-free two-step random access according to the mapping relation (the time domain intervals, and/or the frequency domain start positions, and/or the PUSCH configuration periods, and/or the DMRS resources and the like) between the random access resources and the PUSCH resource units determined according to the contention-based two-step random access;

c. the DMRS resource configuration used to transmit the PUSCH may be determined by at least one of the following methods:

i. explicitly indicating the DMRS resource configuration, including one or more of: an antenna port, a DMRS port index, a DMRS type, a DMRS maximum length (i.e., the number of the OFDM symbols used to transmit the DMRS), the number of DMRS CDM group(s) without data, the number of front-load DMRS OFDM symbols, and a DMRS sequence scrambled ID; and ii. pre-defining used DMRS resource configuration, a DMRS port index, and/or the DMRS sequence scrambled ID, for example, if the used DMRS port is 0, the DMRS sequence scrambled ID is the cell index cell ID;

the index indicating the available DMRS resources (composed of the DMRS port and the DMRS sequence scrambled ID) on one PUSCH occasion (used to transmit the time-frequency resource units of the msgA PUSCH) may be serially numbered according to a manner of the DMRS port first and the DMRS sequence scrambled ID second, or serially numbered according to a manner of the DMRS sequence scrambled ID first and the DMRS port second; and for example, there is 24 DMRS resources on one PUSCH occasion, which is formed by 12 DMRS ports and 2 DMRS sequence scrambled IDs, and is serially numbered according to a manner of the DMRS port first and the DMRS sequence scrambled ID second, and the UE may determine the DMRS resources (the DMRS port and/or the DMRS sequence scrambled ID) that should be used through 0~23 DMRS resources or the DMRS resource index.

Figure 17:
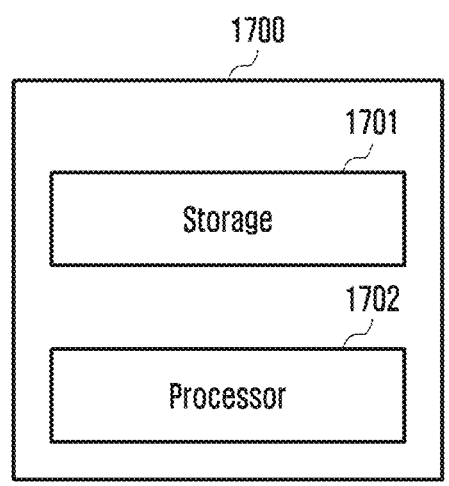
FIG. 17 illustrates a block diagram of a user equipment according to an exemplary embodiment of the present disclosure.

FIG. 17 is a block diagram of a user equipment according to an exemplary embodiment of the present disclosure.

As shown in FIG. 17, according to an exemplary embodiment of the present disclosure, a user equipment 1700 may include a storage 1701 and a processor 1702, the storage stores a computer executable program thereon, and when the instruction is executed by the processor, the following method is performed: obtaining configuration of a random access resource of two-step random access and a data resource of the two-step random access based on resource configuration information of an uplink signal; and determining a mapping relation between the random access resource of the two-step random access and the data resource of the two-step random access based on a predetermined mapping mode between the random access resource of the two-step random access and the data resource of the two-step random access.

In addition, the present disclosure is further implemented as a computer readable medium storing a computer executable program thereon, and while the instruction is executed, the method with reference to FIG. 16 is performed.

According to the embodiments described above, in general, the base station may transmit the configuration information (the configuration information is the same as described above, which is not described any more here) to the user equipment, detect a possible random access preamble signal on the configured random access occasion, and detect the uplink signal transmitted by the user equipment on the configured uplink transmission resources, so that the mapping relation between the random access resource and the random access data resource can be determined to make the base station better detect the message transmitted by the user. More specifically, configuration of the random access resource of the two-step random access and the data resource of the two-step random access may be obtained based on the resource configuration information of the uplink signal, so that the configuration may be further performed based on the obtained configuration of the random access resource and the data resource of the two-step random access; the mapping relation between the random access resource of the two-step random access and the data resource of the two-step random access may be determined based on the predetermined mapping mode between the random access resource of the two-step random access and the data resource of the two-step random access, so that the mapping relation between the random access resource and the data resource may be determined; in addition, through the configuration type information indicating one configuration type among two configuration types according to the embodiments of the present disclosure, the user may obtain the accurate configuration type, which enriches the configuration means with respect to embodiments in which there is only one configuration type; through the mapping period of the random access resource of the two-step random access and the data resource of the two-step random access according to the embodiments of the present disclosure, the mapping period may be directly determined, so that the user may determine the mapping pattern more conveniently compared with the manner of inferring the mapping period in other proposed embodiments, and the particular type of mapping period according to the embodiments of the present disclosure may made the mapping period more comprehensive; through the mapping rule between the random access resource of the two-step random access and the data resource of the two-step random access according to the embodiments of the present disclosure, it may also ensure that there is a complete mapping in a mapping period.

"User equipment" or "UE" herein may refer to any terminal with wireless communication capabilities, including but not limited to mobile phones, cellular phones, smart phones or personal digital assistants (PDAs), portable computers, image capture devices such as digital cameras, Gaming equipment, music storage and playback equipment, and any portable unit or terminal with wireless communication capabilities, or Internet facilities that allow wireless Internet access and browsing.

The term "base station" (BS) or "network device" used herein may refer to eNB, eNodeB, NodeB or base station transceiver (BTS) or gNB, etc. according to the technology and terminology used.

The "memory" here can be of any type suitable for the technical environment of this article, and can be implemented using any suitable data storage technology, including but not limited to semiconductor-based storage devices, magnetic storage devices and systems, optical storage devices and systems, Fixed storage and removable storage.

The "processor" here may be of any type suitable for the technical environment of this article, including but not limited to one or more of the following: general-purpose computer, special-purpose computer, microprocessor, digital signal processor DSP, and processing based on a multi-core processor architecture Device.

The above are only preferred embodiments of the present disclosure and are not intended to limit the present disclosure. Any modification, equivalent replacement, improvement, etc. made within the spirit and principles of the present disclosure should be included in the present disclosure Within the scope of protection.

Those skilled in the art can understand that the present disclosure includes devices for performing one or more of the operations described in the present disclosure. These devices may be specially designed and manufactured for the required purpose, or may also include known devices in general-purpose computers. These devices have computer programs stored therein, which are selectively activated or reconstructed. Such a computer program may be stored in a device (e.g., computer) readable medium or any type of medium suitable for storing electronic instructions and respectively coupled to a bus. The computer readable medium includes but is not limited to any Types of disks (including floppy disks, hard disks, optical disks, CD-ROMs, and magneto-optical disks), ROM (Read-Only Memory), RAM (Random Access Memory), and EPROM (Erasable Programmable Read-Only Memory), Rewritable programmable read-only memory), EEPROM (Electrically Erasable Programmable Read-Only Memory), flash memory, magnetic card or light card. That is, a readable medium includes any medium that stores or transmits information in a readable form by a device (e.g., a computer).

Those skilled in the art can understand that each block of these structural diagrams and/or block diagrams and/or flow charts and combinations of blocks in these structural diagrams and/or block diagrams and/or flow charts can be implemented by computer program instructions. Those skilled in the art can understand that these computer program instructions can be provided to a general-purpose computer, professional computer, or other programmable data processing method processor to implement, so that the computer or other programmable data processing method processor can execute this The schemes specified in the box or boxes in the disclosed structural diagram and/or block diagram and/or flow diagram are disclosed.

Those skilled in the art can understand that various operations, methods, steps, measures, and solutions in the process that have been discussed in the present disclosure can be alternated, changed, combined, or deleted. Further, other steps, measures, and solutions in various operations, methods, and processes that have been discussed in the present disclosure may also be alternated, modified, rearranged, decomposed, combined, or deleted. Further, the steps, measures, and schemes in the prior art having various operations, methods, and processes disclosed in the present disclosure may also be alternated, modified, rearranged, decomposed, combined, or deleted.

The above is only a part of the embodiments of the present disclosure. It should be noted that those of ordinary skill in the art can make several improvements and retouching without departing from the principles of the present disclosure. These improvements and retouching also It should be regarded as the scope of protection of this disclosure.

Although the present disclosure has been described with various embodiments, various changes and modifications may be suggested to one skilled in the art. It is intended that the present disclosure encompass such changes and modifications as fall within the scope of the appended claims. Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
    transmitting, to a base station, a random access preamble on a physical random access channel (PRACH);
    receiving, from the base station, a random access response (RAR) for a transmission of the PRACH; and
    transmitting, to the base station, a physical uplink control channel (PUCCH) with a hybrid automatic repeat request (HARQ)-acknowledgement (ACK) information for the RAR,
    wherein a slot for a transmission of the PUCCH is identified based on a first parameter related to a slot for reception of the RAR, a second parameter determined based on a timing indicator field included in the RAR, and a third parameter determined based on a subcarrier spacing (SCS) of a first physical uplink shared channel (PUSCH) scheduled by the RAR.

2. The method of claim 1, wherein a bit size for the timing indicator field is 3, and the second parameter is equal to one of 1 to 8.

3. The method of claim 1, wherein the third parameter is 2 based on the SCS of the first PUSCH scheduled by the RAR being 15 KHz,
    wherein the third parameter is 3 based on the SCS of the first PUSCH scheduled by the RAR being 30 KHz,
    wherein the third parameter is 4 based on the SCS of the first PUSCH scheduled by the RAR being 60 KHz, and
    wherein the third parameter is 6 based on the SCS of the first PUSCH scheduled by the RAR being 120 KHz.

4. The method of claim 1, wherein the PUCCH with the HARQ-ACK information for the RAR is transmitted in response to the RAR includes medium access control (MAC) protocol data unit (PDU) corresponding to a success RAR.

5. A method performed by a base station, the method comprising:
    receiving, from a terminal, a random access preamble on a physical random access channel (PRACH);
    transmitting, to the terminal, a random access response (RAR) for a transmission of the PRACH; and
    receiving, from the terminal, a physical uplink control channel (PUCCH) with a hybrid automatic repeat request (HARQ)-acknowledgement (ACK) information for the RAR,
    wherein a slot for a transmission of the PUCCH is identified based on a first parameter related to a slot for transmission of the RAR, a second parameter determined based on a timing indicator field included in the RAR, and a third parameter determined based on a subcarrier spacing (SCS) of a first physical uplink shared channel (PUSCH) scheduled by the RAR.

6. The method of claim 5, wherein a bit size for the timing indicator field is 3, and the second parameter is equal to one of 1 to 8.

7. The method of claim 5, wherein the third parameter is 2 based on the SCS of the first PUSCH scheduled by the RAR being 15 KHz,
    wherein the third parameter is 3 based on the SCS of the first PUSCH scheduled by the RAR being 30 KHz,
    wherein the third parameter is 4 based on the SCS of the first PUSCH scheduled by the RAR being 60 KHz, and
    wherein the third parameter is 6 based on the SCS of the first PUSCH scheduled by the RAR being 120 KHz.

8. The method of claim 5, wherein the PUCCH with the HARQ-ACK information for the RAR is transmitted in response to the RAR includes medium access control (MAC) protocol data unit (PDU) corresponding to a success RAR.

9. A terminal in a communication system, the terminal comprising:
    a transceiver; and
    a controller configured to:
        transmit, to a base station, a random access preamble on a physical random access channel (PRACH),
        receive, from the base station, a random access response (RAR) for a transmission of the PRACH, and
        transmit, to the base station, a physical uplink control channel (PUCCH) with a hybrid automatic repeat request (HARQ)-acknowledgement (ACK) information for the RAR,
    wherein a slot for a transmission of the PUCCH is identified based on a first parameter related to a slot for reception of the RAR, a second parameter determined based on a timing indicator field included in the RAR, and a third parameter determined based on a subcarrier spacing (SCS) of a first physical uplink shared channel (PUSCH) scheduled by the RAR.

10. The terminal of claim 9, wherein a bit size for the timing indicator field is 3, and the second parameter is equal to one of 1 to 8.

11. The terminal of claim 9, wherein the third parameter is 2 based on the SCS of the first PUSCH scheduled by the RAR being 15 KHz, wherein the third parameter is 3 based on the SCS of the first PUSCH scheduled by the RAR being 30 KHz, wherein the third parameter is 4 based on the SCS of the first PUSCH scheduled by the RAR being 60 KHz, and wherein the third parameter is 6 based on the SCS of the first PUSCH scheduled by the RAR being 120 KHz.

12. The terminal of claim 9, wherein the PUCCH with the HARQ-ACK information for the RAR is transmitted in response to the RAR includes medium access control (MAC) protocol data unit (PDU) corresponding to a success RAR.

13. A base station in a communication system, the base station comprising:
a transceiver; and
a controller configured to:
receive, from a terminal, a random access preamble on a physical random access channel (PRACH),
transmit, to the terminal, a random access response (RAR) for a transmission of the PRACH, and
receive, from the terminal, a physical uplink control channel (PUCCH) with a hybrid automatic repeat request (HARQ)-acknowledgement (ACK) information for the RAR, wherein a slot for a transmission of the PUCCH is identified based on a first parameter related to a slot for transmission of the RAR, a second parameter determined based on a timing indicator field included in the RAR, and a third parameter determined based on a subcarrier spacing (SCS) of a first physical uplink shared channel (PUSCH) scheduled by the RAR.

14. The base station of claim 13, wherein a bit size for the timing indicator field is 3, and the second parameter is equal to one of 1 to 8.

15. The base station of claim 13, wherein the third parameter is 2 based on the SCS of the first PUSCH scheduled by the RAR being 15 KHz, wherein the third parameter is 3 based on the SCS of the first PUSCH scheduled by the RAR being 30 KHz, wherein the third parameter is 4 based on the SCS of the first PUSCH scheduled by the RAR being 60 KHz, and wherein the third parameter is 6 based on the SCS of the first PUSCH scheduled by the RAR being 120 KHz.

* * * * *